US012404138B2

(12) United States Patent
Vegliante et al.

(10) Patent No.: US 12,404,138 B2
(45) Date of Patent: Sep. 2, 2025

(54) CUTTER AND ROLL-DISPENSED STOCK CONTAINER

(71) Applicant: Cutting Edge Packaging Solutions, LLC, Sarasota, FL (US)

(72) Inventors: Paul Vegliante, Sarasota, FL (US); Keith Antal, Nebo, NC (US); Michael Tucker, Waynesboro, VA (US)

(73) Assignee: Cutting Edge Packaging Solutions, LLC, Sarasota, FL (US)

( * ) Notice: Subject to any disclaimer, the term of this patent is extended or adjusted under 35 U.S.C. 154(b) by 0 days.

(21) Appl. No.: 16/689,059

(22) Filed: Nov. 19, 2019

(65) Prior Publication Data

US 2020/0087099 A1 Mar. 19, 2020

Related U.S. Application Data

(63) Continuation-in-part of application No. 15/832,953, filed on Dec. 6, 2017, now Pat. No. 10,894,688.

(51) Int. Cl.
*B65H 35/00* (2006.01)
*B26D 1/04* (2006.01)
*B26D 1/06* (2006.01)

(52) U.S. Cl.
CPC ......... *B65H 35/0086* (2013.01); *B26D 1/045* (2013.01); *B26D 1/065* (2013.01); *Y10T 83/8769* (2015.04); *Y10T 83/8822* (2015.04); *Y10T 83/896* (2015.04)

(58) Field of Classification Search
CPC ............... Y10T 83/8822; Y10T 83/896; Y10T 83/7507; Y10T 83/7763; Y10T 83/8769; B65H 35/002; B65H 35/0086; B65H 2701/1752; B65H 2301/5154; B65H 16/005; B65D 43/16; A01D 34/006; A01D 34/47; A01D 34/58; A01D 34/84; A01D 34/90; H02P 29/0241; H02P 6/24; H02P 3/12
USPC ........................... 83/614, 455, 649, 582, 588
See application file for complete search history.

(56) References Cited

U.S. PATENT DOCUMENTS 1,827,029 A 10/1931 Marcalus
2,115,891 A 5/1938 Tishler
2,118,380 A 5/1938 Gresenz
2,713,939 A 7/1955 Lear
2,743,009 A 4/1956 Williamson et al.
3,071,034 A 1/1963 Castelli
3,079,827 A 3/1963 Catelli
3,153,853 A * 10/1964 Lipton .................. B43M 7/002
30/294

(Continued)

FOREIGN PATENT DOCUMENTS

CA 2156643 A1 2/1997
EP 1475027 A2 11/2004

(Continued)

OTHER PUBLICATIONS

KR-200473478-Y1 English Translation; Jul. 7, 2014.*

(Continued)

*Primary Examiner* — Laura M Lee
(74) *Attorney, Agent, or Firm* — McCarter & English, LLP

(57) ABSTRACT

A cutter for roll-dispensed stock is provided. The cutter has a retracted blade that can be actuated by depressing a button to move the blade to an extended position for cutting roll-dispensed stock.

14 Claims, 51 Drawing Sheets

(56) References Cited

U.S. PATENT DOCUMENTS 3,165,283 A 1/1965 Kaiser et al.
3,301,117 A * 1/1967 Spaulding .............. B26D 1/105 83/455
3,477,624 A 11/1969 Branyon et al.
3,549,066 A 12/1970 Wankow
3,561,312 A 2/1971 Jones
3,974,947 A 8/1976 Budny
4,104,108 A 8/1978 Kishida et al.
4,156,382 A 5/1979 Baker
4,197,774 A 4/1980 Singh et al.
D255,779 S 7/1980 Clatterbuck
4,210,043 A 7/1980 Urion et al.
4,238,065 A 12/1980 Ragsdale
4,340,162 A 7/1982 Heiman et al.
4,346,829 A 8/1982 Myers
4,417,495 A 11/1983 Gordon et al.
4,586,639 A 5/1986 Ruff et al.
4,699,031 A 10/1987 D'Angelo et al.
D293,211 S 12/1987 DePaul et al.
4,960,022 A 10/1990 Chuang
5,292,046 A 3/1994 Kaiser et al.
D347,345 S 5/1994 Kaiser et al.
5,322,001 A * 6/1994 Boda .................... B23D 35/008 83/455
5,440,961 A 8/1995 Lucas, Jr. et al.
5,658,179 A 8/1997 Glydon et al.
5,772,094 A 6/1998 Kaiser et al.
D396,978 S 8/1998 Kaiser et al.
5,802,942 A * 9/1998 Cornell .................. B26D 1/045 402/4
5,936,652 A 8/1999 Narayan et al.
5,941,476 A 8/1999 Copass
6,223,639 B1 * 5/2001 Chen ...................... B26D 1/045 225/93
6,269,970 B1 8/2001 Huang et al.
D447,685 S 9/2001 Chagnon et al.
D504,314 S 4/2005 Kim
6,931,974 B2 * 8/2005 Tseng .................... B26B 25/007 83/582
D540,187 S 4/2007 Duffy
7,299,731 B2 * 11/2007 Schulz ................. B23D 35/008 83/455
7,406,904 B2 8/2008 Antal et al.
7,603,937 B2 10/2009 Pavlik et al.
7,845,261 B2 * 12/2010 Chiang .................. B26D 1/185 83/614
7,918,151 B2 4/2011 Vegliante et al.
7,921,756 B2 4/2011 Vegliante et al.
D643,747 S 8/2011 Rye et al.
7,987,758 B2 * 8/2011 Chabansky ........ B65H 35/0086 83/614
D700,837 S 3/2014 Antal, Sr.
8,684,228 B2 4/2014 Parker
D727,170 S 4/2015 Lokey et al.
D728,258 S 5/2015 Cohen
D778,149 S 2/2017 Frick
9,604,382 B2 3/2017 Vegliante et al.
D787,324 S 5/2017 Sotka
D787,931 S 5/2017 Beck et al.
D815,522 S 4/2018 Vegliante
D873,659 S 1/2020 Vegliante
10,836,558 B2 11/2020 Vegliante
10,894,688 B2 1/2021 Vegliante
10,959,580 B2 3/2021 Vegliante
11,407,580 B2 8/2022 Vegliante
11,634,295 B2 4/2023 Vegliante
2002/0023526 A1 2/2002 Vegliante et al.
2002/0056785 A1 5/2002 Newman et al.
2002/0096031 A1 * 7/2002 Yang ...................... B26D 1/185 83/614
2002/0117038 A1 8/2002 Vegliante et al.
2003/0127352 A1 7/2003 Buschkiel et al.
2003/0140760 A1 * 7/2003 Bory .................... B65H 35/002 83/175
2004/0040429 A1 3/2004 Nichols et al.
2004/0237746 A1 12/2004 Schultz et al.
2005/0005755 A1 1/2005 Turvey et al.
2005/0034585 A1 2/2005 Antal
2005/0035133 A1 2/2005 Gerulski et al.
2005/0166738 A1 8/2005 Hsu
2005/0223863 A1 * 10/2005 Volfson .................... B26D 5/02 83/485
2006/0156885 A1 * 7/2006 Wu .......................... B26D 5/02 83/485
2006/0202079 A1 9/2006 Pavlik
2006/0237579 A1 10/2006 Doubleday et al.
2007/0000935 A1 1/2007 Pavlik et al.
2007/0004598 A1 1/2007 Maeda
2007/0044617 A1 3/2007 Pavlik
2007/0125214 A1 * 6/2007 Dong ..................... B26D 1/205 83/485
2007/0173394 A1 * 7/2007 Lee ........................ B26D 1/045 83/614
2008/0005882 A1 1/2008 Kaiser et al.
2008/0073371 A1 3/2008 Neiberger et al.
2008/0142379 A1 6/2008 Gnatenko
2009/0188366 A1 * 7/2009 Habra .................. B26D 7/2614 83/649
2010/0032445 A1 2/2010 Bunoz
2010/0168685 A1 7/2010 Drown
2011/0209594 A1 9/2011 Withers
2011/0214544 A1 9/2011 Vegliante et al.
2012/0267387 A1 10/2012 Omdoll et al.
2014/0096659 A1 4/2014 Choi
2015/0203313 A1 7/2015 Kaiser
2015/0239615 A1 8/2015 O'Donnell et al.
2015/0344256 A1 12/2015 Kaiser et al.
2016/0051330 A1 2/2016 Cosentino, II
2017/0151687 A1 6/2017 Vegliante et al.
2018/0141742 A1 5/2018 Vegliante
2018/0141743 A1 5/2018 Vegliante
2019/0167047 A1 6/2019 Vegliante
2019/0168985 A1 6/2019 Vegliante
2020/0011114 A1 1/2020 Gerstein
2020/0208073 A1 7/2020 Nowak et al.
2020/0283254 A1 9/2020 Vegliante et al.
2021/0139266 A1 5/2021 Vegliante
2021/0214150 A1 7/2021 Vegliante
2022/0073263 A1 3/2022 Vegliante
2022/0194734 A1 6/2022 Vegliante et al.
2023/0056530 A1 2/2023 Vegliante et al.
2023/0257226 A1 8/2023 Vegliante
2024/0199311 A1 6/2024 Vegliante
2024/0279019 A1 8/2024 Vegliante

FOREIGN PATENT DOCUMENTS

JP 1086937 4/1998
JP 200131077 A 2/2001
KR 19980068958 U * 12/1998 ............. B65H 35/06
KR 200153428 Y1 * 8/1999 ......... B65H 83/0882
KR 200169841 Y1 2/2000
KR 20100010691 U 11/2010
KR 200458830 Y1 2/2012
KR 20130010454 A * 12/2012 ........... B65H 35/008
KR 20130135058 A 12/2013
KR 200473478 Y1 * 7/2014 ........... B65D 35/002
KR 20140089688 A * 7/2014 ........... B65H 35/002
KR 20160033516 A 3/2016
KR 101907354 B1 10/2018

OTHER PUBLICATIONS

Office Action mailed Jul. 10, 2020, issued in connection with U.S. Appl. No. 15/832,989 (17 pages).
Office Action mailed Jul. 10, 2020, issued in connection with U.S. Appl. No. 15/358,816 (10 pages).
Notice of Allowance mailed Aug. 25, 2020, issued in connection with U.S. Appl. No. 15/399,863 (7 pages).
Examiner-Initiated Interview Summary mailed Sep. 25, 2020, issued in connection with U.S. Appl. No. 15/832,953 (1 page).

(56) References Cited

OTHER PUBLICATIONS

Notice of Allowance mailed Sep. 25, 2020, issued in connection with U.S. Appl. No. 15/832,953 (10 pages).
Office Action mailed Jan. 7, 2021, issued in connection with U.S. Appl. No. 15/358,816 (9 pages).
Notice of Allowance mailed Dec. 22, 2020, issued in connection with U.S. Appl. No. 15/832,989 (11 pages).
Office Action mailed Sep. 23, 2021, issued in connection with U.S. Appl. No. 17/152,590 (11 pages).
Office Action mailed Nov. 12, 2021, issued in connection with U.S. Appl. No. 16/825,783 (12 pages).
Office Action mailed Oct. 8, 2021, issued in connection with U.S. Appl. No. 17/218,055 (7 pages).
Notice of Allowance mailed Mar. 28, 2022, issued in connection with U.S. Appl. No. 17/218,055 (8 pages).
Office Action mailed Jun. 1, 2022, issued in connection with U.S. Appl. No. 16/825,783 (14 pages).
Applicant-Initiated Interview Summary mailed Jun. 30, 2022, issued in connection with U.S. Appl. No. 16/825,783 (2 pages).
Office Action mailed Jul. 1, 2022, issued in connection with U.S. Appl. No. 17/152,590 (8 pages).
Office Action mailed Sep. 20, 2022, issued in connection with U.S. Appl. No. 17/530,876 (6 pages).
Notice of Allowance mailed Nov. 18, 2022, issued in connection with U.S. Appl. No. 17/152,590 (7 pages).
Notice of Allowance mailed Nov. 21, 2022, issued in connection with U.S. Appl. No. 16/825,783 (7 pages).
Applicant-Initiated Interview Summary mailed Dec. 19, 2022, issued in connection with U.S. Appl. No. 17/530,876 (2 pages).
Notice of Allowance mailed Feb. 13, 2023, issued in connection with U.S. Appl. No. 17/152,590 (7 pages).
Office Action mailed Feb. 17, 2023, issued in connection with U.S. Appl. No. 17/530,876 (8 pages).
Notice of Allowance mailed Feb. 27, 2023, issued in connection with U.S. Appl. No. 16/825,783 (7 pages).
Office Action mailed May 16, 2023, issued in connection with U.S. Appl. No. 17/981,199 (15 pages).
International Search Report of the International Searching Authority mailed on Jul. 21, 2023, issued in connection with International Application No. PCT/US2023/15018 (6 pages).
Written Opinion of the International Searching Authority mailed on Jul. 21, 2023, issued in connection with International Application No. PCT/US2023/15018 (9 pages).
Office Action mailed Sep. 18, 2023, issued in connection with U.S. Appl. No. 17/530,876 (11 pages).
Office Action mailed Nov. 15, 2023, issued in connection with U.S. Appl. No. 18/138,430 (9 pages).
Plastic Wrap Dipenser Saran Wrap Cutter [online] Published on Oct. 14, 2014 from URL: https://wowbeli.com/plastic-wrap-dispenser-saran-wrap-cutter-poly-bags-cling-film-food-storage-containers-kitchen-accessories-supplies-products/ (8 pages).
Plastic Wrap Dispenser by ChicWrap [online] Retrieved Oct. 16, 2017 from URL: https://www.everythingkitchens.com/chicwrap-plastic-wrap-dispenser-modern-silver-dots-9914.html?utm_source=google&utm_medium=cse&utem_term=9914&gclid=EAlalQobChMI0_O9wZf11glVil6GCh1OXQCdEAQYCCABEgK_zPD-BwE (5 pages).
Office Action mailed Oct. 30, 2017, issued in connection with U.S. Appl. No. 29/585,274 (6 pages).
Notice of Allowance mailed Dec. 19, 2017, issued in connection with U.S. Appl. No. 29/585,274 (5 pages).
International Search Report of the International Searching Authority mailed on Jan. 30, 2018, issued in connection with International Application No. PCT/US2017/062770 (3 pages).
Written Opinion of the International Searching Authority mailed on Jan. 30, 2018, issued in connection with International Application No. PCT/US2017/062770 (8 pages).
Office Action mailed Mar. 4, 2019, issued in connection with U.S. Appl. No. 15/832,953 (16 pages).
Written Opinion of the International Searching Authority mailed on Feb. 26, 2019, issued in connection with International Application No. PCT/US2018/64234 (4 pages).
Search Report of the International Searching Authority mailed on Feb. 26, 2019, issued in connection with International Application No. PCT/US2018/64234 (3 pages).
International Search Report of the International Searching Authority mailed on Feb. 27, 2019, issued in connection with International Application No. PCT/US2018/64241 (3 pages).
Written Opinion of the International Searching Authority mailed on Feb. 27, 2019, issued in connection with International Application No. PCT/US2018/64241 (9 pages).
Office Action mailed May 28, 2019, issued in connection with U.S. Appl. No. 15/832,989 (16 pages).
Office Action mailed Jun. 5, 2019, issued in connection with U.S. Appl. No. 15/399,863 (6 pages).
Office Action mailed Jun. 5, 2019, issued in connection with U.S. Appl. No. 15/358,816 (7 pages).
Applicant-Initiated Interview Summary mailed Jun. 12, 2019, issued in connection with U.S. Appl. No. 15/832,953 (9 pages).
Office Action mailed Oct. 24, 2019, issued in connection with U.S. Appl. No. 15/358,816 (8 pages).
Office Action mailed Nov. 21, 2019, issued in connection with U.S. Appl. No. 15/832,953 (20 pages).
Notice of Allowance mailed Sep. 20, 2019, issued in connection with U.S. Appl. No. 29/656,548 (11 pages).
Applicant-Initiated Interview Summary mailed Nov. 12, 2019, issued in connection with U.S. Appl. No. 15/358,816 (2 pages).
Office Action mailed Dec. 6, 2019, issued in connection with U.S. Appl. No. 15/832,989 (16 pages).
Office Action mailed Dec. 19, 2019, issued in connection with U.S. Appl. No. 15/358,816 (7 pages).
Office Action mailed Dec. 20, 2019, issued in connection with U.S. Appl. No. 15/399,863 (9 pages).
Examiner-Initiated Interview Summary mailed Dec. 19, 2019, issued in connection with U.S. Appl. No. 15/399,863 (3 pages).
Office Action mailed Sep. 30, 2024, 2024, issued in connection with U.S. Appl. No. 18/416,705 (11 pages).
Office Action dated Nov. 29, 2024, issued in connection with U.S. Appl. No. 18/652,091 (10 pages).

* cited by examiner

CUTTER AND ROLL-DISPENSED STOCK CONTAINER

CROSS-REFERENCE TO RELATED APPLICATION

This application is a continuation-in-part application of, and claims priority to, U.S. patent application Ser. No. 15/832,953, filed on Dec. 6, 2017, the entire contents of which are expressly incorporated herein by reference.

FIELD

The present disclosure relates to a cutter and roll-dispensed stock container, and in particular, to a roll-dispensed stock container, a cutter assembly, and stock grippers.

BACKGROUND

Various forms of roll-dispensed stock, of different materials, are dispensed from containers, and cut, in various ways. For example, paper (e.g., wrapping or decorative paper) can be pulled from a continuous roll of the same and cut to length with scissors, a straight-edge blade, a serrated edge, a cutting board, or another cutting device. Roll-dispensed stock, such as gift wrapping, wax paper, parchment, and aluminum foil, can be thin and flexible which makes tearing and bunching common problems encountered while trying to cut roll-dispensed stock. Current products that are directed to solving these problem are large, bulky, and costly and can be unsafe due to exposed cutting implements.

Accordingly, what is needed, but has not yet been developed, are methods and devices for dispensing and safely cutting roll-dispensed stock materials. These and other needs are addressed by the cutter and roll-dispensed stock containers of the present disclosure.

SUMMARY

In accordance with some aspects of the present disclosure, a roll-dispensed stock container is provided. The container includes a body having a front wall, a rear wall, a bottom wall, side walls, a support wall, and a lid. The front wall, rear wall, bottom wall, support wall, lid, and side walls could form an enclosure configured and dimensioned to receive a roll of roll-dispensed stock. A cutter assembly could be positioned on the lid. The cutter assembly includes an elongated track and a slidable cutter with a blade. The slidable cutter travels along the track to cut the roll-dispensed stock positioned between the lid and the support wall. In accordance with some aspects of the present disclosure, the track can comprise an elongated aperture in the lid, or a plastic rail integrated into the body of the container and positioned on an end thereof. In accordance with aspects of the present disclosure, the container can be configured to dispense, and the cutter assembly can be configured to cut, plastic wrap, foil (e.g., aluminum or tin foil), wax paper, parchment paper, tape, duct tape, wrapping paper, and other roll-dispensed stock. One or more fixation strips can be disposed on the support wall and/or on the lid to hold a sheet of roll-dispensed stock in place while the sheet is being cut from the roll. According to some aspects of the present disclosure, a coating can be applied to the support wall and/or on the lid that adheres to the roll-dispensed stock and holds the stock in place during cutting. An opening for dispensing the roll-dispensed stock is exposed when the container is in the open configuration and covered when the container is in the closed configuration.

In accordance with some aspects of the present disclosure, a method for dispensing roll-dispensed stock from the container is provided. The method includes dispensing the roll-dispensed stock from the container, drawing the roll-dispensed stock over the one or more fixation strips, closing the lid on top of the roll-dispensed stock, thereby securely holding the roll-dispensed stock in place, and using the cutter assembly to separate a single sheet of roll-dispensed stock. The roll-dispensed stock is securely held in place by the fixation strips and tension is maintained on the roll-dispensed stock to allow the slidable cutter to easily and cleanly cut therethrough.

According to some aspects of the present disclosure, the cutter assembly includes a base and biased button that, when depressed, causes the blade to move from a retracted position within the base to a deployed position where the blade extends through the base to cut the roll-dispensed stock.

According to some aspects of the present disclosure, the cutter assembly includes a base and a button that slides therealong that, when actuated, causes a blade to move from a retracted position within the base, to a deployed position where the blade extends through the base to cut the roll-dispended stock. The cutter assembly can include a biasing means to maintain the blade in the retracted position until actuated by a user. According to some aspects of the present disclosure, the base of the cutter assembly includes body and a retaining plate that can be attached to the body after insertion through an elongated slot of a container, to secure the cutter assembly within the elongated slot.

According to some aspects of the present disclosure, the base of the cutter assembly can include a retaining means for securing the cutter assembly within the elongated slot. The retaining means can include one or more outwardly biased flanges that are hingedly attached to a bottom of the base.

According to some aspects of the present disclosure, the elongated slot of the container can include an aperture sized to accommodate the base of the cutter assembly, in an orientation other than the direction of travel during operation, to facilitate insertion of the cutter assembly into the elongated slot during assembly of the container.

In accordance with some aspects of the present disclosure, a method for dispensing roll-dispensed stock from a container can include the steps of opening a container lid to access an opening in the body of the container, drawing the roll-dispensed stock out of the body through the opening and over a surface of the container, closing the lid against the surface of the container, applying pressure to a cutter assembly to move a cutting blade from a first retracted position to a second deployed position, sliding the cutter assembly along a length of the lid from a first position to a second position to cut through the roll-dispensed stock, while continuously applying pressure to the cutting assembly to maintain the blade in a deployed position, to separate a portion of the roll-dispensed stock from the roll, and releasing pressure from the cutter assembly to allow the blade to automatically move from the second deployed position back to the first retracted position.

According to certain aspects of the present disclosure, any of the slidable cutter designs can be utilized in connection with other applications, such as a paper cutting board having a sliding cutter assembly positioned on a track that is attached to a cutting surface. According to some aspects of the present disclosure, the cutter assembly can be substantially similar in design and operation to the cutter assemblies disclosed in connection with the roll-dispensed stock containers.

BRIEF DESCRIPTION OF THE DRAWINGS

To assist those of skill in the art in making and using the disclosed roll-dispensed stock container, reference is made to the accompanying figures, wherein.

DETAILED DESCRIPTION

It should be understood that the relative terminology used herein, such as "front", "rear," "left," "top," "bottom," "vertical," and "horizontal" is solely for the purposes of clarity and designation and is not intended to limit the invention to embodiments having a particular position and/or orientation. Accordingly, such relative terminology should not be construed to limit the scope of the present invention. In addition, it should be understood that the invention is not limited to embodiments having specific dimensions.

Figure 1:
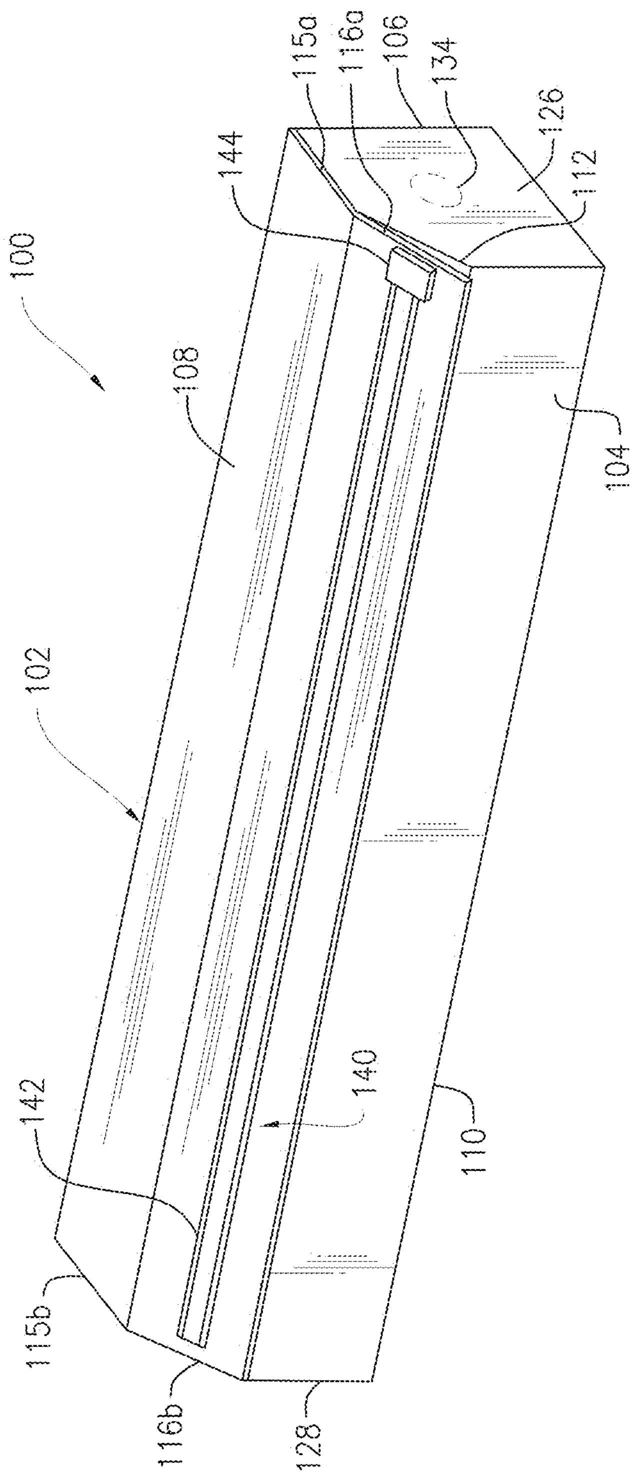
FIG. 1 is a perspective view of a roll-dispensed stock container according to the present disclosure.
Figure 2:
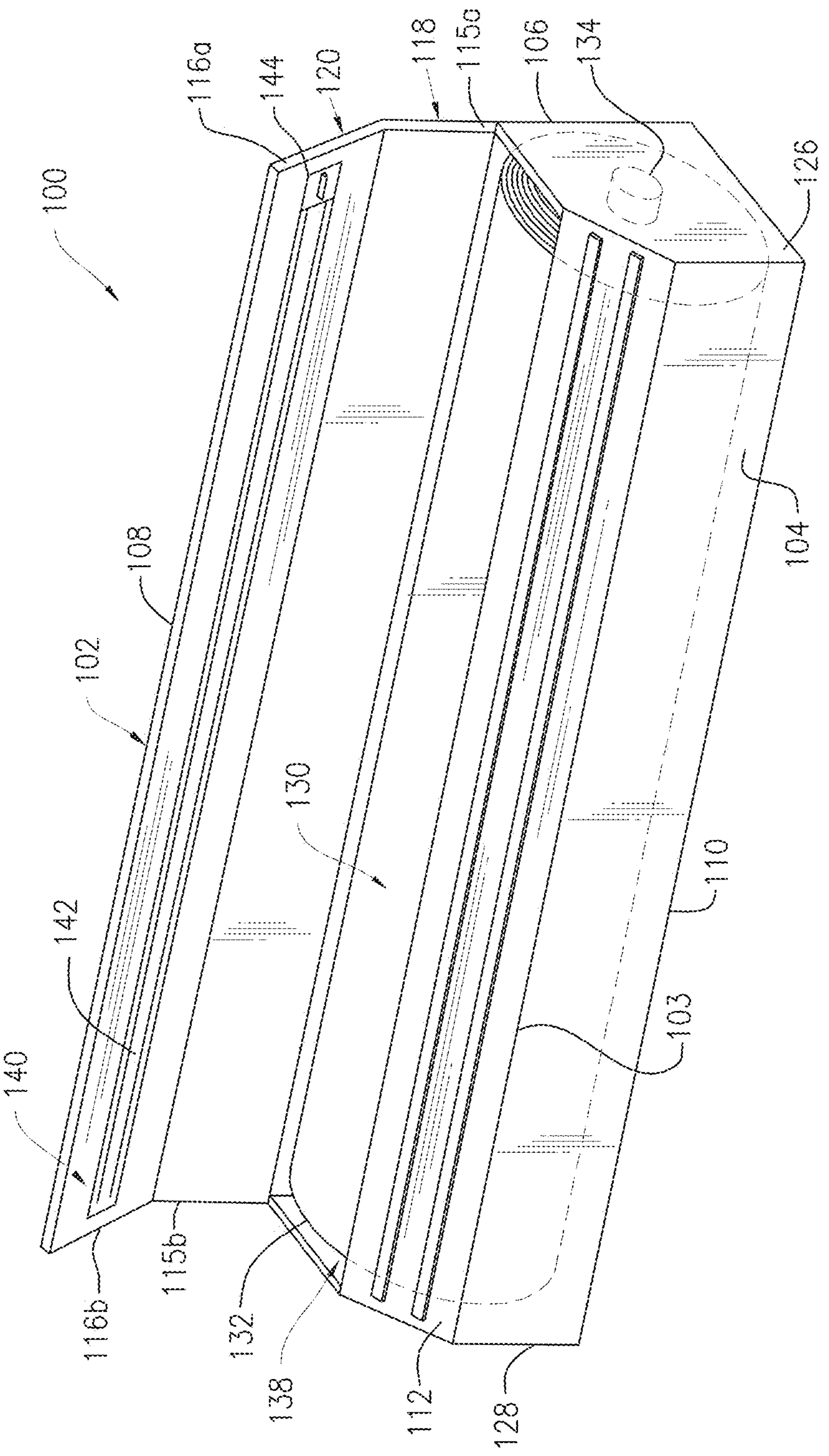
FIG. 2 is a perspective view of the roll-dispensed stock container of FIG. 1 in an open configuration.

FIGS. 1 and 2 show a roll-dispensed stock container (hereinafter "container 100") according to the present disclosure. More specifically, FIG. 1 is a perspective view of the container 100 in a closed configuration and FIG. 2 is a perspective view of the container 100 in an open configuration. The container 100 includes a body 102 including a front wall 104, a rear wall 106, a bottom wall 110, side walls 126,128, a support wall 112, and a lid 108. The body 102 could be formed from a blank (e.g., a continuous piece of material having a substantially planar configuration prior to folding) having multiple perforated lines or fold lines for folding the blank into the configuration of the body 102 of container 100 as shown. The container 100 could be formed from cardboard, plastic, wood, or any other material known to those of ordinary skill in the art that is suitably rigid and durable for receiving and dispensing roll-dispensed stock 132.

The first and second side walls 126, 128 are each connected to edges of the front, rear, and bottom walls 104, 106, and 110 to form a receptacle for holding roll-dispensed stock. The orientation of the first and second side walls 126, 128 and the front, rear, and bottom walls 104, 106, and 110 could be at substantially right angles with respect to adjoining walls. Further, the height of the front wall 104 could be less than the height of the rear wall 106, and the support wall 112 could be joined to a top edge 103 of the front wall 104 and disposed at an angle relative thereto. The support wall 112 could be fixed in position or movable with respect to the top edge 103 of the front wall 104 to allow for roll-dispensed stock 132 to be refilled into the body 102 for re-use.

As shown in FIG. 1, the lid 108 could be hingedly joined to and extend from a top edge of the rear wall 106, over support wall 112, and to the top edge 103 front wall 104. The lid 108 could have a first portion 118 having edges 115*a* and 115*b*, and a second portion 120 having edges 116*a* and 116*b*. The front wall 104, rear wall 106, bottom wall 110, lid 108, support wall 112, and side walls 126, 128 form an enclosure 130 within the body 102 configured and dimensioned to receive a roll of roll-dispensed stock 132 with an opening 138 for dispensing the roll-dispensed stock that is exposed when the container 100 is in the open configuration and obstructed when the container 100 is in the closed configuration.

As shown in FIG. 2, the lid 108 extends over the support wall 112, the underside of the lid 108 extending over the upper side of the support wall 112. The lid 108 could extend entirely or partially over the support wall 112. The first portion 118 and the second portion 120 could be hingedly connected so that the second portion 120 extends to cover the support wall 112 and is positionable so that the second portion 120 is parallel to the plane of the support wall 112. Either or both of the support wall 112 and the lid 108 could have one or more grippers, such as fixation strips 114, for maintaining the position of the roll-dispensed stock 132 prior to cutting. A retainer feature 134 could be in the form of one or more cylinders provided on side walls 126 and 128, or perforated or partially perforated sections configured to be pushed into the enclosure 130, to maintain the position of the roll of roll-dispensed stock 132 within the enclosure 130 of the body 102. The location of the feature 134, if included, defines the approximate axis of rotation for the roll-dispensed stock 132. In another aspect of the present disclosure, the feature 134 can be in the form of an extension mounted to the inner surface of the first and second side walls 126, 128 configured to engage and maintain the position of the roll of roll-dispensed stock 132 within the enclosure 130 (see, e.g., FIG. 2).

The container 100 includes a cutter assembly 140 attached to the body 102. As shown in FIG. 1, the cutter assembly 140 is attached to the lid 108 and includes an elongated track 142 and a slidable cutter 144 with a blade or serrated edge. The slidable cutter 144 could also include an engagement face 164 shaped to receive a finger of a user and pressure therefrom, discussed hereinbelow. The track 142 can be attached to the lid 108 with adhesive or by welding, and the slidable cutter 144 travels along the track 142 to cut the roll-dispensed stock 132 positioned between the lid 108 and support wall 112. The cutter assembly 140 can be provided in any desirable shape. As shown, the cutter assembly 112 extends through the lid 108 and includes a button on the outside of the lid 108, a retainer under the lid 108, and a blade that extends through the lid 108.

In accordance with some aspects of the present disclosure, the container 100 can be configured to dispense, and the cutter assembly 140 can be configured to cut, plastic wrap, foil (e.g., aluminum or tin foil), wax paper, parchment paper, tape, duct tape, wrapping paper, and other materials capable of being delivered as roll-dispensed stock. Further, it is contemplated that any of the containers of the present disclosure (e.g., containers 100, 200, 300, 400, 500, 600, 700, and 800 described herein) could be configured to dispense and cut any of the roll-dispensed stock described herein.

As shown in FIG. 1, the cutter assembly 140 could fit within an area defined by the space under the right angle formed by the intersection of the planes extending from the front wall and the first portion 118 of the lid 108 when the lid 108 is in a closed position, and thus the cutter assembly 140 would not extend beyond the bounds of the container 100 so configured. The cutter assembly 140 is thereby protected from damage during shipping or storage of the container 100. Due to the recessed positioning of the cutter assembly 140, multiple containers 100 can be stacked relative to each other without imparting pressure or force on the cutter assembly 140, thereby preventing potential damage to the cutter assembly 140.

Figure 3:
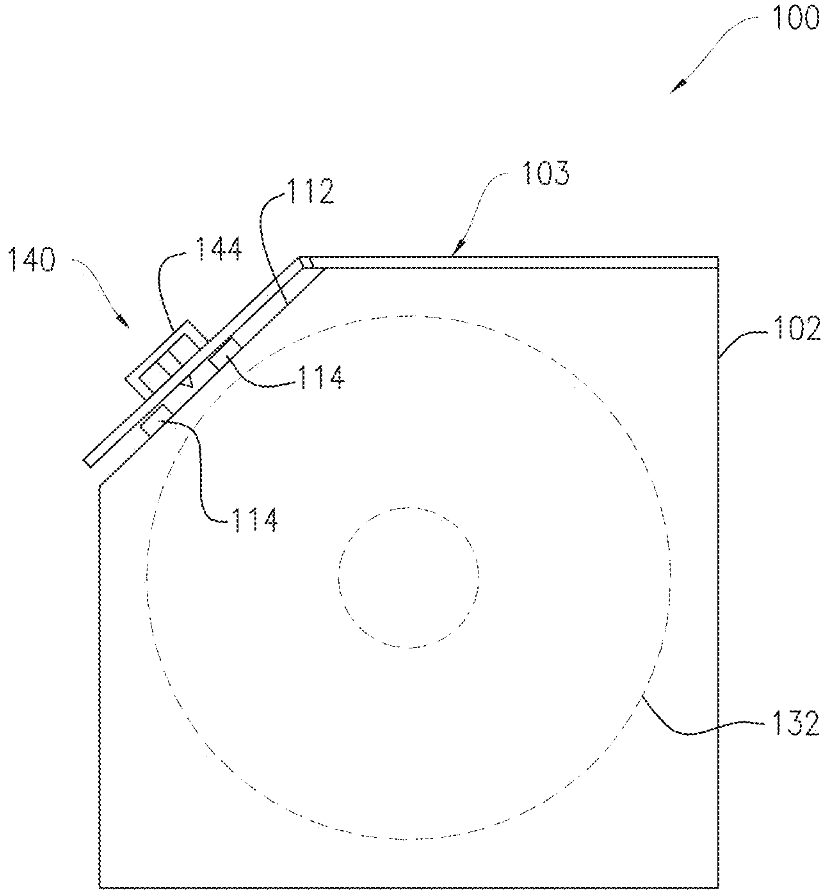
FIG. 3 is a side view of the roll-dispensed stock container of FIG. 1.

FIG. 3 is a side view of the roll-dispensed stock container 100 showing an exemplary arrangement of fixation strips 114 in relation to the cutter assembly 140 and more particularly to the slidable cutter 144. As shown in FIG. 3, one or more fixation strips 114 can be affixed to the support wall 112 of the container 100. When the roll-dispensed stock 132 is dispensed from container 100, described hereinbelow in connection with FIGS. 4-6, the roll-dispensed stock 132 is drawn over the one or more fixation strips 114 (see FIG. 4) and the lid 108 is closed on top of the roll-dispensed stock 132 (see FIG. 5), the fixation strips 114 thereby securely holding the roll-dispensed stock in place while the slidable cutter 144 is used to cut a single sheet of roll-dispensed stock (see FIG. 6). Pressure is applied against the lid 108 and fixation strips 114 when a user presses a finger into the engagement face 164 of the slidable cutter 144 to cut the roll-dispensed stock. The pressure a user applies to the cutter 144 further pushes the lid 108 against the support wall 112 to engage the fixation strips 114 with the adjacent roll-dispensed stock 132. Importantly, because the roll-dispensed stock 132 is securely held in place by the fixation strips 114, tension is maintained on the roll-dispensed stock 132, allowing the slidable cutter to easily and cleanly cut therethrough. For example, as shown in FIGS. 3-6, tension in the roll-dispensed stock 132 material is maintained between the fixation strips 114, regardless of movement on either side of the roll-dispensed stock 132 (e.g., the dispensed end or the roll within container 100). The fixation strips disclosed herein can be positioned so as to not contact, or otherwise interfere with, the cutter assembly 140. Additionally the roll-dispensed stock is not pulled by the cutter. The fixation strips 114 could be made out of any material suitable for securely and removably holding the roll-dispensed stock 132 while it is being cut. Those of ordinary skill in the art will appreciate that the material used for the fixation strips 114 is preferably selected based on the properties of the roll-dispensed stock material. In one example, if the roll-dispensed stock 132 is plastic wrap, foil, wax paper, parchment paper, tape, duct tape, or wrapping paper, the fixation strips 114 could be made of a silicone material, flexible polymer, or another material that provides light tack or clings to the roll-dispensed stock 132. The fixation strips 114 could also be made of a low-tack adhesive (e.g., fugitive, "booger," or "credit card" glue), an ultraviolet (UV) light curing adhesive, a wax, a tacky material, or any other material suitable for securely and removably holding or gripping the roll-dispensed stock 132. In addition to being provided as continuous strips, the fixation strips 114 could be provided as a plurality of discreet segments or beads disposed along a linear path, or could cover an entire surface. According to some aspects of the present disclosure, the fixation strips 114 could be formed from a low-tack adhesive material that is resiliently deformable upon application of force to the cutter assembly 140 and/or lid 108. Pressure applied to the fixation strips 114 during the cutting process causes the fixation strips to deform and tension the roll-dispensed stock therebetween, eliminating bunching and tearing of the roll-dispensed stock, and providing for repeatable and consistent cutting. Further, it is contemplated that any of the containers of the present disclosure (e.g., containers 100, 200, 300, 400, 500, 600, 700, and 800 described herein) could be provided with one or more fixation strips 114 of any material and configuration as described herein.

Figure 4:
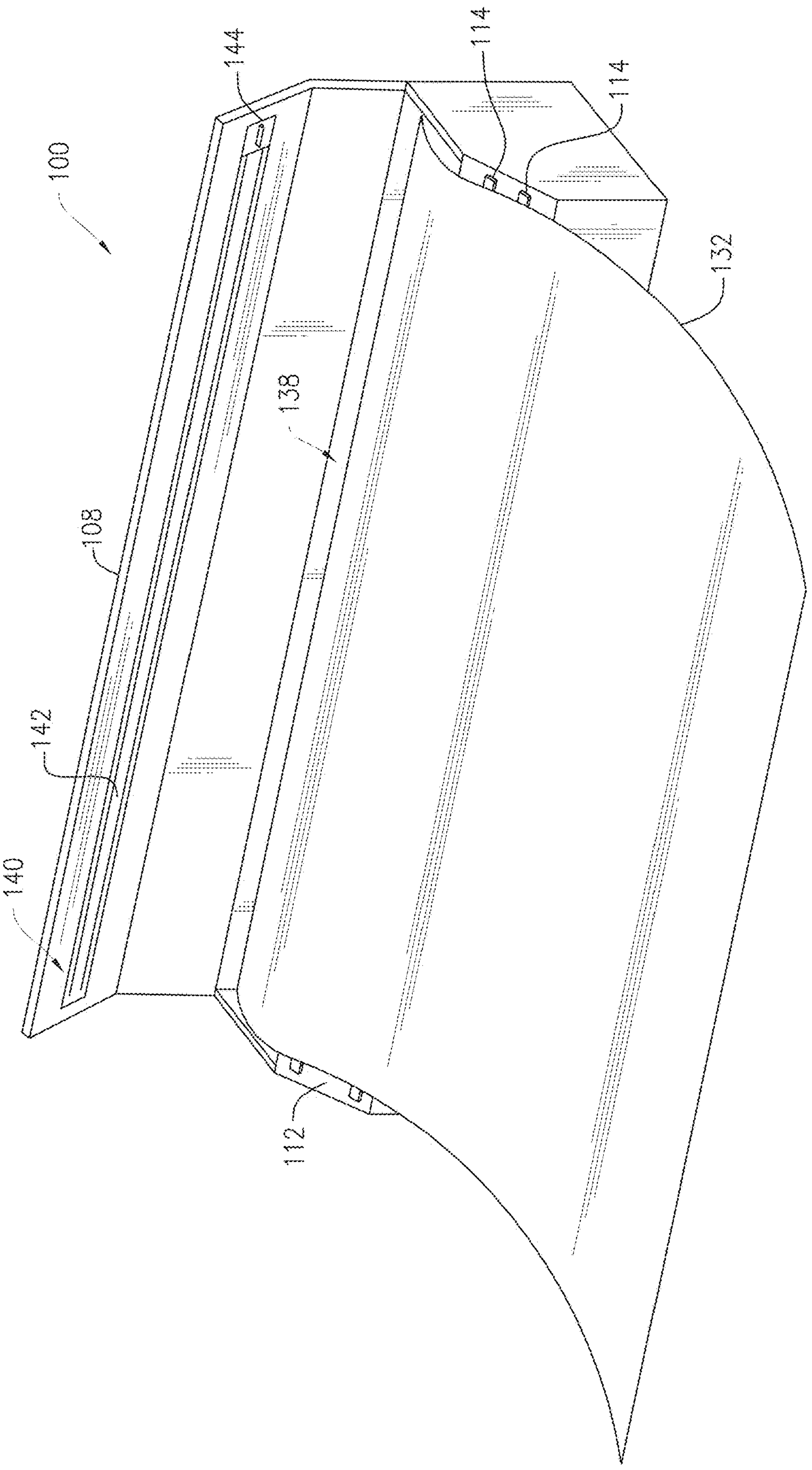
FIG. 4 is a perspective view of the roll-dispensed stock container of FIG. 1 in an open configuration with stock extending from the roll.
Figure 5:
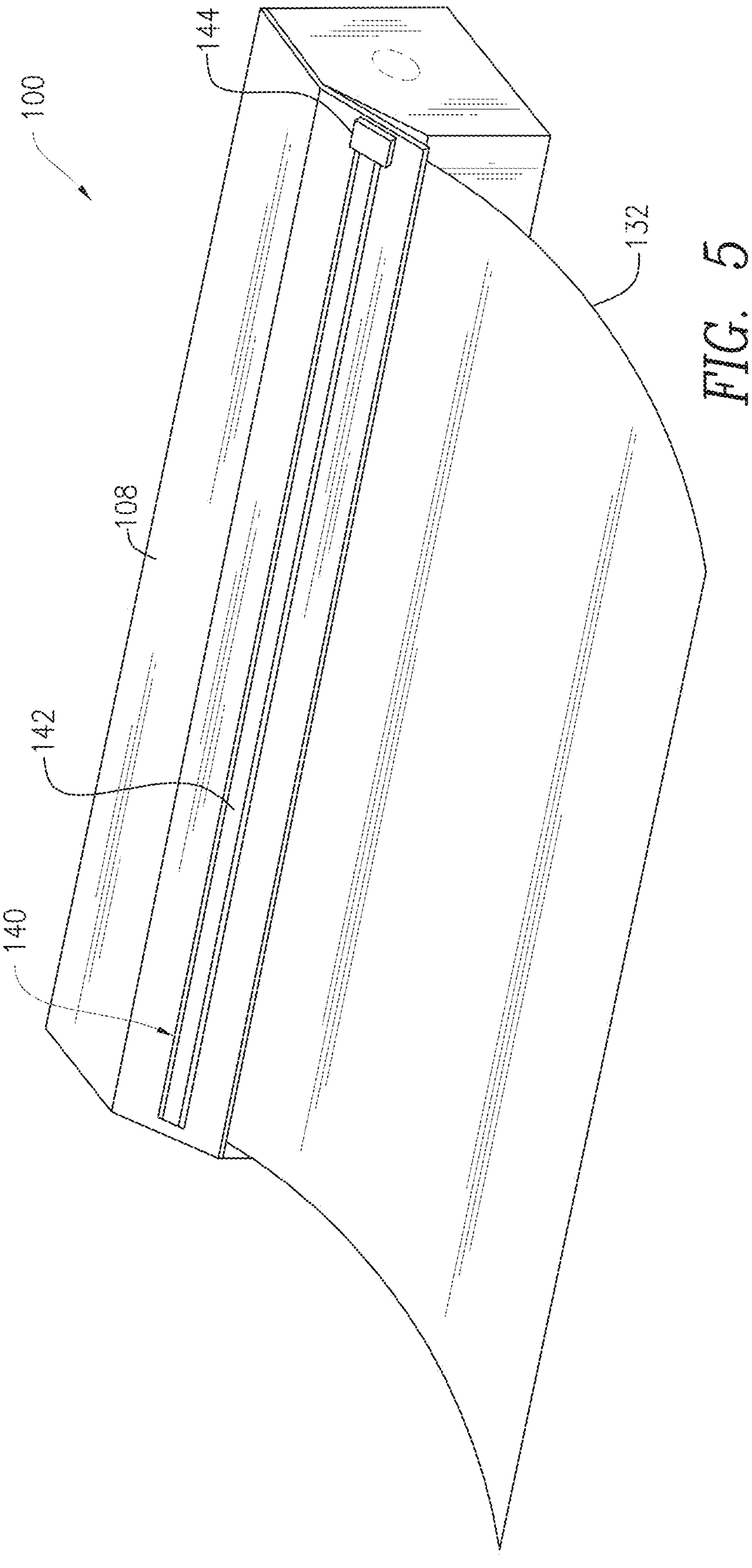
FIG. 5 is a perspective view of the roll-dispensed stock container of FIG. 4 in a closed configuration with stock extending from the roll.
Figure 6:
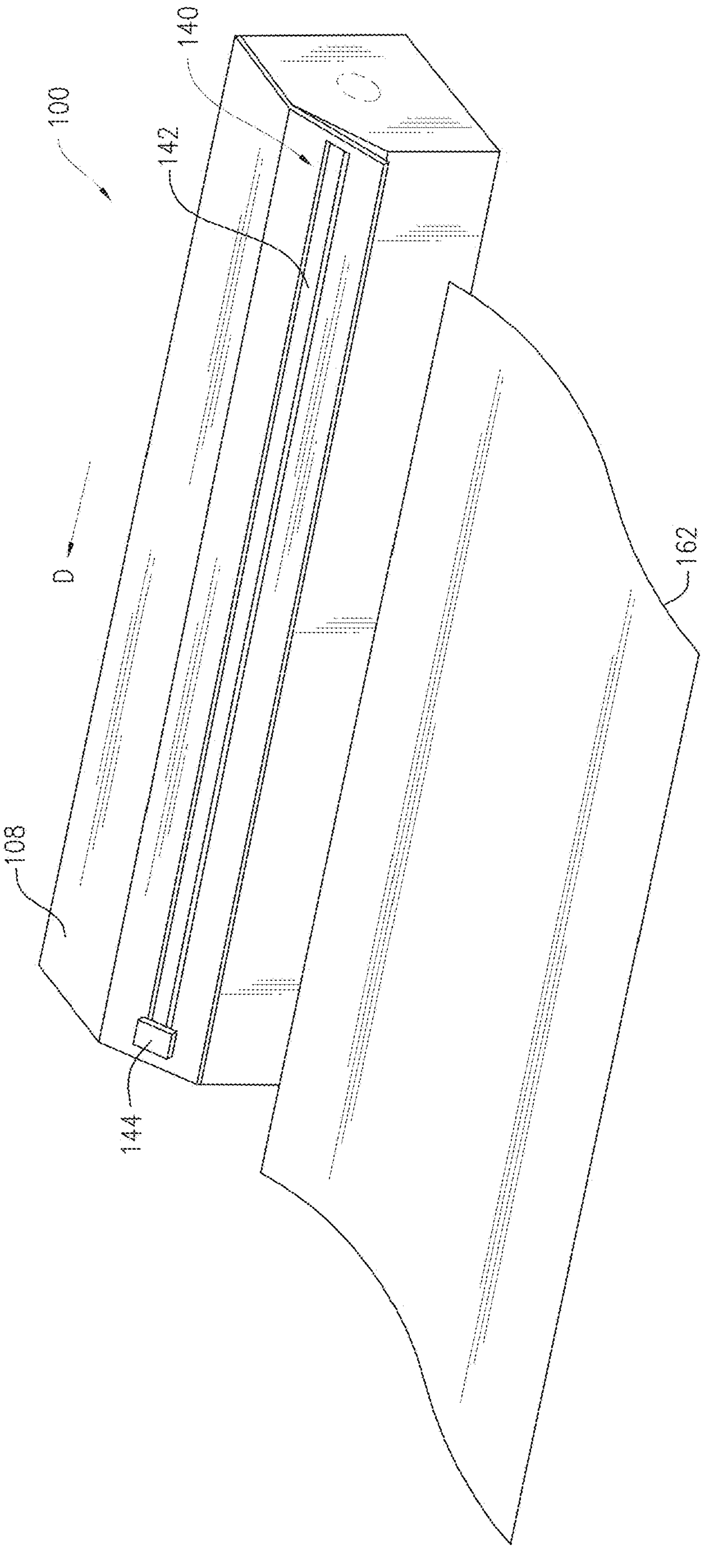
FIG. 6 is a perspective view of the roll-dispensed stock container of FIG. 5 after the cutter has been actuated to cut a section of the roll-dispensed stock.

FIGS. 4-6 show operation of the roll-dispensed stock container 100 according to the present disclosure. More specifically, FIG. 4 is a perspective view of the roll-dispensed stock container of FIG. 1 in an open configuration, thereby allowing for extension of the roll-dispensed stock 132 through the opening 138. FIG. 5 is a perspective view of the roll-dispensed stock container of FIG. 1 in a closed configuration including roll-dispensed stock dispensed from an opening. An end of the roll-dispensed stock 132 can be dispensed through the opening 138 until the desired length of the roll-dispensed stock 132 is achieved. The roll-dispensed stock 132 is positioned against the one or more fixation strips 114 disposed on the support wall 112. The lid 108 can then be closed, thereby positioning the slidable cutter 144 of the cutter assembly 140 adjacent to, or into contact with, the roll-dispensed stock 132. The cutter 144 can then be slid along the track 142 in the direction of arrow D to sever a sheet 162 from the remaining roll-dispensed stock 132. FIG. 6 is a perspective view of the roll-dispensed stock container of FIG. 1 in a closed configuration after the stock was cut by the cutter assembly.

Figure 7A:
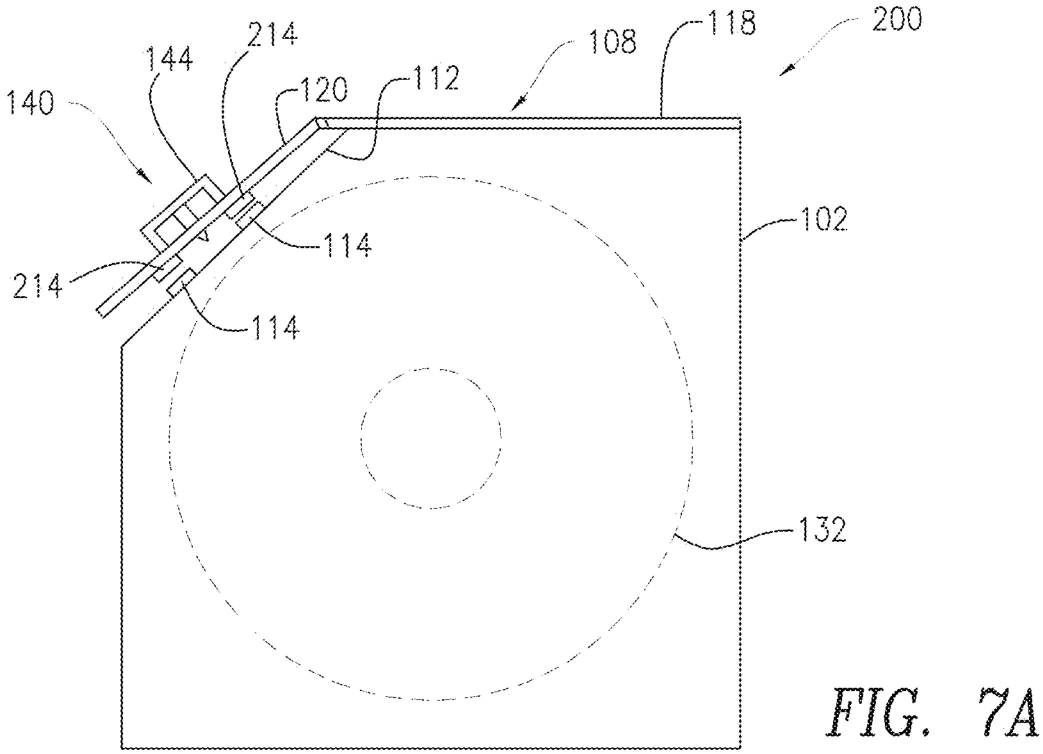
FIG. 7A is a side view of a roll-dispensed stock container according to the present disclosure including fixation strips on both a lid and a support wall of the roll-dispensed stock container.

FIGS. 7A-E are side views of roll-dispensed stock containers according to some aspects of the present disclosure showing additional exemplary configurations of fixation strips. The containers can be substantially similar in structure and function to the container 100, except for the distinctions noted herein. FIG. 7A shows a roll-dispensed stock container 200 including a body 102, a lid 108 having a first portion 118 and a second portion 120, a cutter assembly 140 having a slidable cutter 144, and fixation strips 114 disposed on a support wall 112 on either side of the slidable cutter 144. As shown in FIG. 7A, the container 200 could also include fixation strips 214 disposed on an underside (e.g., the side adjacent to support wall 112 and fixation strips 114) of the second portion of the lid 108 on either side of the slidable cutter 144. Accordingly, container 200 provides fixation strips on either side of the roll-dispensed stock 132 (not shown) as it is being cut in accordance with the steps described in connection with FIGS. 4-6.

Figure 7B:
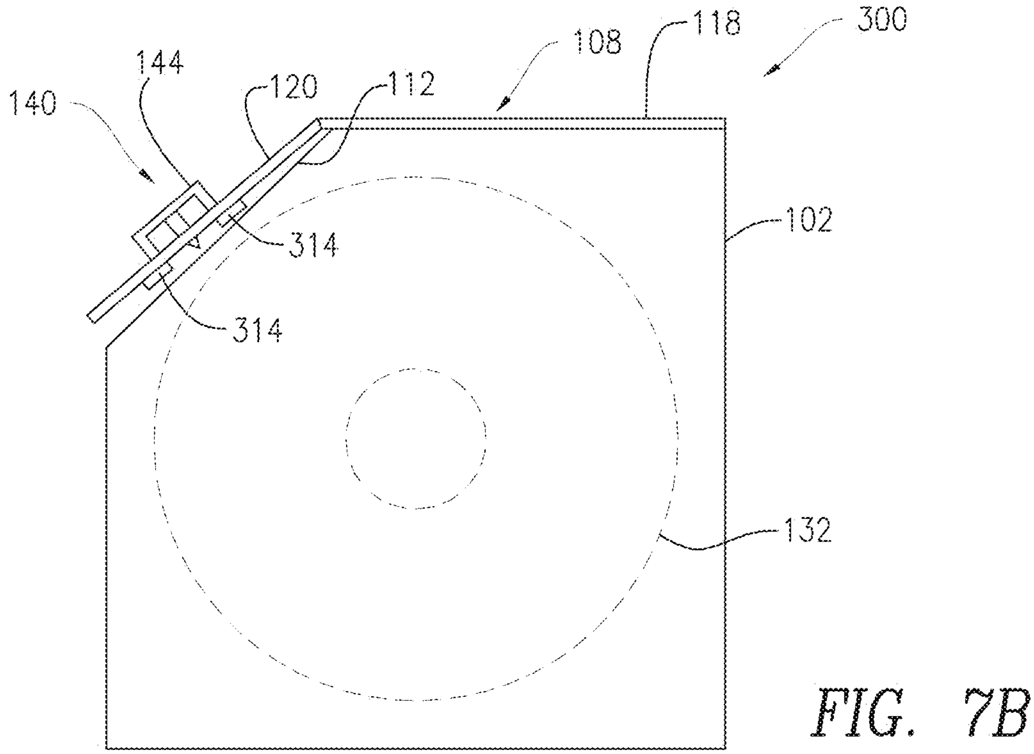
FIG. 7B is a side view of a roll-dispensed stock container according to the present disclosure including fixation strips on only the lid of the roll-dispensed stock container.

FIG. 7B shows a roll-dispensed stock container 300 according to another aspect of the present disclosure and includes a body 102, a lid 108 having a first portion 118 and a second portion 120, a cutter assembly 140 having a slidable cutter 144, and a support wall 112. As shown in FIG. 7B, the container 300 includes fixation strips 314 disposed on an underside (e.g., the side adjacent to support wall 112 and fixation strips 114) of the second portion of the lid 108 on either side of the slidable cutter 144.

Figure 7C:
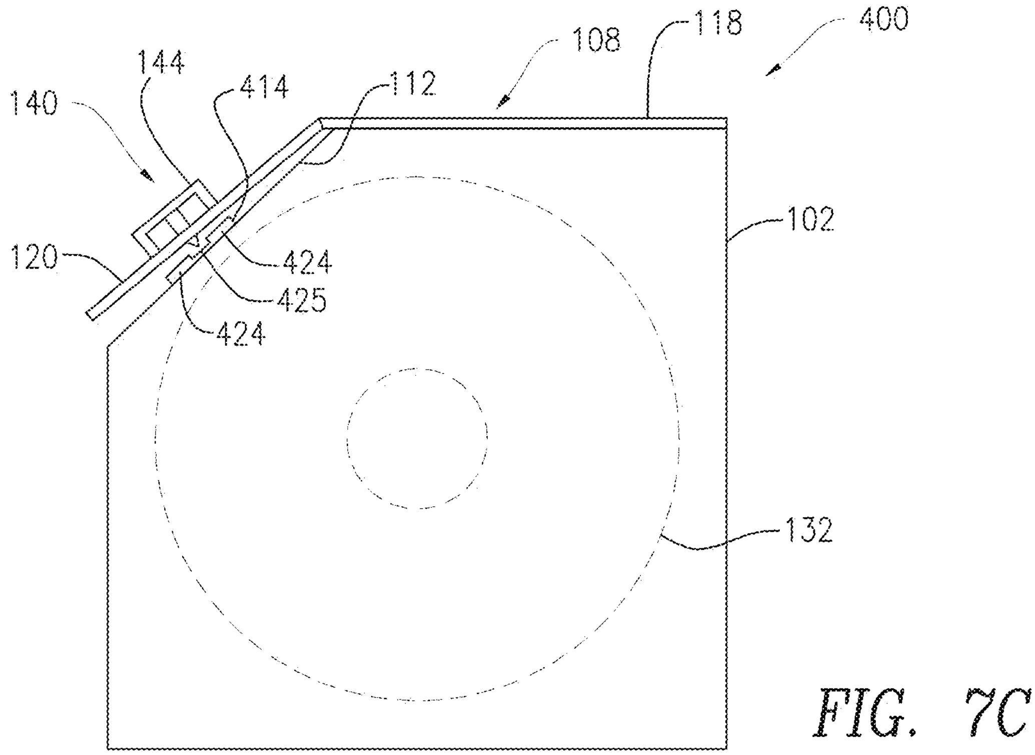
FIG. 7C is a side view of a roll-dispensed stock container according to the present disclosure including a single fixation strip having a recessed center portion positioned on the support wall of the roll-dispensed stock container.

FIG. 7C shows a roll-dispensed stock container 400 according to another aspect of the present disclosure and includes a body 102, a lid 108 having a first portion 118 and a second portion 120, a cutter assembly 140 having a slidable cutter 144, and a support wall 112. As shown in FIG. 7C, in place of one or more fixation strips 114, the container 400 could include a single fixation strip 414 disposed on the support wall 112 having a central recessed portion 425 between two raised portions 424 extending on either side of the slidable cutter 144. Further, the fixation strip 414, and more specifically the raised portions 424, could be configured and dimensioned such that the blade of the slidable cutter 144 passes between the raised ridges 424 when cutting the roll-dispensed stock 132, but does not contact or cut into recessed portion 425 or the support wall 112 thereunder.

Figure 7D:
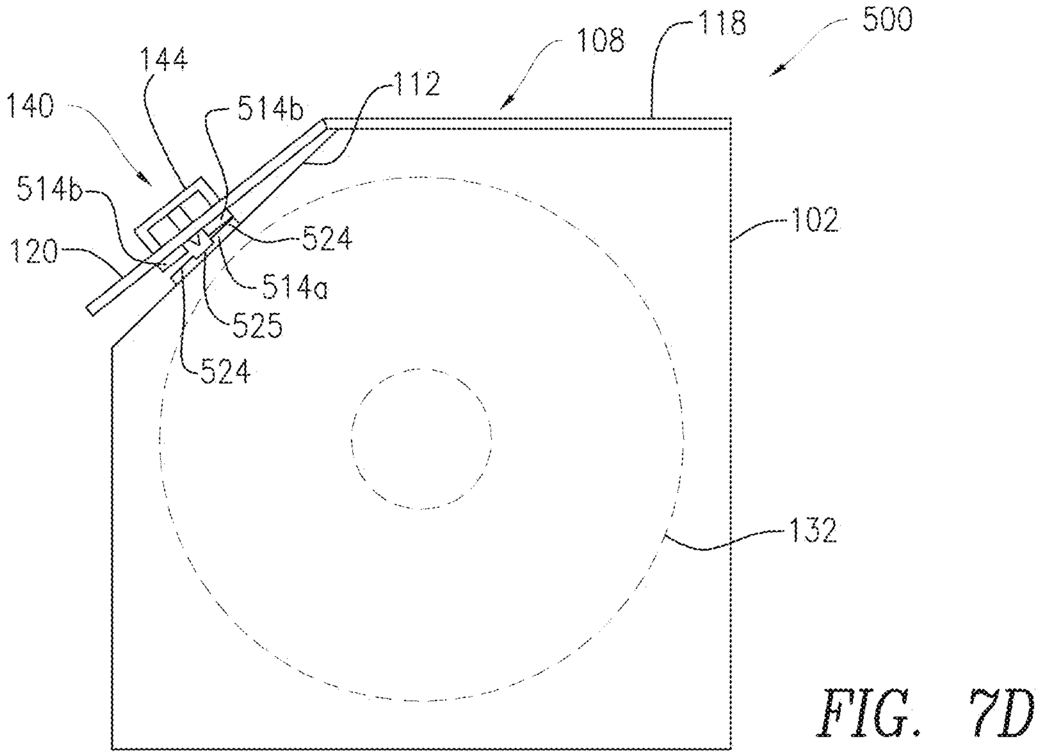
FIG. 7D is a side view of a roll-dispensed stock container according to the present disclosure including fixation strips positioned on the lid of the roll-dispensed stock container and a single fixation strip having a recessed center portion positioned on the support wall of the roll-dispensed stock container.

FIG. 7D shows a roll-dispensed stock container 500 including a body 102, a lid 108 having a first portion 118 and a second portion 120, a cutter assembly 140 having a slidable cutter 144, and a support wall 112. As shown in FIG. 7D, the container 500 could include a single fixation strip 514*a* disposed on the support wall 112 and having a recessed central portion 525 between raised portions 524 extending on either side of the slidable cutter 144. The container 500 could also include one or more fixation strips 514*b* disposed on an underside (e.g., the side adjacent to the support wall 112 aligned with fixation strip 514*a*) of the second portion of the lid 108. Accordingly, container 500 provides fixation strips on either side of the roll-dispensed stock 132 (not shown) to retain and tension the stock as it is being cut.

Figure 7E:
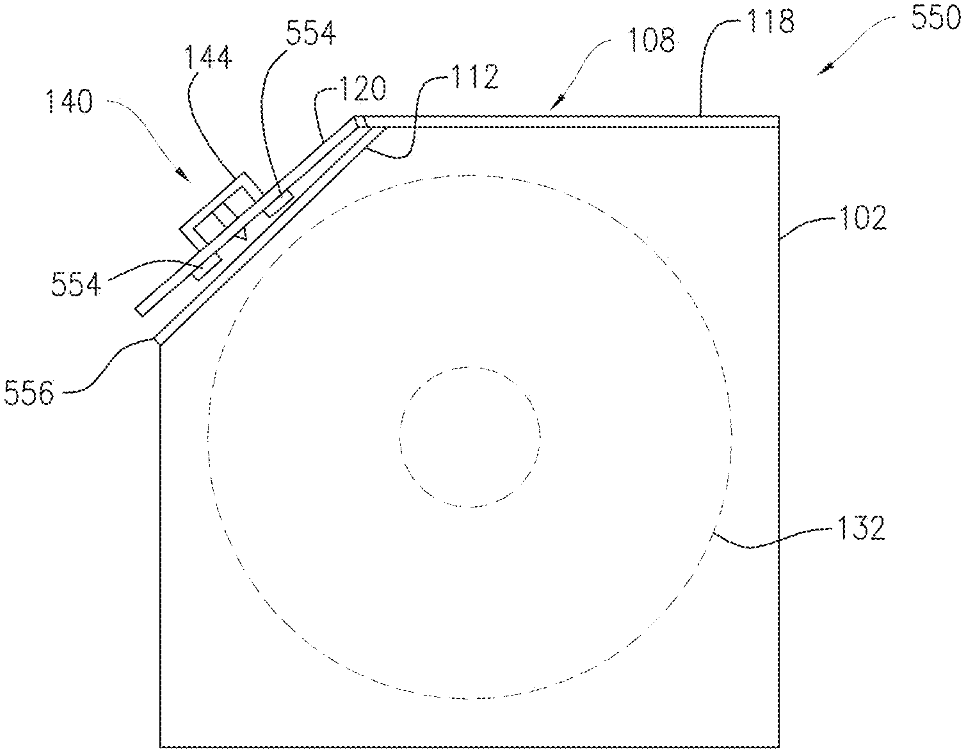
FIG. 7E is a side view of a roll-dispensed stock container according to the present disclosure including a coating on the support wall of the roll-dispensed stock container.

FIG. 7E shows a roll-dispensed stock container 550 including a body 102, a lid 108 having a first portion 118 and a second portion 120, a cutter assembly 140 having a slidable cutter 144, and a support wall 112. As shown in FIG. 7E, the support wall 112 can be provided with a low-tack coating 556 for maintaining the position of the roll-dispensed stock 132 during cutting. The coating 556 can be made out of any material suitable for securely and removably holding the roll-dispensed stock 132 while it is being cut. The material used for the coating 556 can be selected based on the properties of the roll-dispensed stock material. In one example, if the roll-dispensed stock 132 is plastic wrap, foil, wax paper, parchment paper, or wrapping paper, the coating 556 could be made of a silicone material, flexible polymer, or another material that provides light tack or clings to the roll-dispensed stock 132. The coating 556 could also be made of a low-tack adhesive (e.g., fugitive, "booger," or "credit card" glue), an ultraviolet (UV) light curing adhesive, a wax, a tacky material, or any other material suitable for securely and removably holding or gripping the roll-dispensed stock 132. The coating 556 could cover a portion of support wall 112 or could cover its entire surface. According to some aspects of the present disclosure, the coating 556 could be formed from a material that is resiliently deformable upon application of force to the cutter assembly 140 and/or lid 108.

As shown in FIG. 7E, the container 550 can also include a second coating (not shown) and/or one or more fixation strips 554 disposed on an underside (e.g., the side adjacent to the support wall 112 having coating 556) of the second portion of the lid 108. Accordingly, container 550 can grip one or both sides of the roll-dispensed stock 132 (not shown) with coating(s) 556 and/or the fixations strips 554, to retain and tension the stock as it is being cut. For example, according to some aspects of the present disclosure, a wax or UV material coating can be applied to the entire surface of support wall 112, or a portion thereof, or could be applied to a bottom surface of lid portion 120, opposite the support wall 112. The wax or UV material coating can be used in place of, or in combination with the fixation strips 114. For example, the wax or UV material coating can be applied to the bottom surface of lit portion 120 and the fixation strips 554 can be applied to the support wall 112, or vice versa. The wax or UV material coating can also be used in in combination with any of the configurations of fixation strips disclosed herein.

Figure 8:
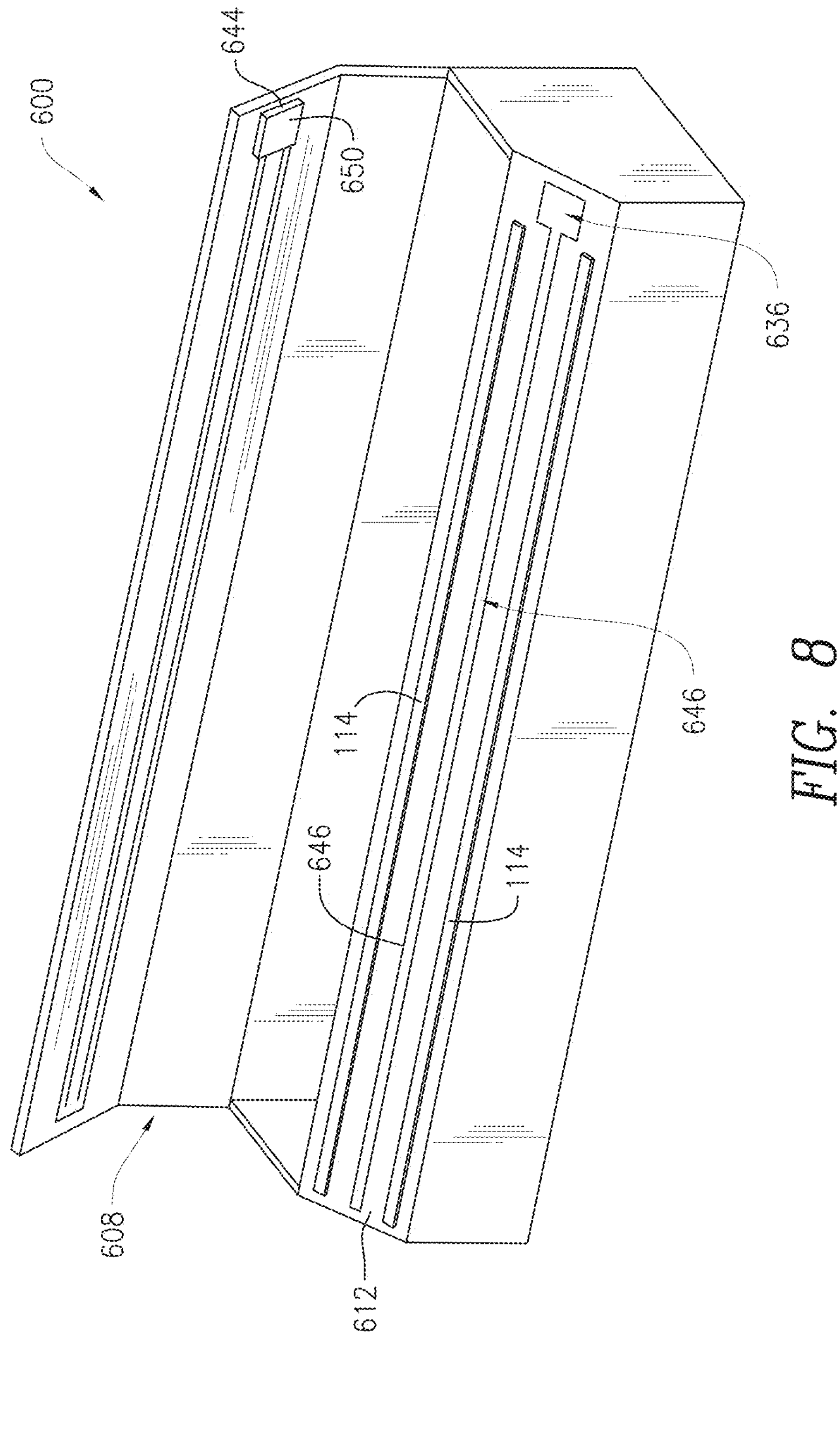
FIG. 8 is a perspective view of another aspect of a roll-dispensed stock container in an open configuration having a slot in the support wall for receiving a lower portion of a slidable cutter.
Figure 9:
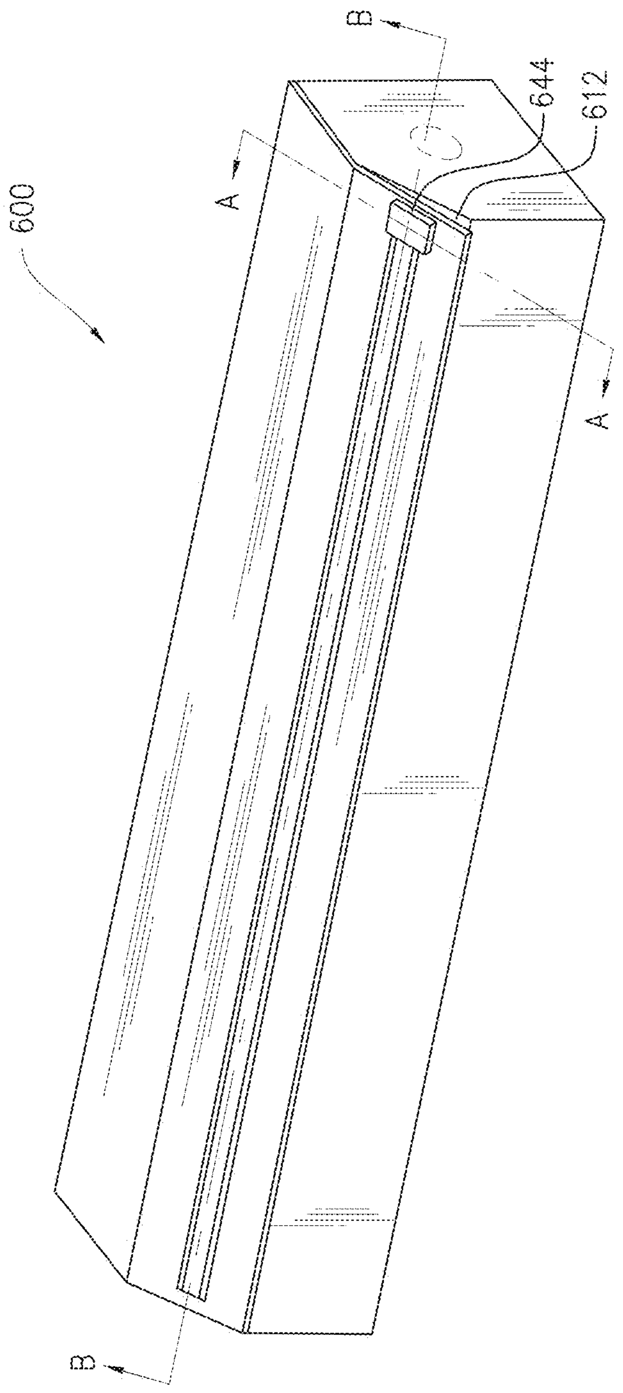
FIG. 9 is a perspective view the roll-dispensed stock container of FIG. 8 in a closed configuration.

FIGS. 8-11B show an exemplary roll-dispensed stock container 600 (hereinafter "container 600") in accordance with some aspects of the present disclosure. Container 600 can be substantially similar in structure and function to the container 100, except for the distinctions noted herein. FIG. 8 is a perspective view of the container 600 in an open configuration and FIG. 9 is a perspective view of the container 600 in a closed configuration. Container 600 includes an aperture 636 for receiving and retaining a base portion 650 of the slidable cutter 644 (see FIGS. 10A-11B), to allow the base portion 650 to move through and extend under a support wall 612. As shown in FIG. 8, the aperture 636 has a slot 646 extending from the aperture 636 and along the support wall 612. This results in an internal blade on the cutter assembly, as the blade is positioned between to the lid 608 and the base portion 650. This configuration also allows for the application of constant and consistent pressure during the cutting process.

Figure 10A:
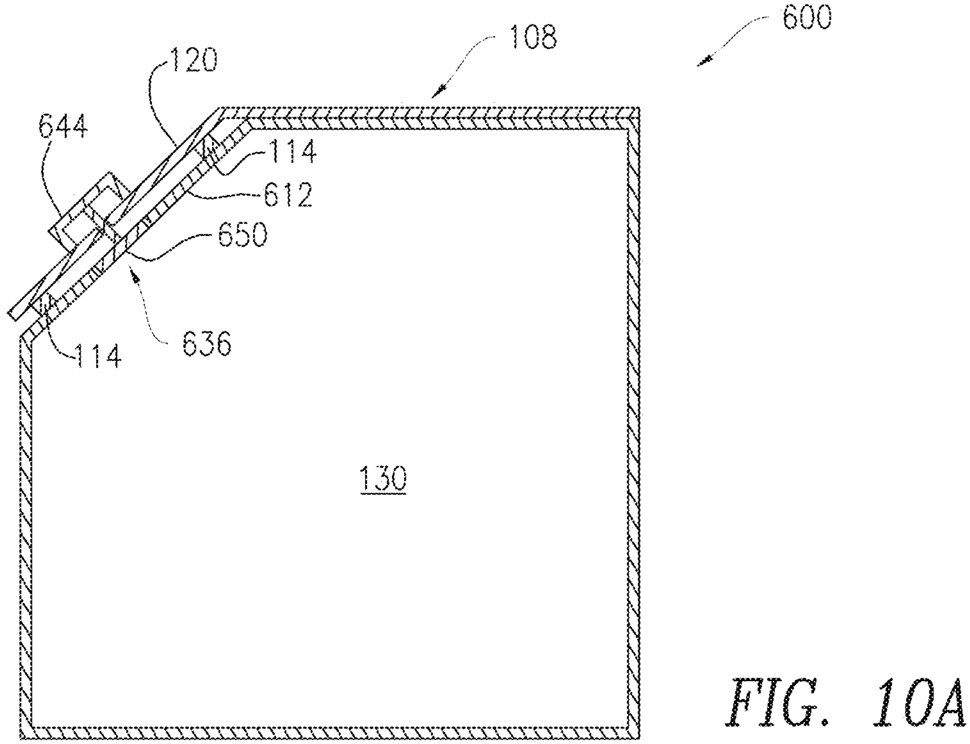
FIG. 10A is a cross-sectional view (taken along line A-A of FIG. 9) of the roll-dispensed stock container of FIG. 9 showing the lid in a first position.
Figure 10B:
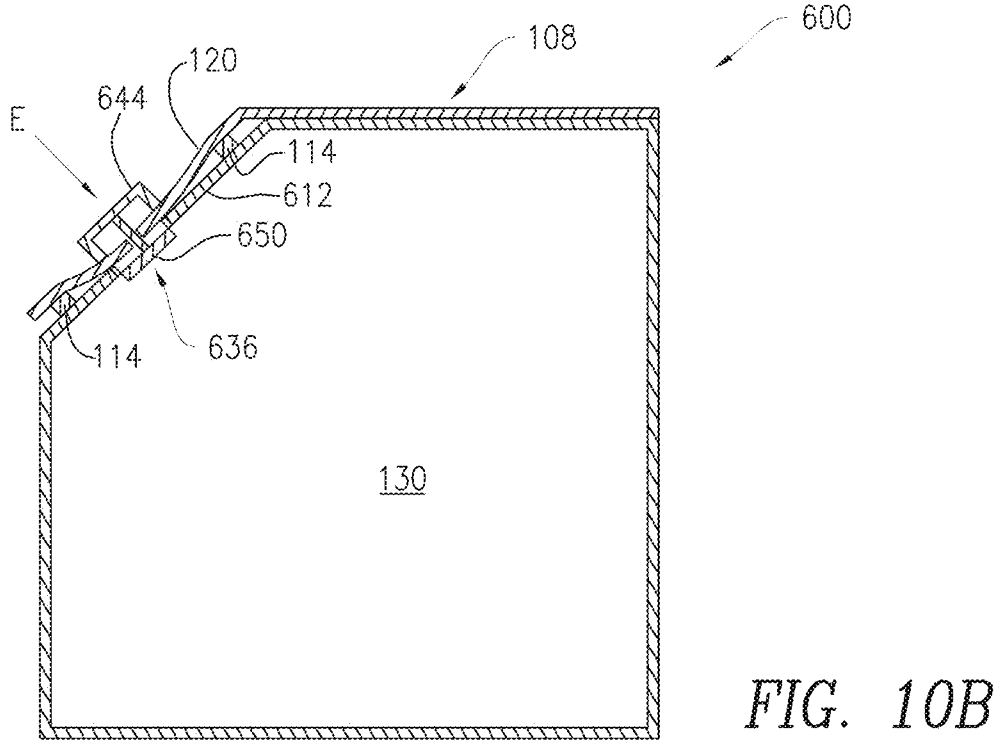
FIG. 10B is a cross-sectional view (taken along line A-A of FIG. 9) of the roll-dispensed stock container of FIG. 9 showing the lid in a second deformed position upon application of force thereto.
Figure 11A:
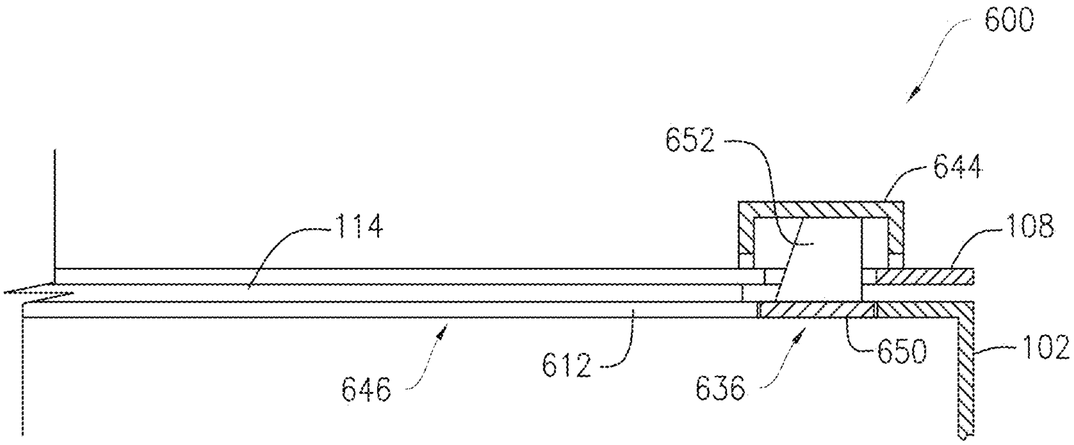
FIG. 11A is a partial cross-sectional view (taken along line B-B of FIG. 9) of the roll-dispensed stock container of FIG. 9 in a first position.
Figure 11B:
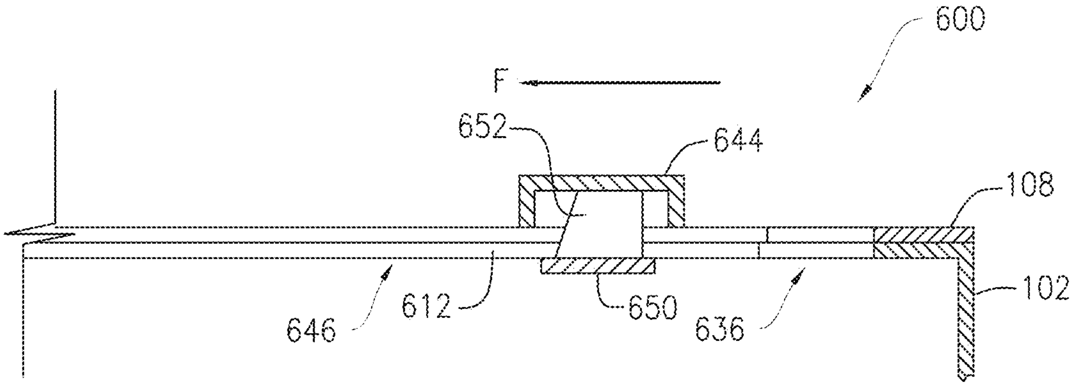
FIG. 11B is a partial cross-sectional view (taken along line B-B of FIG. 9) of the roll-dispensed stock container of FIG. 9 in a second position showing operation of the cutter assembly.

FIGS. 10A and 10B are cross-sectional views (taken along line A-A of FIG. 9) of container 600 and FIGS. 11A and 11B are partial cross-sectional views (taken along line B-B of FIG. 9) of container 600. As shown in FIGS. 10A and 11A, the base 650 of the slidable cutter 644 protrudes below the second portion 120 of the lid 108, but does not fully extend through the aperture 636 (e.g., into enclosure 130) in normal operation (e.g., during storage or transportation). However, as shown in FIG. 10B, upon application of force to engagement face 664 in the direction of arrow E, the second portion 120 of lid 108 is elastically deformed so that the base 650 of the slidable cutter 644 fully extends through the aperture 636. As shown in FIG. 11B, once force has been applied to engagement face 664 in the direction of arrow E and the base 650 of the slidable cutter 644 is fully extended through the aperture 636, the slidable cutter 644 can be moved along elongated track 642 in the direction of arrow F. Notably, the slot 646 extending from aperture 636 can be dimensioned to accommodate a blade 652 of the slidable cutter 644 passing therethrough, but also to retain the base 650 of the slidable cutter 644, thereby preventing the second portion 120 of the lid 108 from returning to its original position. Accordingly, once force is applied in the direction on arrow E and the slidable cutter is moved in the direction of arrow F, pressure is maintained between the one or more fixation strips 114 and the second portion 120 of the lid 108, with the roll-dispensed stock 132 disposed therebetween (not shown). As such, pressing the engagement face 664, and thereby cutter base 650, into the position shown in FIG. 10B maintains the pressure of the roll-dispensed stock against the fixation strips as well as tensioning the roll-dispensed stock. This allows the slidable cutter to more easily and cleanly cut therethrough without a user being required to maintain pressure on the lid 108.

Figure 12:
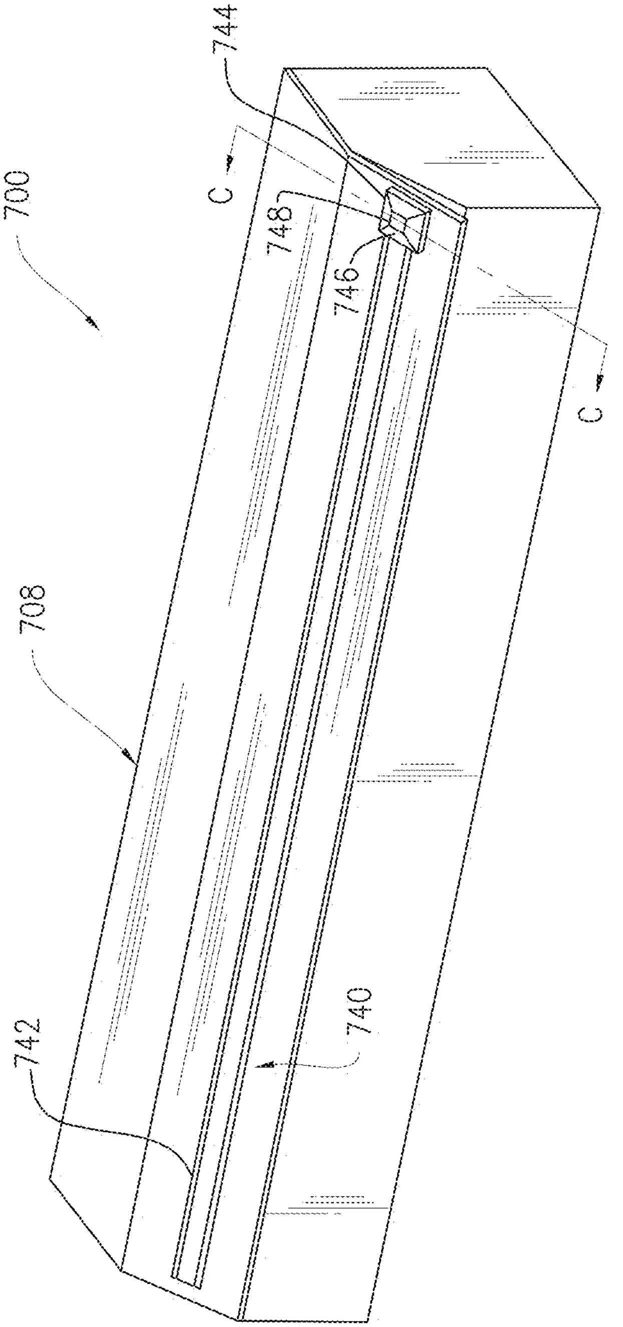
FIG. 12 is a perspective view of another aspect of a roll-dispensed stock container in a closed configuration having a slidable cutter with a recessed blade.
Figure 13A:
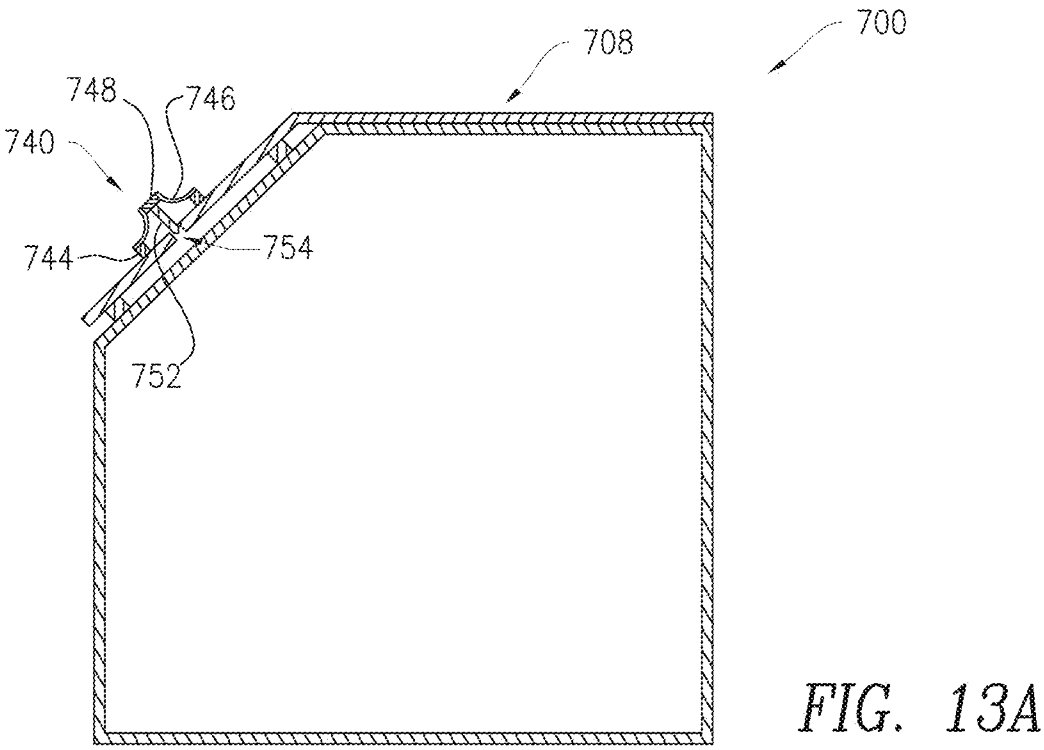
FIG. 13A is a cross-sectional view (taken along line C-C of FIG. 12) of the roll-dispensed stock container of FIG. 12 showing the slidable cutter in a first position.
Figure 13B:
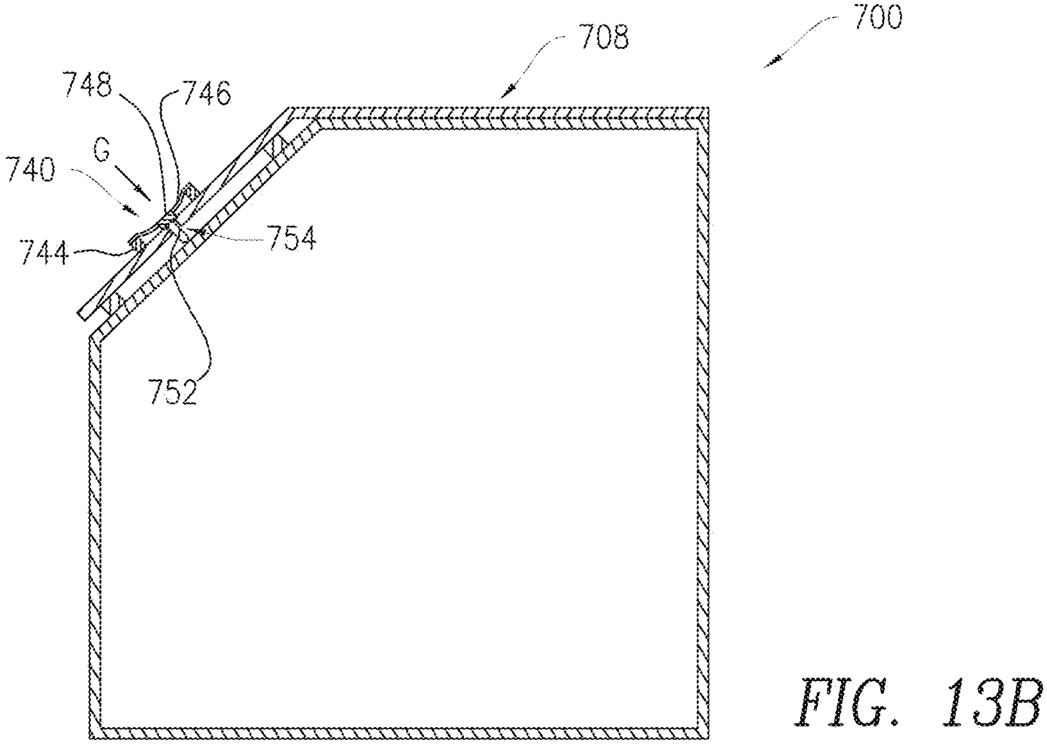
FIG. 13B is a cross-sectional view (taken along line C-C of FIG. 12) of the roll-dispensed stock container of FIG. 12 showing the slidable cutter in a second extended position by application of force thereto.

FIGS. 12-13B show an exemplary roll-dispensed stock container 700 (hereinafter "container 700") in accordance with some aspects of the present disclosure. Container 700 can be substantially similar in structure and function to the container 100, except for the distinctions noted herein. FIG. 12 is a perspective view of the container 700 in a closed configuration. Container 700 could include a lid 708 having a cutter assembly 740 disposed thereon, the cutter assembly 740 having an elongated track 742, a slidable base 744, a resiliently deformable skirt 746, a button 748, and a blade 752. The slidable base 744 can be engaged with the track 742 so as to slide thereon. The resiliently deformable skirt could be coupled to, and provided between, the slidable base 744 and the button 748 and is configured to bias the button 748 in a direction extending away from an exterior side of the lid 708 and slidable base 744. Skirt 746 can be formed from any material, for example, rubber or plastic, that is elastically deformable and capable of providing a bias force between the button 748 and slidable base 744. A blade 752 can be coupled to an underside of the button 748 and can extend into, but not beyond, an elongated slot 754 in the lid 708 (see FIGS. 13A and 13B).

FIGS. 13A and 13B are cross-sectional views (taken along line C-C of FIG. 12) of container 700 showing operation of the cutter assembly 740. As shown in FIG. 13A, the blade 752 of the cutter assembly 740 does not fully extend through the elongated slot 754 of the lid 708 in normal operation (e.g., during storage or transportation). The recessed blade is a safety feature, as it renders the blade unable to contact or cut anything, or anyone, until the container is closed and the cutter is actuated by pressure on the button. As shown in FIG. 13B, upon application of force to button 748 in the direction of arrow G, the skirt 746 is elastically deformed so that the button travels towards the lid 708 and the blade 752 fully extends through the elongated slot 754. Once force has been applied in the direction of arrow G and the blade is fully extended through the elongated slot 754, the slidable base 744 can be moved along elongated track 742, thereby separating a portion of the roll-dispensed stock from the roll. Upon removal of the force from button 748, the button 748 and blade 752 return to their positions as shown in FIG. 13A.

Figure 14:
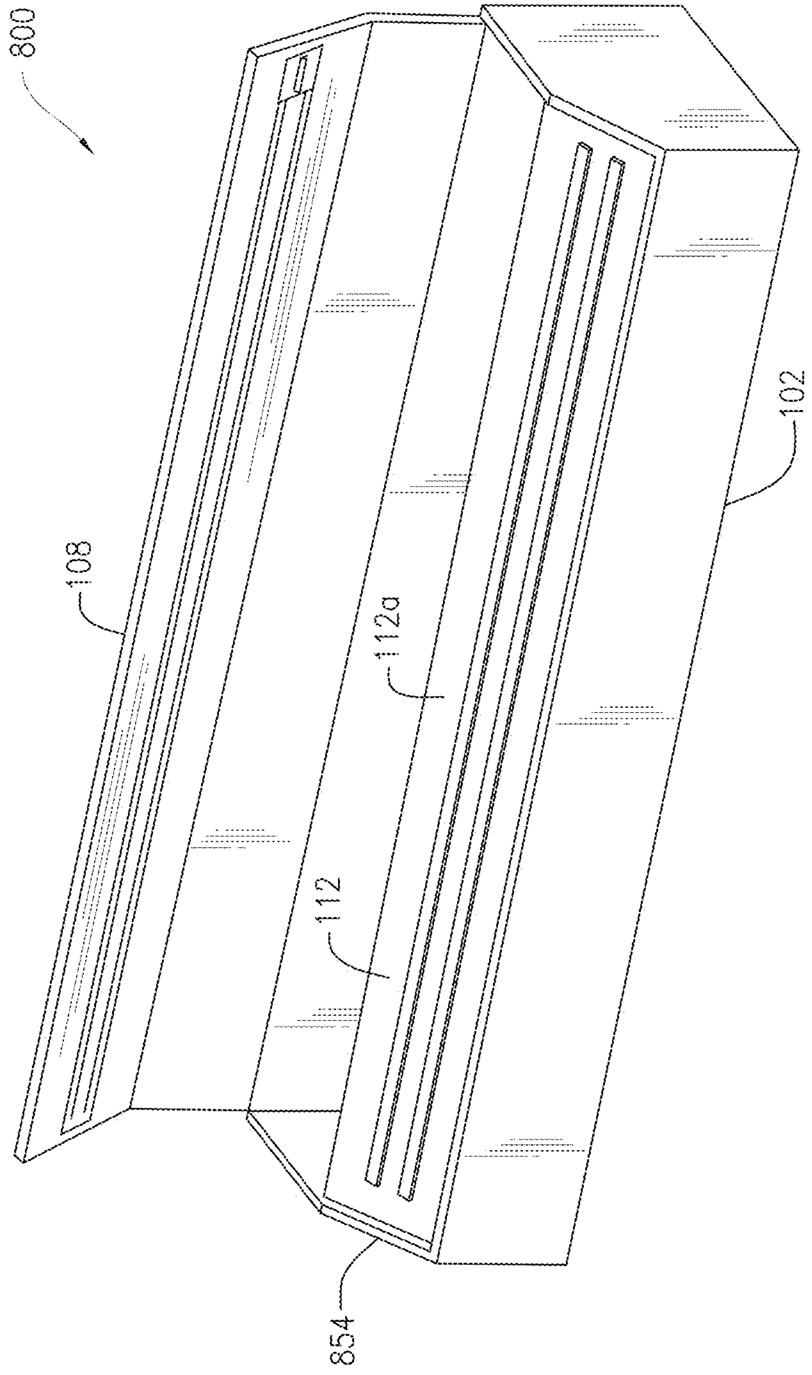
FIG. 14 is a perspective view of a roll-dispensed stock container in an open configuration according to the present disclosure including a snap-fit lid.
Figure 15:
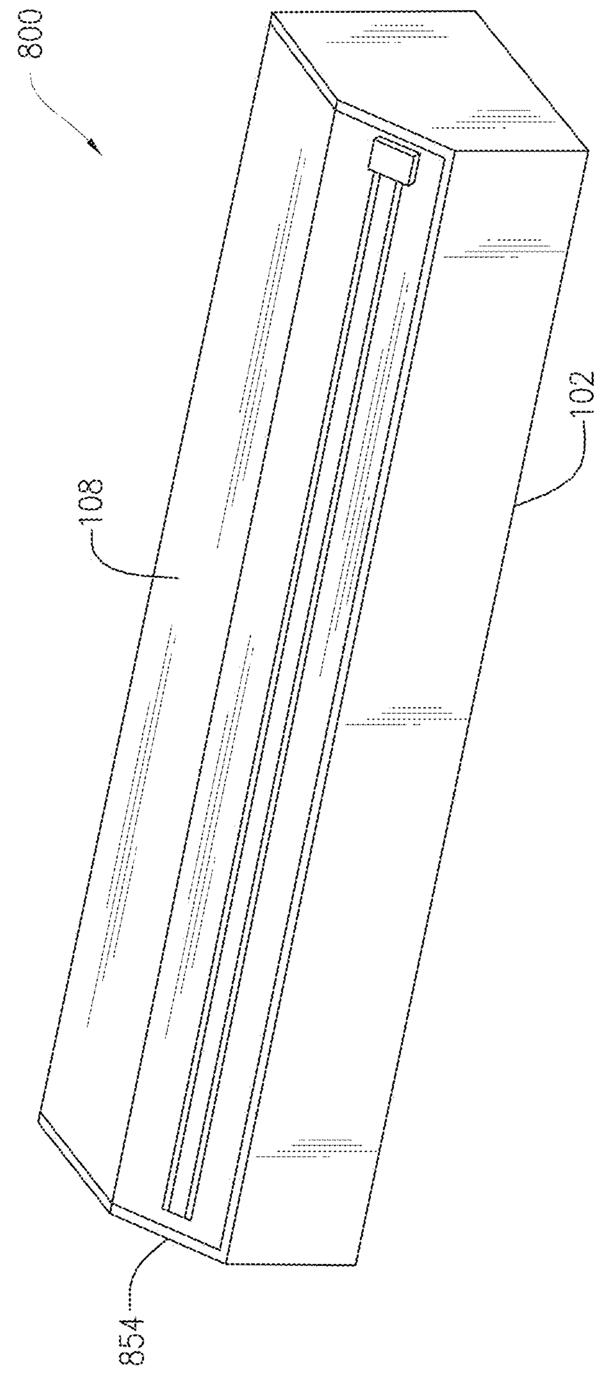
FIG. 15 is a perspective view the roll-dispensed stock container of FIG. 8 in a closed configuration.

FIGS. 14 and 15 show an exemplary roll-dispensed stock container 800 (hereinafter "container 800") in accordance with some aspects of the present disclosure. Container 800 can be substantially similar in structure and function to the container 100, except for the distinctions noted herein. Therefore, like reference numbers represent like structures. FIG. 14 is a perspective view of container 800 in an open configuration according to the present disclosure including a snap-fit lid and FIG. 15 is a perspective view container 800 in a closed configuration. As shown in FIG. 14, the body 102 of container 800 includes a lip 854 protruding therefrom for receiving lid 108 in snap-fit engagement, or the like. As shown in FIG. 15, the lip 854 could completely surround the lid 108. The container 800 could be formed from plastic or any other material known to those of ordinary skill in the art that is suitably rigid and durable for receiving and dispensing roll-dispensed stock and that is capable of being configured with a body and lid being in snap-fit engagement. According to further aspects of the present disclosure, the container of the present disclosure can vary in shape and can include a face that is overlaid by a lid with a cutter. The face can be on the support surface, described hereinabove, or on a vertical front wall, an angled wall, or a horizontal upper wall. The lid can have one or more portions and the cutter overlies the face. The roll-dispensed stock is positioned between the lid and the face and is retained and/or tensioned by one or more fixation strips for cutting.

Figure 16:
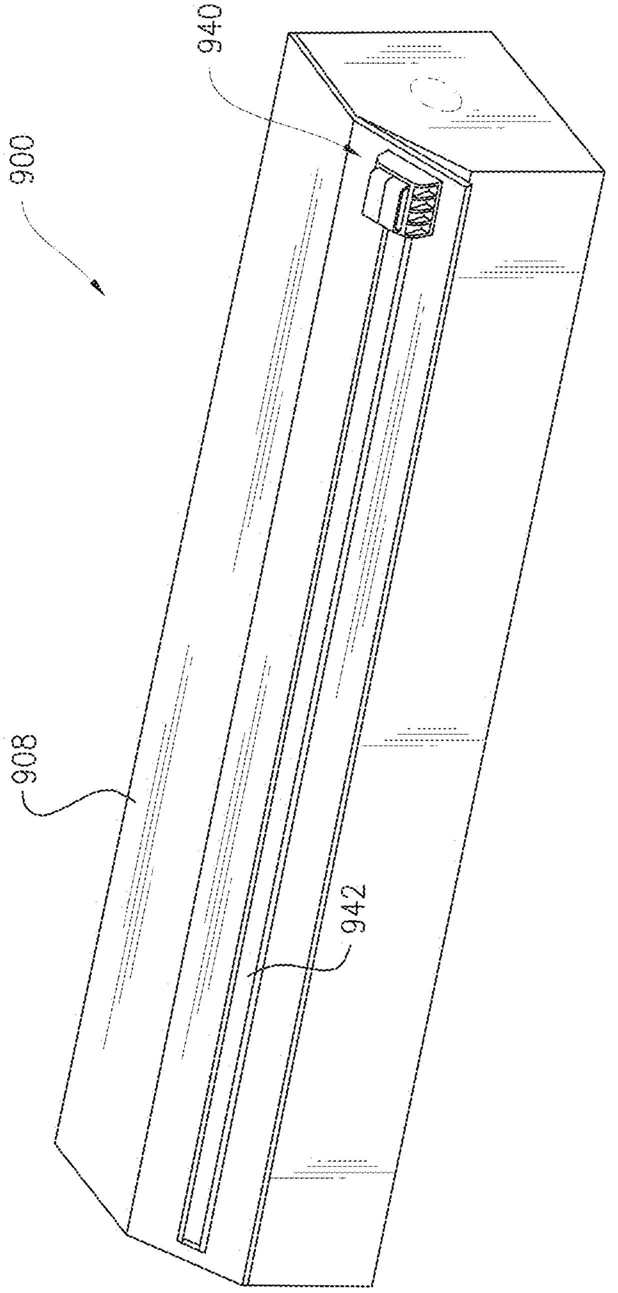
FIG. 16 is a perspective view of a roll-dispensed stock container in a closed configuration having a slidable cutter assembly with a retractable blade.
Figure 17A:
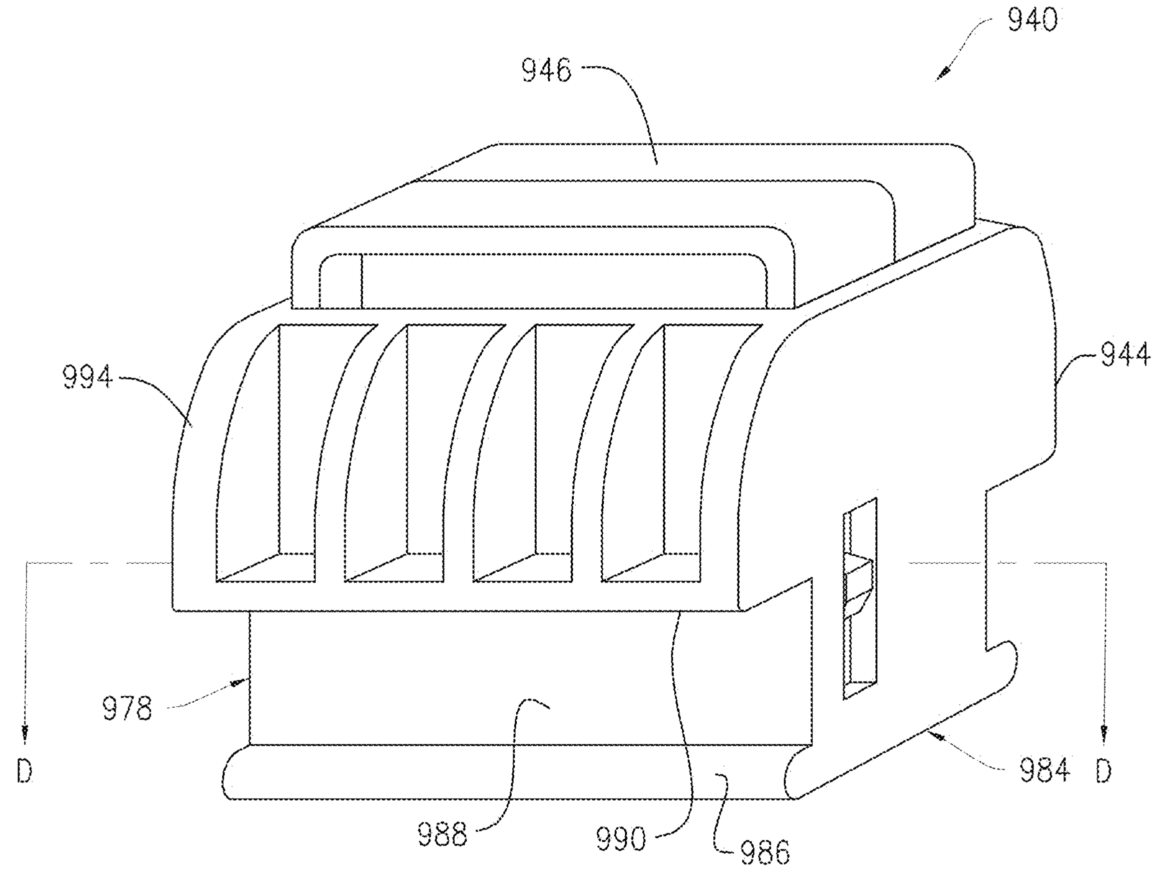
FIG. 17A is a perspective view of the cutter assembly of FIG. 16.

FIG. 16 is a perspective view of a roll-dispensed stock container 900 in accordance with aspects of the present disclosure. Container 900 can be substantially similar in structure and function to container 700 or other containers discussed herein or otherwise known or developed. Container 900 includes a lid 908 having an elongated slot 942 with a slidable cutter assembly 940 disposed therein. FIG. 17A is a perspective view of the slidable cutter assembly 940, which includes a slidable base 944 and an actuating button 946. The base 944 includes a bottom surface 984, having edges 986, recessed sidewalls 988, and shoulders 990 forming base channels 978. The edges 986 and shoulders 990 are positioned above and below the container lid 908 when the cutter assembly 940 is positioned in the slot 942, the recessed side walls 988 bearing against the slot edges to keep the cutter assembly 940 slidably engaged in the slot 942. Slot 974 in end wall 992 accommodates stop tab 976 from actuating button 946 as will be described. Shoulder 990 can overhang the recessed sidewalls 988 and can be supported with buttresses 994.

Figure 17B:
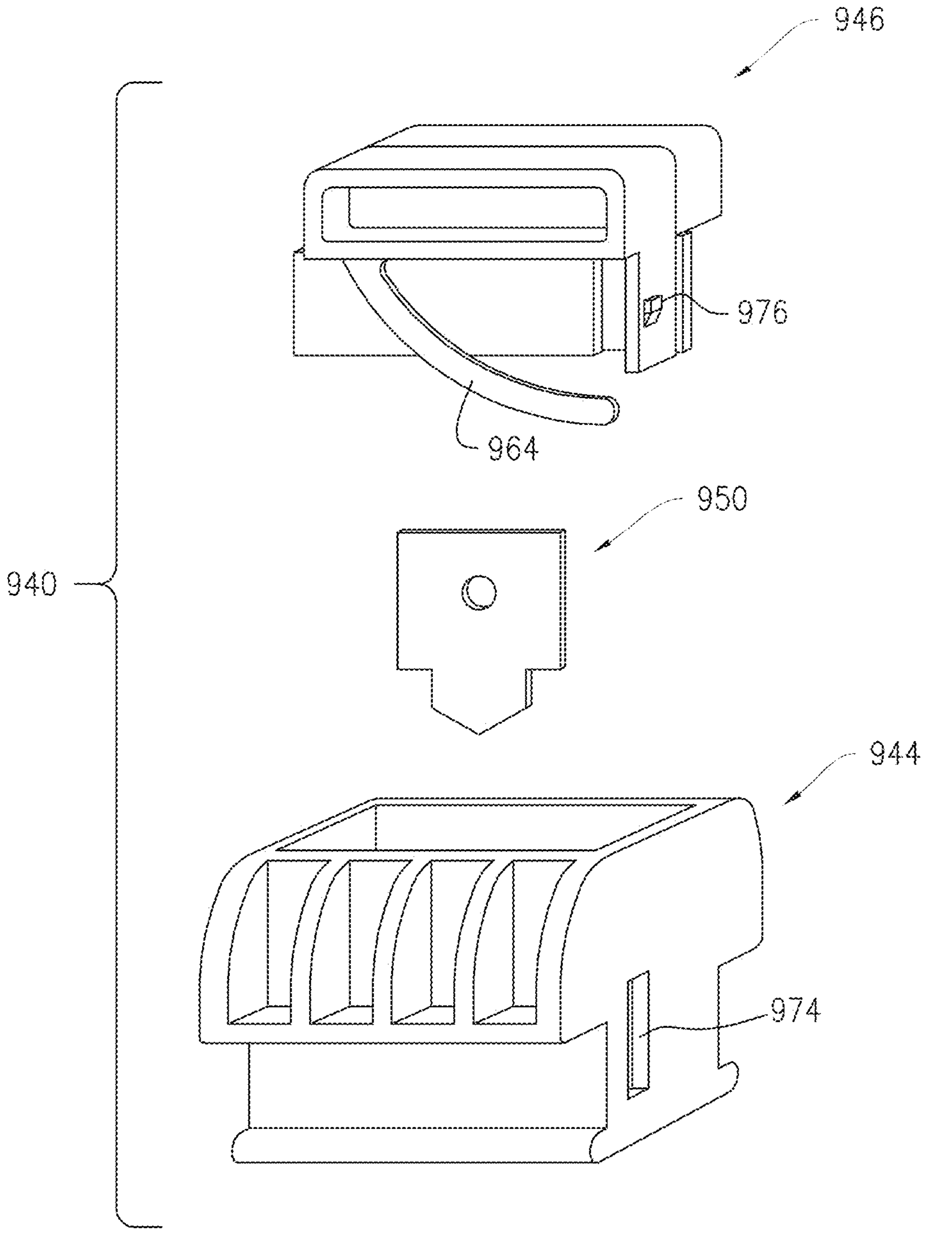
FIG. 17B is an exploded view of the cutter assembly of FIG. 17A.

FIG. 17B is an exploded view of the slidable cutter assembly 940 shown in FIG. 17A showing the base 944, a cutting blade 950 and the actuating button 946. The actuating button can be biased such as by a leaf spring 964. Stop tab 976 can be seen on the side of the button 946 which rides in slot 974 in base 944.

Figure 18:
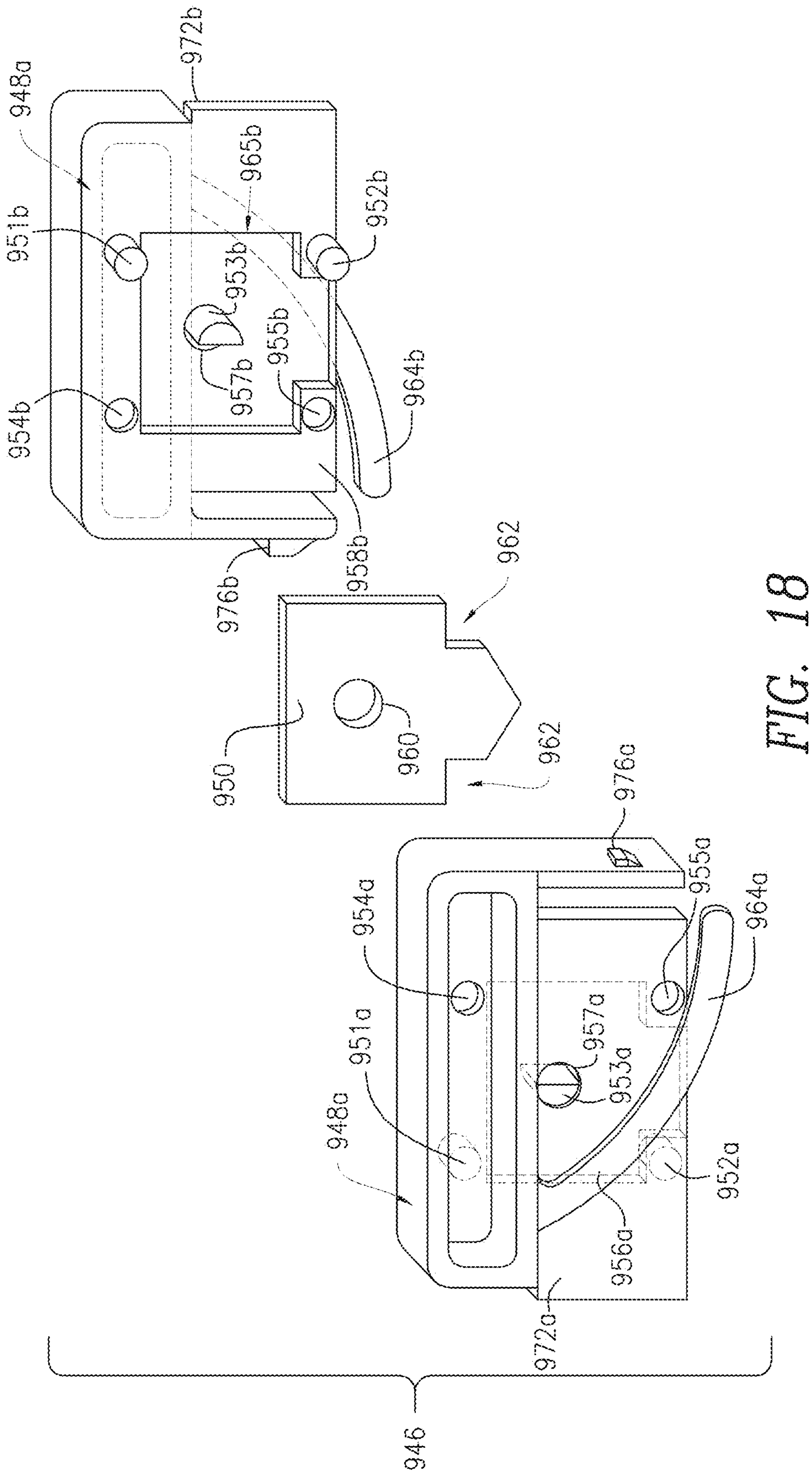
FIG. 18 is an exploded view of an actuating button of the cutter assembly of FIG. 17A.

FIG. 18 is an exploded view of the actuating button 946 of the slidable cutter assembly 940. As shown in FIG. 18, the spring button 946 can include a first button component **948*a*, a second button component 948*b*, and a blade 950. According to some aspects of the present disclosure, the first and second button components 948 can be substantially identical. For example, button component 948*a* can include one or more posts 951*a*, 952*a*, and 953*a* and receptacles 954*a*, 955*a*, and 957*a* on a rear face 958*a* thereof and button component 948*b* can include one or more posts 951*b*, 952*b*, and 953*b* and receptacles 954*b*, 955*b*, and 957*b* on a rear face 958*b* thereof. As shown in FIG. 18, posts 951*a*, 952*a*, and 953*a* on the first button component 948*a* are sized to be received by receptacles 954*b*, 955*b*, and 957*b* on the second button component 948*b* and posts 951*b*, 952*b*, and 953*b* on the second button component 948*b* are sized to be received by receptacles 954*a*, 955*a*, and 957*a* on the first button component 948*a*, thereby engaging the first button component 948*a* and the second button component 948*b* in a locking arrangement. The posts and receptacles can be provided in various configurations. For example, the posts and receptacles can have circular cross-sections (e.g., posts 951*a* and 952*a* and receptacles 954*a* and 955*a*), semi-circular cross-sections (e.g., post 953*a* and receptacle 957*a*), or a combination thereof, as shown in FIG. 18. Of course, the first and second button components 948 need not be identical. For example, according to some aspects of the present disclosure, the first button component 948*a* can be formed to only include posts, whereas the second button component 948*b* can be formed to only include receptacles, or vice versa. The button components 948 can be put together and held together by friction, adhesive, or otherwise to form the actuating button. Alternatively, the button assembly 946 could be a one-piece construction or otherwise configured. The stop tabs 976 can be formed on deformable walls 996 that can deflect when the actuating button 946 is inserted into the base 944 and return to their original position when the stop tabs 976 are seated in slots 974, thereby securing the actuating button 946 within the base 944**.

Engaged with the actuating button 946 is the blade 950, which can be actuated to move with the actuating button 946 and with respect to the base of the cutter assembly. Each of the first and second button components 948 can be provided with a receiving area 956 on rear walls 958 of the button components that is sized and shaped for receiving the blade 950. The receiving area 956 could be recessed into the rear face 958, the blade could be sandwiched between the button components, or otherwise attached to the actuating button 946. Additionally, the blade 950 can include one or more apertures 960 configured to receive one or more posts to secure the blade 950 relative to the button components 948. For example, as shown in FIG. 18, the aperture 960 of the blade 950 is configured to receive one or both of the posts 953*a* and 953*b* from the first and second button components 948. The blade 950 can be further constrained within the actuating button, such as by one or more posts which can be arranged about the perimeter of the blade 950 to further secure the blade relative to the button components 948. For example, as shown in FIG. 18, posts 952*a* and 952*b* on each of the first and second button components 948 are arranged directly adjacent to recesses 962 on the body of the blade 950.

The actuating button 946 and blade 950 can be biased in a retracted position and moved to an extended position for cutting by overcoming the force of the bias. For example, the actuating button 946 can be provided with leaf springs 964 that are configured to bias the spring button 946 in a direction extending away from the base 944. The leaf springs 964 can be formed integral with, or the springs can be inserted into or otherwise attached to, each of the first and second button components 948 and positioned within the button components 948. According to other aspects of the present disclosure, the leaf springs 964 can be replaced, or supplemented, with other biasing means such as metal leaf springs, coil springs, plastic hoops, “U”-shaped springs, and the like. Of course, any biasing mechanism configured to bias the button 946 in a direction extending away from the base 944, can be used without departing from the spirit and scope of the present disclosure, including resilient material, a compressible material, or the like. According to some aspects of the present disclosure, the button 946, leaf springs 964, and sliding base 944 are all formed from plastic. The button 946, leaf springs 964, and sliding base 944 can also be formed from any other material that is suitably durable and that can provide a suitable biasing force, such as for example, metal or rubber. The blade 950 can be of any suitable shape and formed from metal or from any other material that is suitable for cutting foil, paper, plastic, or any of the various forms of roll-dispensed stock discussed herein.

Figure 19A:
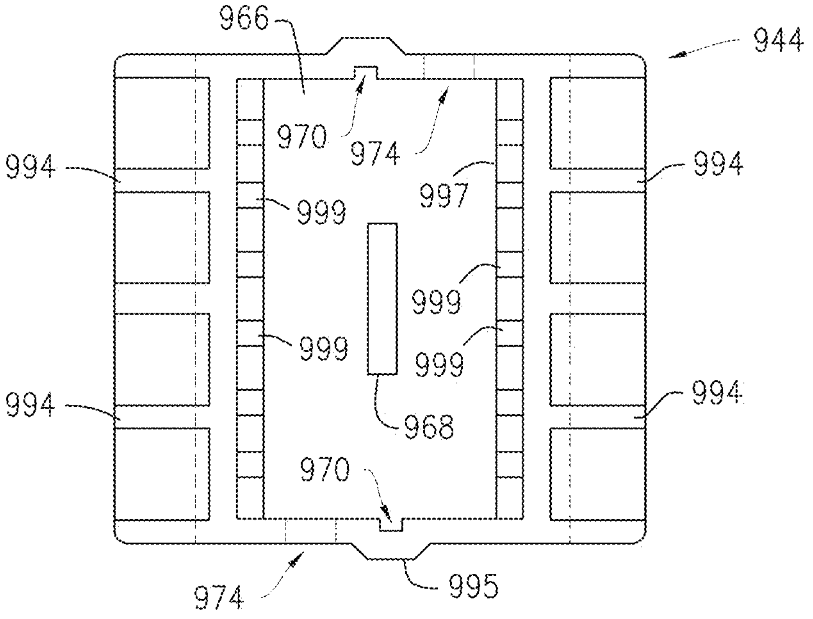
FIG. 19A is a top view of a base of the cutter assembly of FIG. 17A.
Figure 19B:
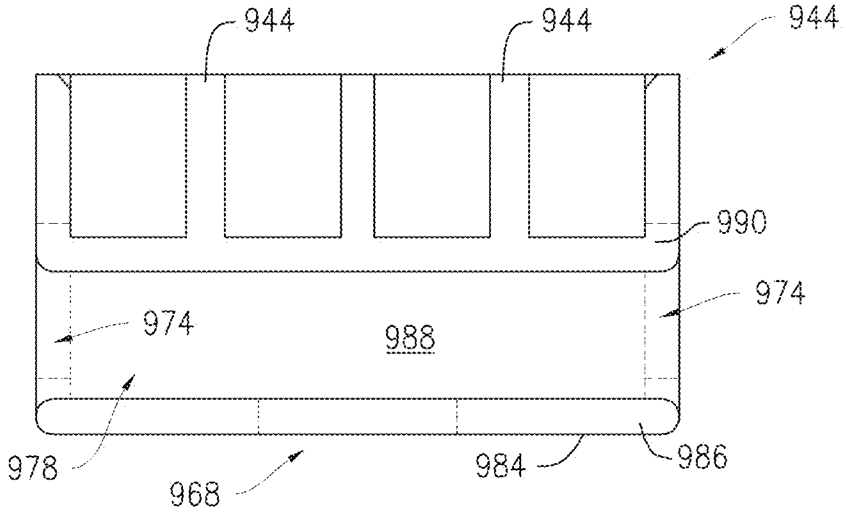
FIG. 19B is a side view of the cutter assembly of FIG. 17A.
Figure 19C:
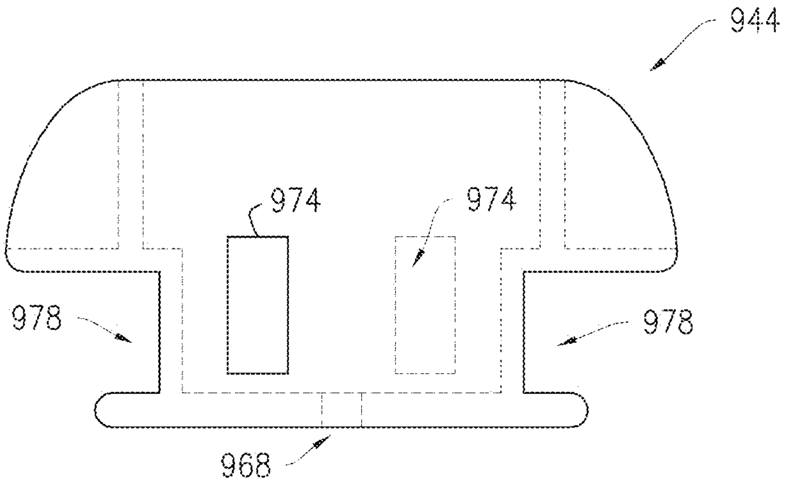
FIG. 19C is a front view of the cutter assembly of FIG. 17A.

FIGS. 19A-C show the base 944 of the of the cutter assembly 940. More specifically, FIG. 19A is a top view of the base 944, FIG. 19B is a side elevational view of the sliding base 944 and FIG. 19C is a front elevational view of the sliding base 944. As shown in FIG. 19A, the base 944 includes a central receptacle for receiving the actuating button 946. The bottom of the receptacle includes a bottom wall 966 with a slot 968 sized for receiving the blade 950 when the actuating button 946 is depressed to extend the blade 950 through the base 944. The base 944 can also include vertical channels 970 sized to slidably receive flange 972 of the actuating button 946, bumps 995 to accommodate the vertical channels 970, apertures 974 for receiving stop tabs 976 of the spring button 946, and support buttresses 994. The base 944 can also include spacers 999 on an interior wall 997 to restrain vertical movement of the actuating button 946 relative to the base 944. As shown in FIGS. 19B and 19C, the base 944 includes a bottom surface 984, having edges 986, recessed sidewalls 988, and shoulders 990 forming base channels 978. The edges 986 and shoulders 990 are positioned above and below the container lid 908 when the cutter assembly 940 is positioned in the slot 942, the recessed side walls 988 bearing against the slot edges to keep the cutter assembly 940 slidably engaged in the slot 942 and allow for travel therealong.

Figure 20A:
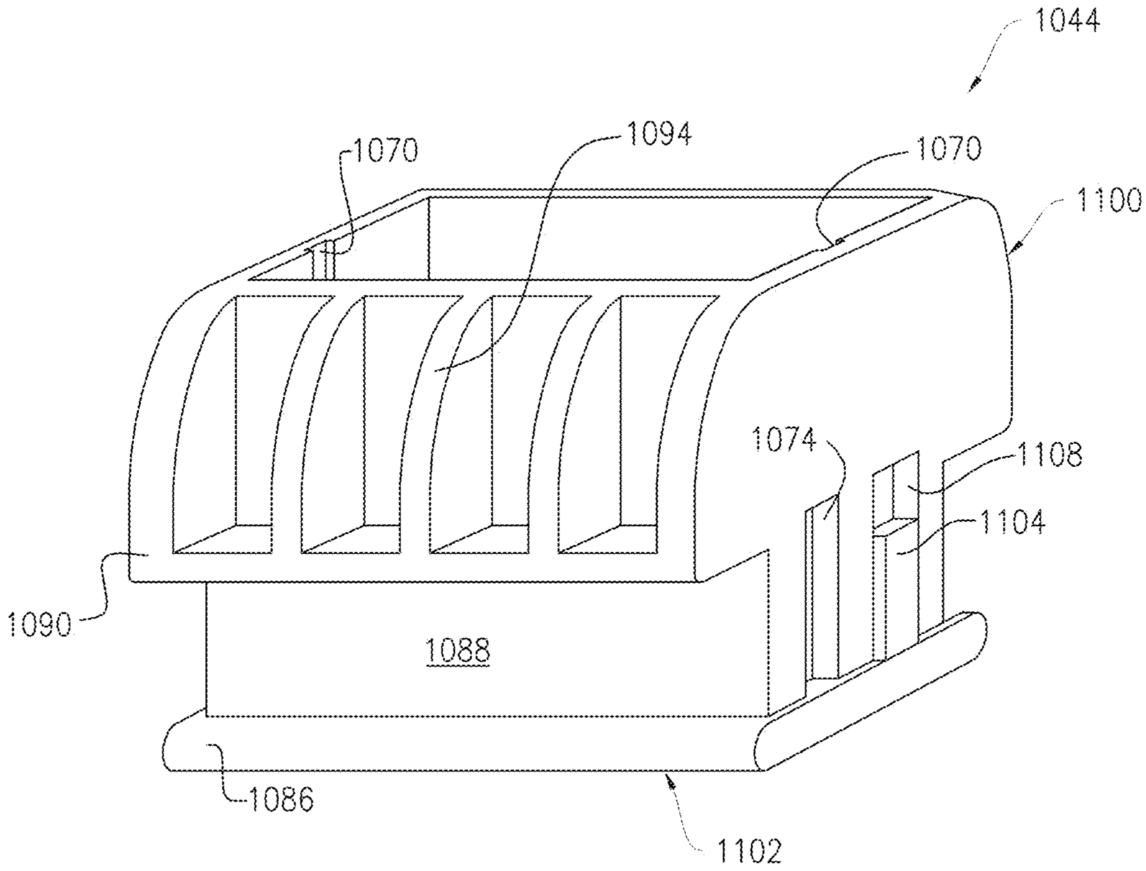
FIG. 20A is a perspective view of a base for a cutter assembly according to the present disclosure.
Figure 20B:
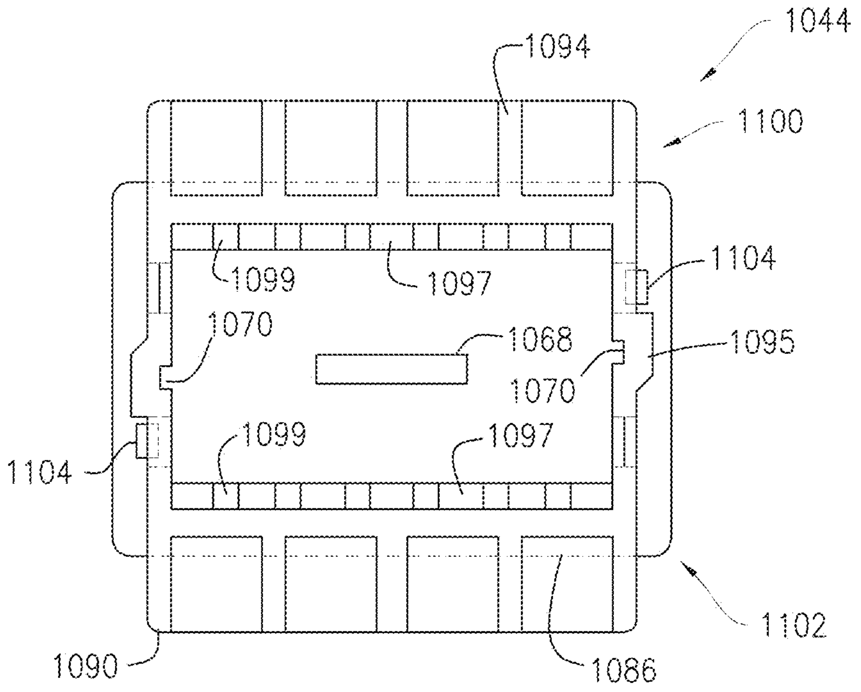
FIG. 20B is a top view of the base shown in FIG. 20A.
Figure 20C:
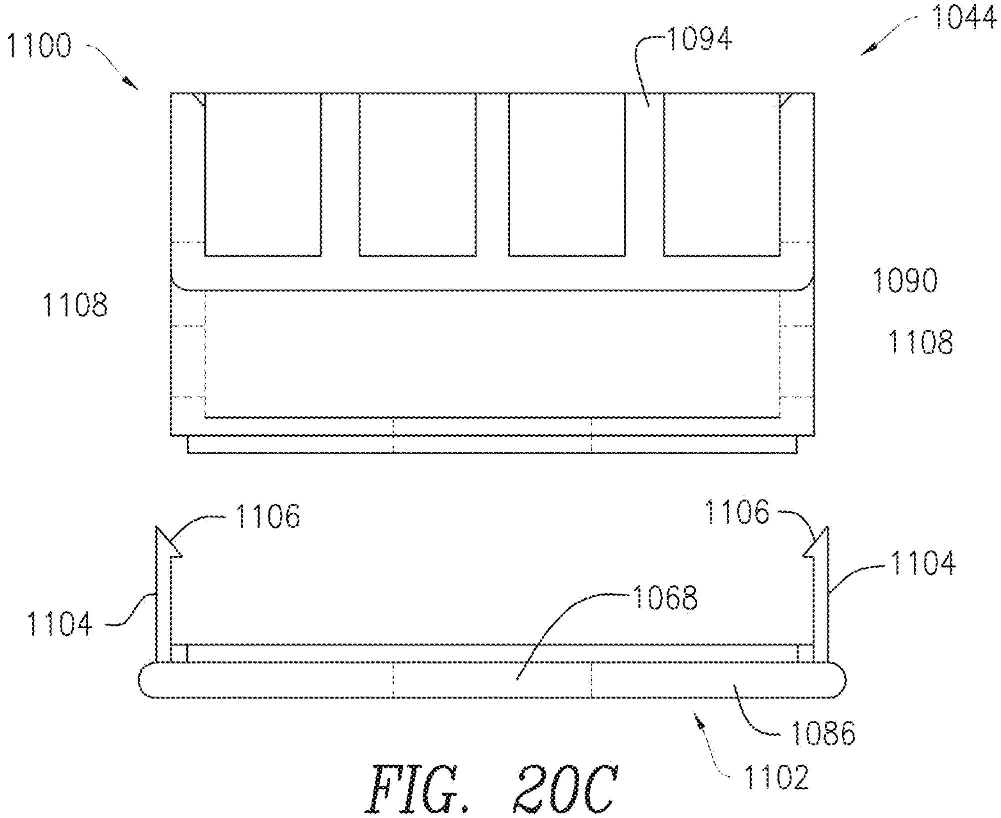
FIG. 20C is an exploded side view of the base shown in FIG. 20A.
Figure 20D:
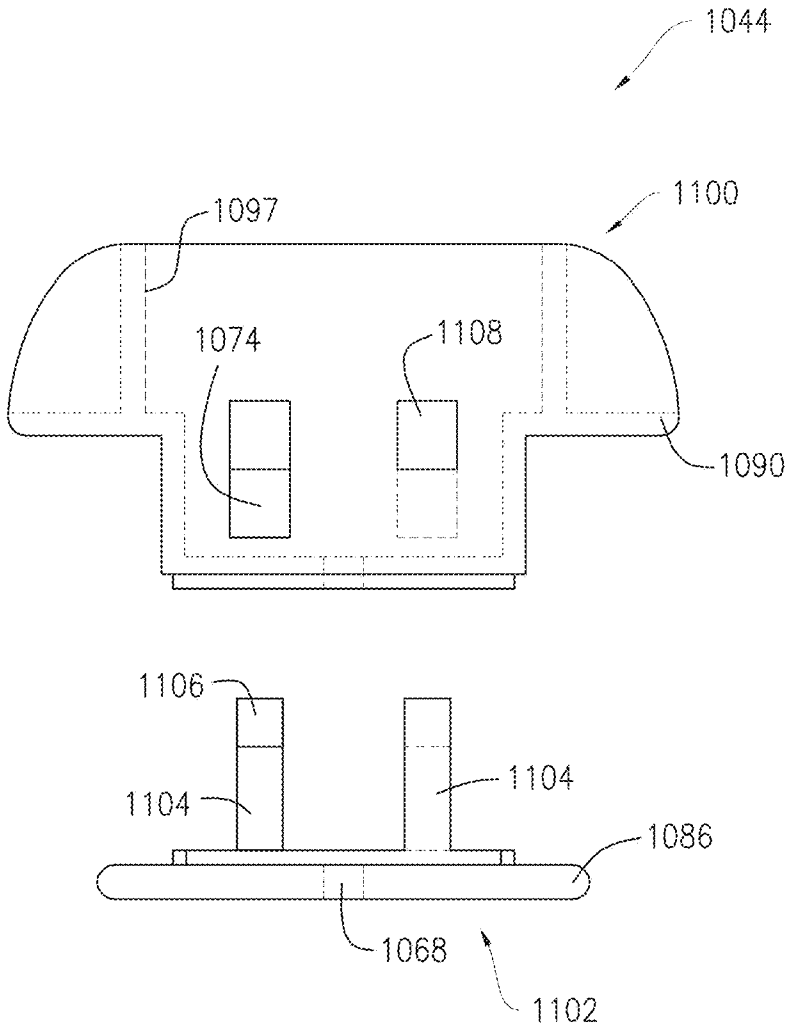
FIG. 20D is an exploded front view of the base shown in FIG. 20A.

FIGS. 20A-D show another base 1044 of a sliding cutter assembly according to some aspects of the present disclosure, including an upper body 1100 and a lower retaining plate 1102. More specifically, FIG. 20A is a perspective view of the base 1044, FIG. 20B is a top view of the base 1044, FIG. 20C is an exploded side elevational view of the base 1044, and FIG. 20D is an exploded front elevational view of the sliding base 1044. As discussed in greater detail below, base 1044 is similar to base 944 of cutter assembly 940 (see, e.g., FIGS. 17A-19C), except for the distinctions as noted herein, and as such can receive, for example, actuating button 946.

As shown in FIG. 20A-D, the base 1044 includes an upper body 1100 having central receptacle for receiving an actuating button, such as for example, actuating button 946, and a lower retaining plate 1102, for securing the base 1044 within a slot of a container, as discussed below. The upper body 1100 of the base 1044 can include vertical channels 1070 sized to slidably receive flanges 972 of the actuating button 946, bumps 1095 (see FIG. 20B) to accommodate the vertical channels 1070, apertures 1074 for receiving stop tabs 976 of the spring button 946, shoulders 1090 having support buttresses 1094, and recessed sidewalls 1088. Upper body 1100 can also include spacers 1099 on an interior wall 1097 to restrain vertical movement of the actuating button 946 relative to the base 1044.

The retaining plate 1102 includes a slot 1068 sized for receiving the blade 950 when the actuating button 946 is depressed to extend the blade 950 through the base 1044, edges 1086, and attachment means 1104 for securing the retaining plate 1102 to the base body 1100. For example, as shown, the attachment means 1104 can comprise tabs 1106 that engage apertures 1108 on the base body 1100, thereby securing the retaining plate 1102 to the base body 1100. Of course, additional means for securing the retaining plate 1102 to the base body 1100 are within the scope of the present disclosure, such as friction fittings, adhesives, welding, and the like.

When the base body 1100 and the retaining plate 1102 are assembled and attached to a container (for example, container 900 shown in FIG. 16), the shoulders 1090 of the body 1100 and the edges 1086 of the retaining plate 1102 and are positioned above and below the container lid, respectively, and the cutter assembly base body 1100 is positioned in the slot 942, with the recessed side walls 1088 bearing against the slot edges to keep the base 1044 slidably engaged in the slot 942 and allowing for travel therealong. The base 1044 with a separate body 1100 and retaining plate 1102 provides certain advantages during assembly of the container. For example, the body 1100 can be inserted through the slot in the container lid with minimal manipulation and the retaining plate 1102 can be easily attached to the body thereafter. Robotic devices or other devices can be utilized in the assembly of containers of the present disclosure.

Figure 21:
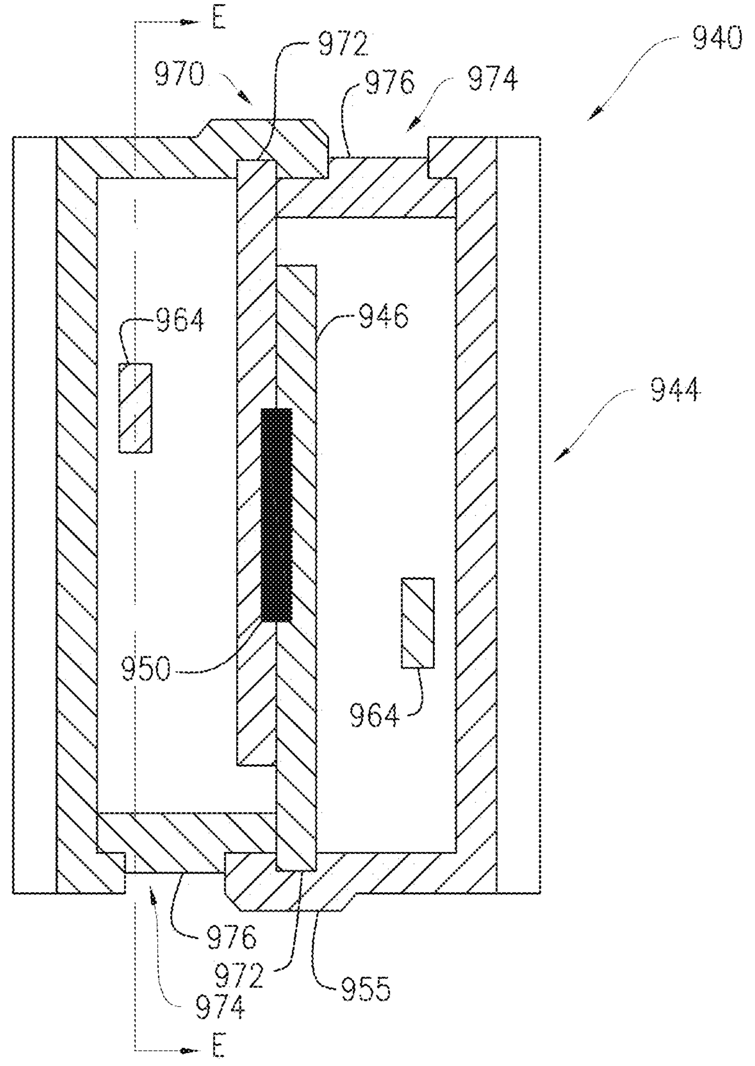
FIG. 21 is a cross-sectional view (taken along line D-D of FIG. 17A) of the cutter assembly of FIG. 17A.

FIG. 21 is a cross-sectional top view showing the actuating button 946 and blade 950 within the base 944 of the cutter assembly 940. As discussed above, the base 944 can include vertical channels 970 sized to receive the flanges 972 of the button 946. As shown in FIG. 21, the vertical channels 970 of the base 944 and flanges 972 of the button

Figure 22A:
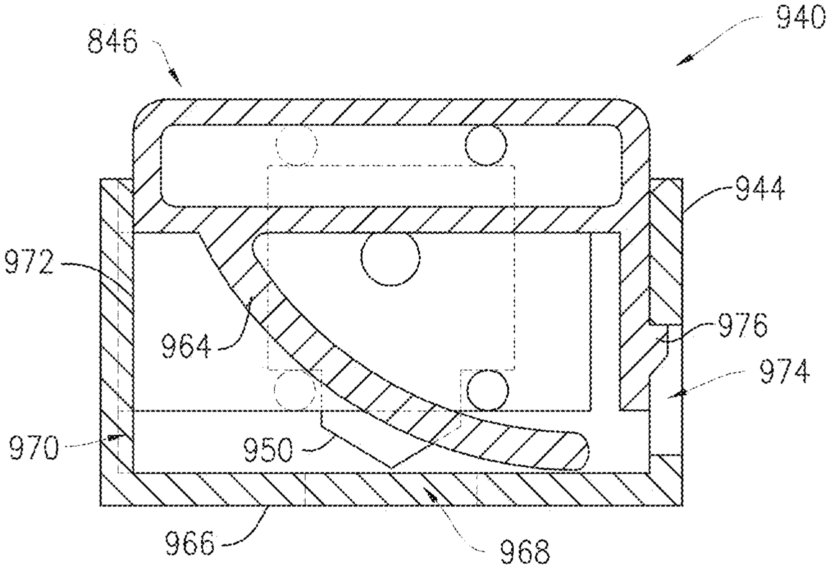
FIG. 22A is a cross-sectional view of the cutter assembly shown in FIG. 20 in a retracted position (taken along line E-E)
Figure 22B:
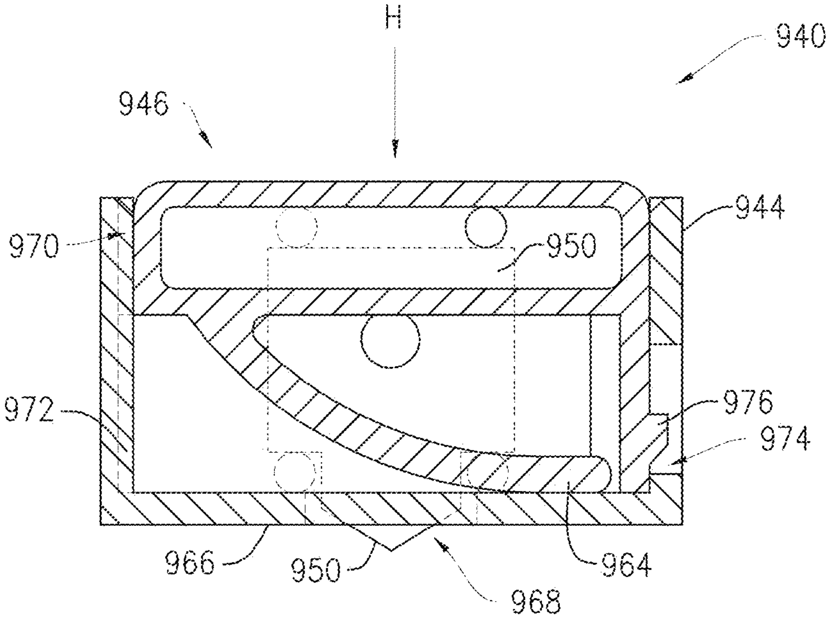
FIG. 22B is a cross-sectional view of the cutter assembly shown in FIG. 20 in a deployed position (taken along line E-E)

946 assist with aligning the actuating button 946 within the base 944 during operation and provide for vertical travel as the button and blade are moved from a first retracted position (see FIG. 22A) to a second deployed position (see FIG. 22B).

FIG. 22A is a cross-sectional view of the slidable cutter assembly 940 of the present disclosure with the blade 950 in a retracted position and FIG. 22B is a cross-sectional view of the slidable cutter assembly 940 of the present disclosure with the blade 950 in an extended, deployed position. As shown in FIG. 22A, the actuating button 946 can be secured within the base 944 by way of the stop tabs 976 of the button 946 being received within the slots 974 of the sliding base 944. As shown in FIG. 22B, upon application of force to button 946 in the direction of arrow H, the leaf springs 964 are elastically deformed so that the button 946 travels towards the base 944 and the blade 950 extends through aperture 968 in the bottom wall 966 of the base 944. Once force has been applied in the direction of arrow H and the blade is extended through aperture 968, the base 944 can be moved along the elongated slot 942 of container 900, thereby cutting the roll-dispensed stock to separate a portion of the stock from the roll. Upon removal of force from button 946, the button 946 and blade 950 return to the retracted position as shown in FIG. 22A. As such, the blade 950 of the cutter assembly 940 does not extend through the aperture 968 of the base 944 in normal operation (e.g., during storage or transportation). The recessed blade is a safety feature that renders the blade 950 unable to contact or cut anything, or anyone, until the container 900 is closed and the cutter assembly 940 is actuated by pressure on the button 946.

Figure 23A:
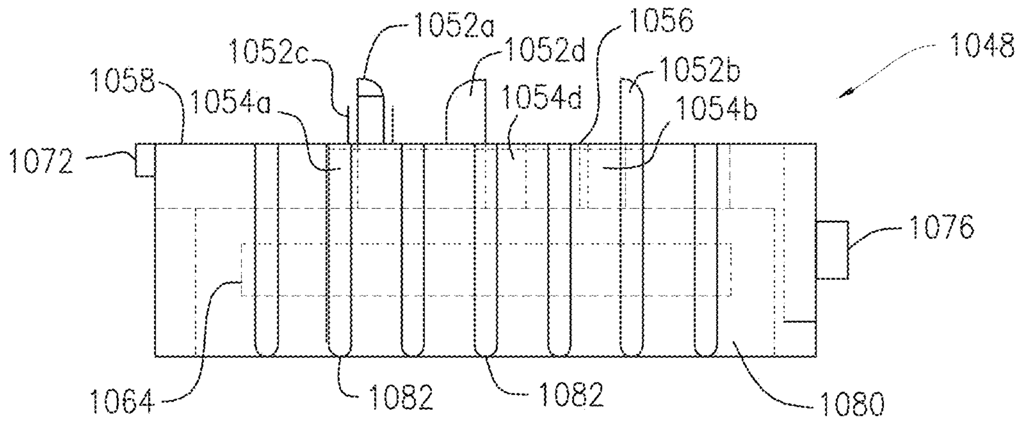
FIG. 23A is a top view of a half of an actuating button according to the present disclosure.
Figure 23B:
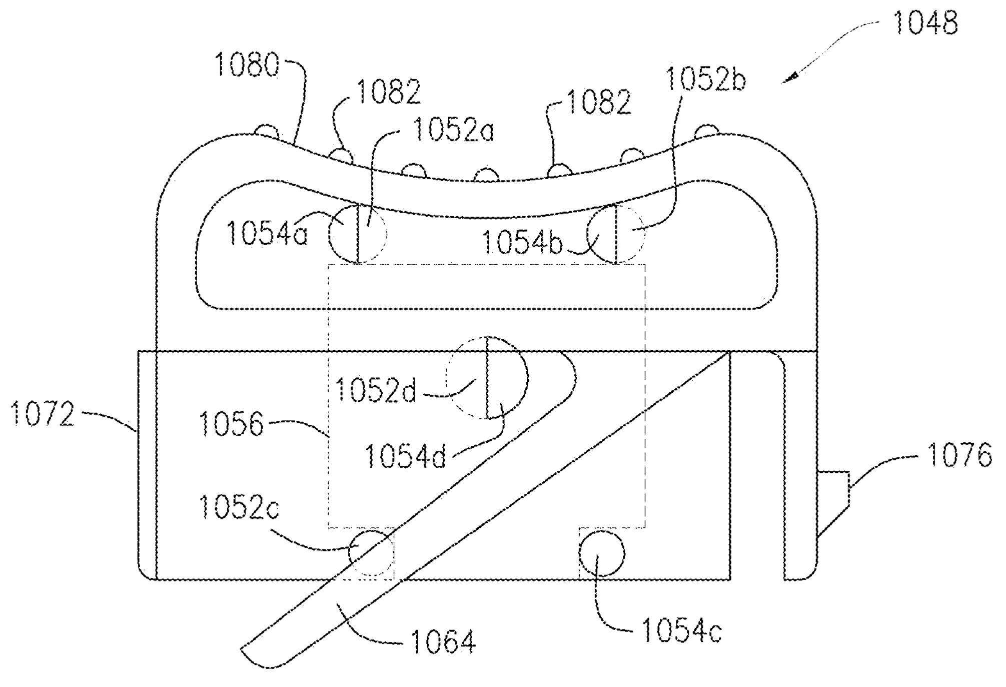
FIG. 23B is a side view of the half of the actuating button of FIG. 22A.
Figure 23C:
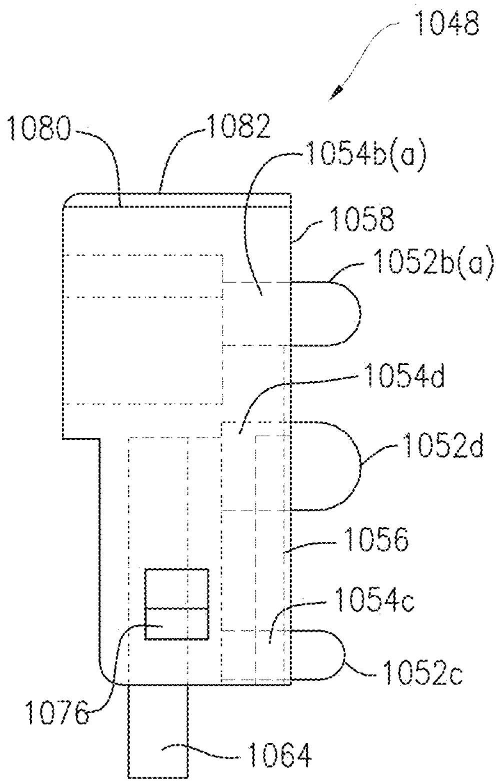
FIG. 23C is a front view of the half of the actuating button of FIG. 22A.

FIGS. 23A-C show another actuating button component 1048 according to some aspects of the present disclosure and are referred to jointly herein. Two such components 1048 can be put together to form an actuating button. More specifically, FIG. 23A is a top view of the button component 1048, FIG. 23B is a side elevational view of the button component 1048, and FIG. 23C is a front elevational view of the button component 1048. Button component 1048 can be substantially similar in structure and function to button component 848, except for the distinctions noted herein.

Button component 1048 can include one or more posts 1052*a-d* and one or more receptacles 1054*a-d*. Posts 1052*a-d* on the button component 1048 can be sized to be received by receptacles 1054*a-d* on a second button component 1048. The posts 1052 and receptacles 1054 can be provided in various configurations. For example, the posts 1052 and receptacles 1054 can have circular cross-sections (e.g., post 1052*c* and receptacle 1054*c*), semi-circular cross-sections (e.g., posts 1052*a,b,d* and receptacles 1054*a,b,d*), or a combination thereof, as shown in FIGS. 23A-C.

The button component 1048 can be provided with a receiving area 1056 on rear wall 1058 of the button component 1048 that is sized and shaped for receiving blade (not shown), thereby preventing movement of the blade relative to the button component 1048 when the button component is fully assembled. The button component 1048 can also include flange portions 1072 that are received by vertical channels in the base of the cutter assembly and stop tabs 1076 that are received by apertures in an exterior wall of the base, as discussed herein.

The button component 1048 can be provided with one or more leaf springs 1064 that are configured to bias the button in a direction away from the sliding base. According to some aspects of the present disclosure, the leaf spring 1064 is integrally formed with the button component 1048. According to other aspects of the present disclosure, the leaf spring 1064 can be replaced, or supplemented, with a traditional coil spring, or any other device configured to provide a bias, without departing from the spirit and scope of the present disclosure.

As shown in FIGS. 23A-C, the button component 1048 can also include a upper contoured surface 1080 that is ergonomically configured to assist a user positioning a finger or thumb on the button surface to apply pressure to the spring button, and for assisting with maintaining a finger or thumb on the surface of the button as the cutter moves along the slot in the container to cut the roll-dispensed stock. For example, the contoured surface 1080 can include a concave curvature to readily accept a user's finger and can further include a plurality of grip-enhancing ridges 1082, allowing the user to easily apply lateral pressure and slide the spring button (and cutter assembly) along a container to separate a portion of roll-dispensed stock.

Figure 24A:
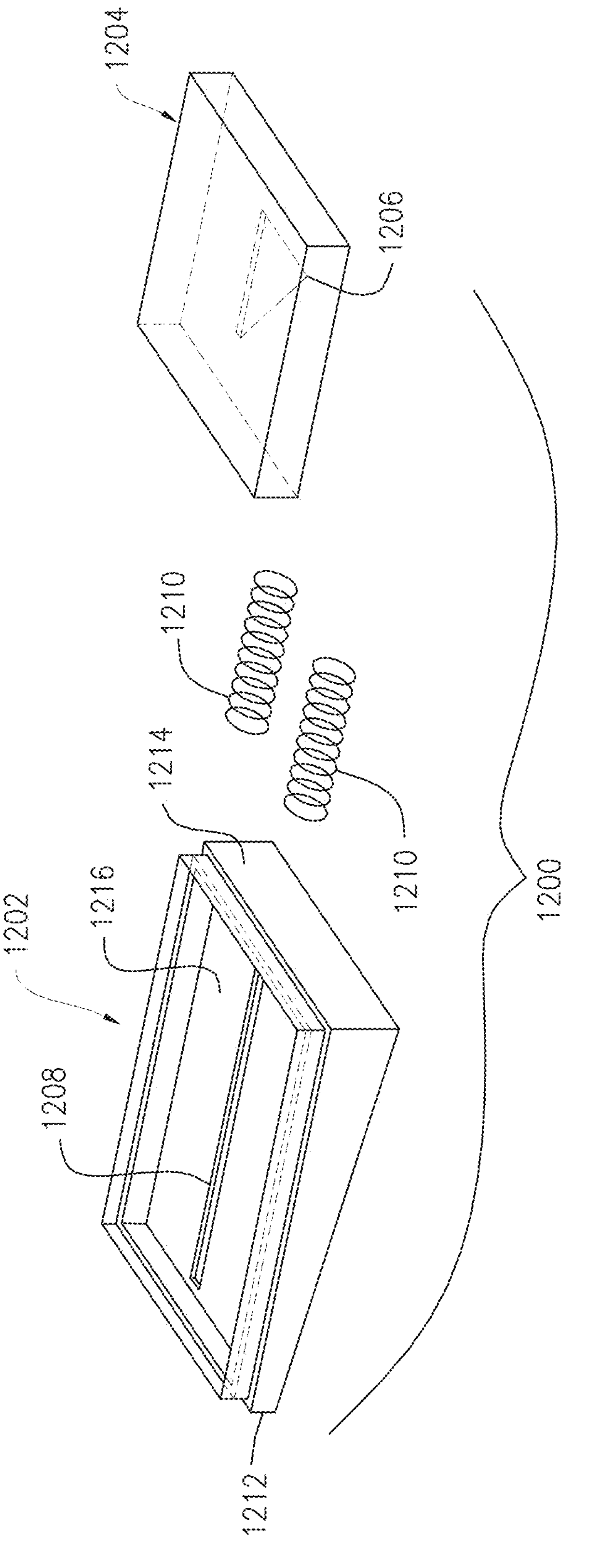
FIG. 24A is an exploded view of a cutter assembly according to the present disclosure.
Figure 24B:
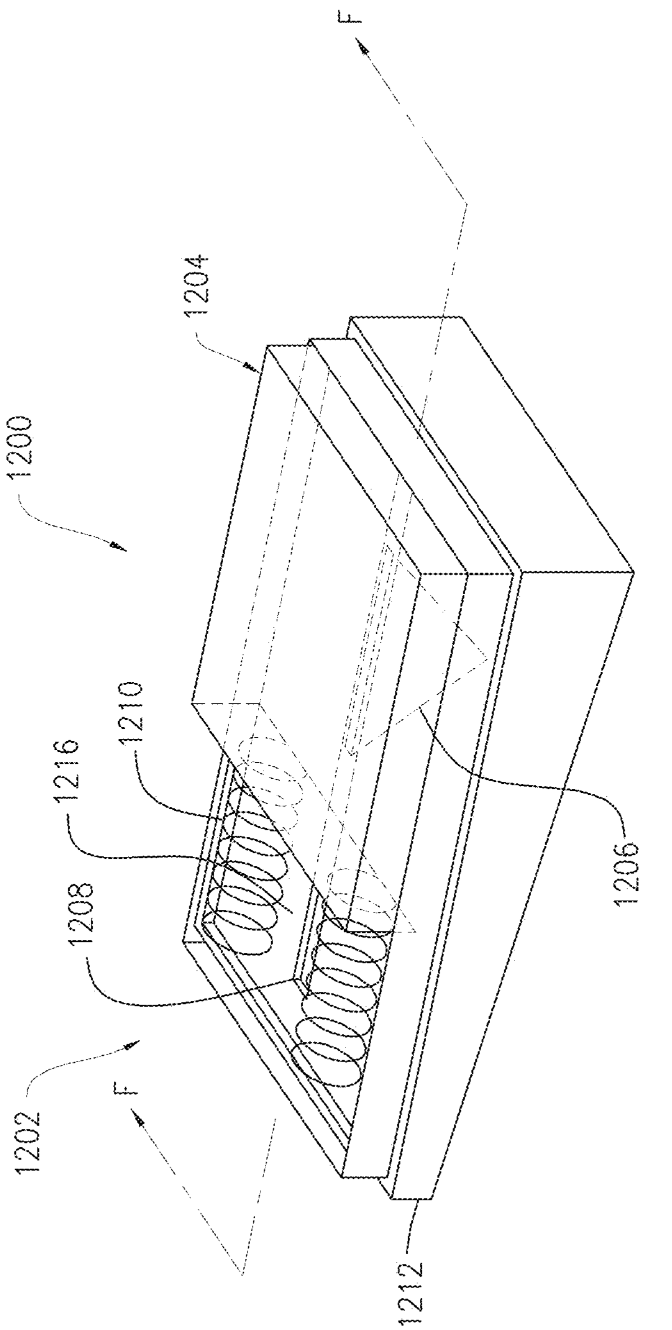
FIG. 24B is a perspective view of the cutter assembly shown in FIG. 24A.
Figure 24C:
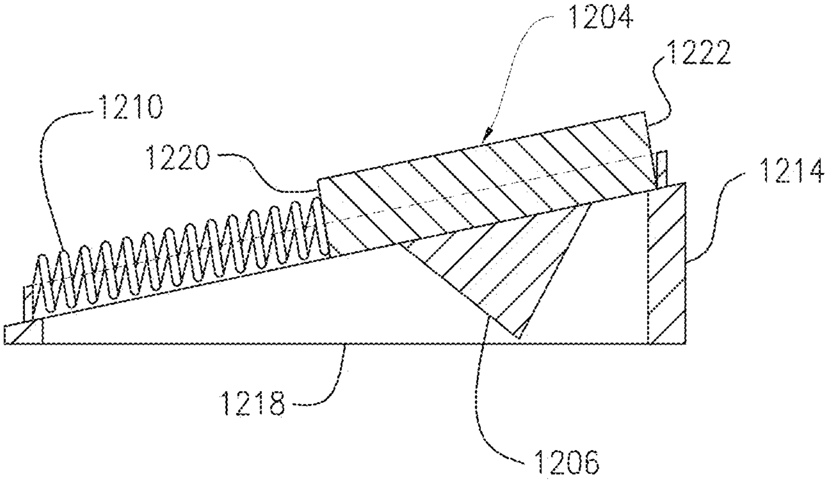
FIG. 24C is a cross-sectional view (taken along line F-F of FIG. 24B) of the cutter assembly shown in FIG. 24A in a retracted configuration.
Figure 24D:
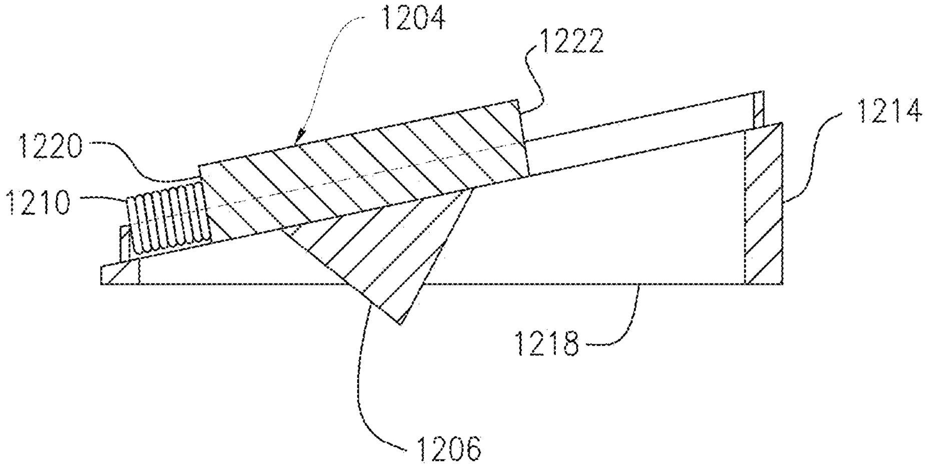
FIG. 24D is a cross-sectional view (taken along line F-F of FIG. 24B) of the cutter assembly shown in FIG. 24A in a deployed configuration.

FIGS. 24A-D show a sliding cutter assembly 1200 having a ramp configuration according to some aspects of the present disclosure. More specifically, FIG. 24A is a perspective exploded view of cutter assembly 1200, FIG. 24B is a perspective view of the cutter assembly 1200. FIG. 24C a cross-sectional view (taken along line F-F of FIG. 24B) of the cutter assembly 1200 positioned in a retracted position, and FIG. 24D is a cross-sectional view (taken along line F-F of FIG. 24B) of the cutter assembly 1200 positioned in a deployed position.

As shown in FIGS. 24A and 24B, cutter assembly 1200 includes a base 1202 and a button 1204 having a blade 1206 attached thereto. The base 1202 is configured as a ramp, having one end 1212 with a height less than the height of the other end 1214 and a bearing surface 1216, on which button 1204 slides. The base 1202 also includes a slot 1208, extending from bearing surface 1216 through a bottom surface 1218 (see FIGS. 24C and 24D), sized to accommodate and receive the blade 1206, which is attached to a bottom surface of the button 1204 and extends into slot 1208. Button 1204 is connected with the base 1202 by way of a rail, a recess, or any other means known in the art suitable to maintain a sliding engagement between button 1204 and base 1202. The cutter assembly 1200 can also include a biasing means 1210, discussed below. The cutter assembly 1200 can be affixed to a roll-dispensed stock container, as described in connection with any of the figures of the present disclosure, such as by connection to a track disposed on a container, or by being retained within a slot provided through a lid of a container. For example, the base 1204 of the cutter assembly 1200 can be provided with channels, similar to base channels 978 described in connection with FIGS. 17A-19C.

As shown in FIG. 24C, the button 1204 and blade 1206 are positionable in a retracted configuration, at the distal end 1214 of the base 1202. The blade 1206 is sized such that when positioned in the retracted configuration, the blade does not extend below the bottom surface 1218 of the base 1202. As shown in FIG. 24D, the button 1204 and blade 1206 are also positionable in a deployed configuration, at the proximal end 1212 of the base 1202. The blade 1206 is also sized such that when positioned in the deployed configuration, the blade extends below the bottom surface 1218 of the base 1202.

Cutter assembly 1200 can be provided with biasing means 1210 for maintaining the positions of the of the button 1204 and blade 1206 in the retracted configuration. For example, as shown in the figures, biasing means 1210 can include one or more (compression) coil springs positioned between the proximal end 1212 of the base 1202 and a front face 1220 of the button 1204. Alternatively, biasing means 1210 can include one or more (tension) coil springs positioned between the distal end 1214 of the base 1202 and a rear face 1222 of the button 1204. It is further contemplated by the present disclosure that any of the biasing means disclosed herein can be utilized to provide a biasing force that maintains the components of the cutter assembly 1200 in the retracted configuration. Of course, those of skill in the art will appreciate that any number of mechanisms are available for providing a biasing force to maintain the button 1204 and blade 1206 in the retracted configuration, until actuated by a user, without departing from the spirit and scope of the present disclosure.

In operation, a user provides pressure to the button 1204, towards the lower end 1212 of the base 1202, thereby moving the cutter assembly 1200 from the retracted configuration to the deployed configuration shown in FIG. 24D. With the blade 1206 extended below the bottom surface 1218 of base 1202, the user can slide the cutter assembly across the roll-dispensed stock, to sever a portion of stock from the roll, such as described in connection with FIGS. 4-6. Once the roll-dispensed stock has been cut, the user releases pressure from the button 1204 and the biasing means 1210 returns the button 1204 and blade 1206 to the retracted configuration shown in FIG. 24C. The present disclosure also contemplates a method for dispensing roll-dispensed stock from a container. The method includes the steps of opening a lid to access an opening in the body of the container, drawing the roll-dispensed stock out of the body through the opening and over a surface of the container, closing the lid against the surface of the container, pressing the lid against the surface of the container to secure the roll-dispensed stock between the lid and the surface by compressing the roll-dispensed stock against one or more fixation strips, sliding the cutter along a length of the lid from a first position to a second position to cut through the roll-dispensed stock, and separating a portion of the roll-dispensed stock from the roll.

Another method for dispensing roll-dispensed stock from a container can include the steps of opening a container lid to access an opening in the body of the container, drawing the roll-dispensed stock out of the body through the opening and over a surface of the container, closing the lid against the surface of the container, pressing the lid against the surface of the container to secure the roll-dispensed stock between the lid and the surface by compressing the roll-dispensed stock, for example, against one or more fixation strips, pressing an actuating button on the cutter assembly to move a blade from a first retracted position to a second deployed position, sliding the cutter assembly along a length of the lid from a first position to a second position to cut through the roll-dispensed stock and thereby separate a portion of the roll-dispensed stock from the roll, while pressing the actuating button, and releasing pressure from the cutter assembly to automatically move the blade from the second deployed position back to the first retracted position.

Figure 25:
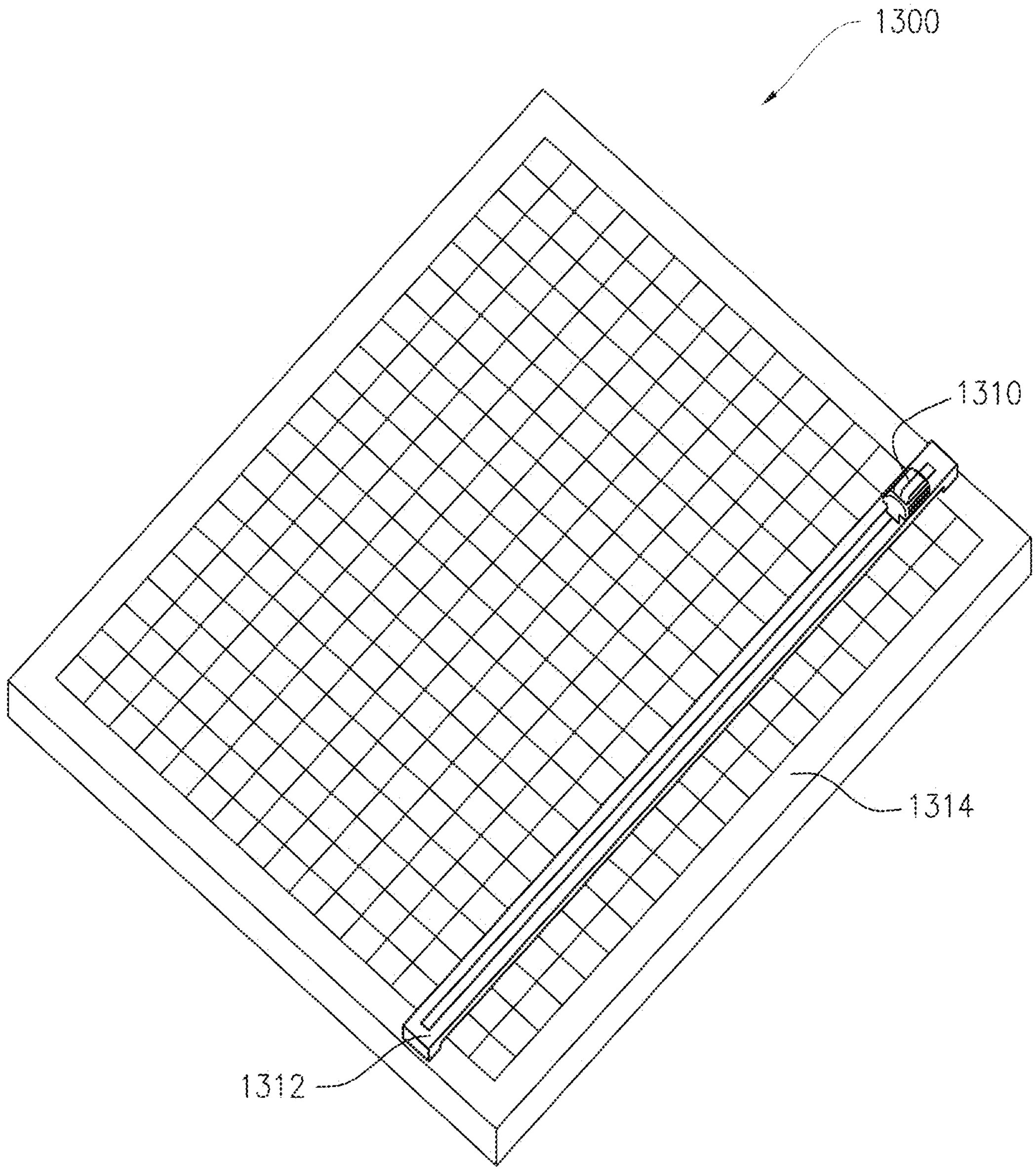
FIG. 25 is a perspective view of a paper cutting board including the slidable cutter assembly of FIG. 16.

Any of the slidable cutter designs disclosed herein can be utilized in connection with other applications which require the cutting of stock, similar to the various forms of roll-dispensed stock described herein. For example, FIG. 25 shows a paper cutting board 1300 having a sliding cutter assembly 1310 positioned on a track 1312 that is attached to a cutting surface 1314. According to some aspects of the present disclosure, cutter assembly 1310 can be substantially similar in design and operation to cutter assembly 940, described in connection with FIGS. 16-19C, or any of the slidable cutter designs disclosed herein. For example, a user can position a piece of paper between the cutting surface 1314 and the track 1312, depress a button of the cutter assembly to expose a blade thereof for cutting, slide the cutter assembly 1310 along the length of the track 1312, thereby cutting the paper, and release the button of the cutter assembly 1310 to allow the blade to return to a safe retracted position. Of course, those of ordinary skill in the art will appreciate that the slidable cutter designs of the present disclosure can be utilized in connection with various applications, in addition to those described herein, without departing from the spirit and scope of the present disclosure. It will be noted that the cutters disclosed herein can be with or without fixation strips depending on the nature of the material to be cut.

Figure 26A:
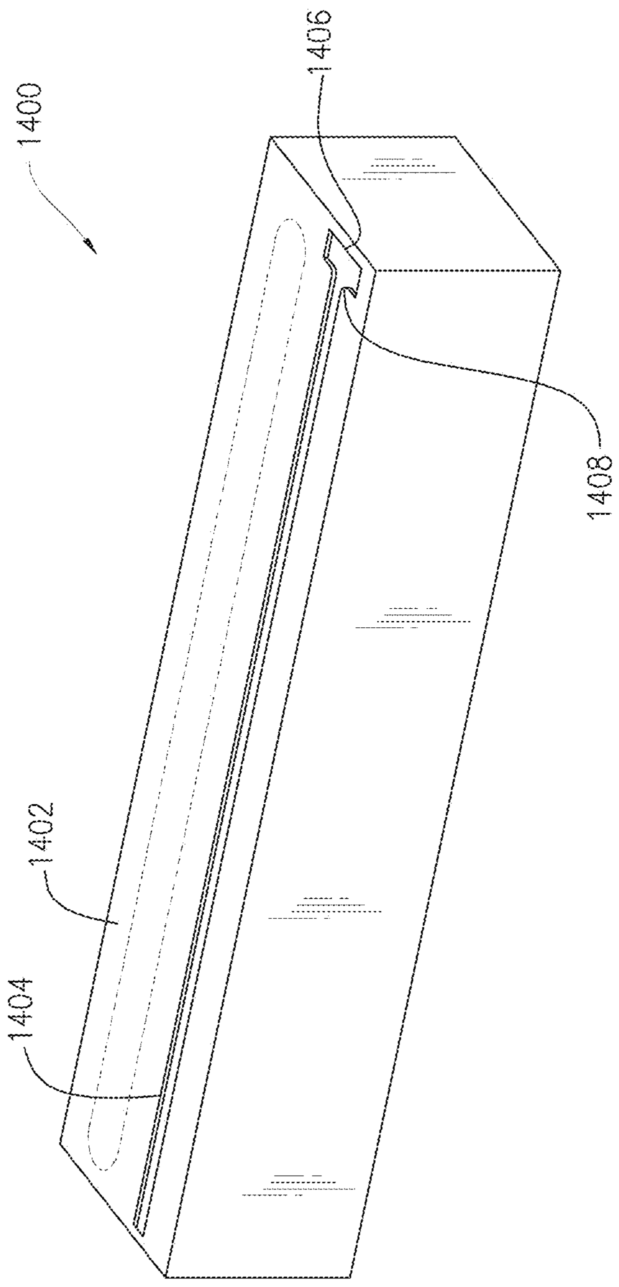
FIG. 26A is a perspective view of a roll-dispensed stock container according to the present disclosure including an elongated slot with an aperture sized to receive a cutter assembly.
Figure 26B:
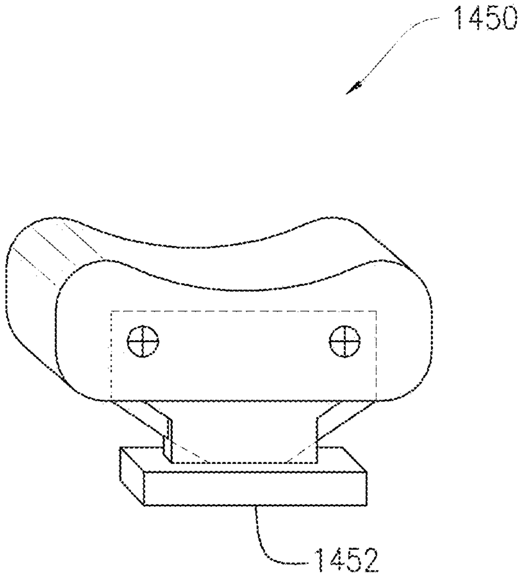
FIG. 26B is a perspective view of a cutter assembly according to the present disclosure that is received by the aperture of the roll-dispensed stock container of FIG. 26A.
Figure 27A:
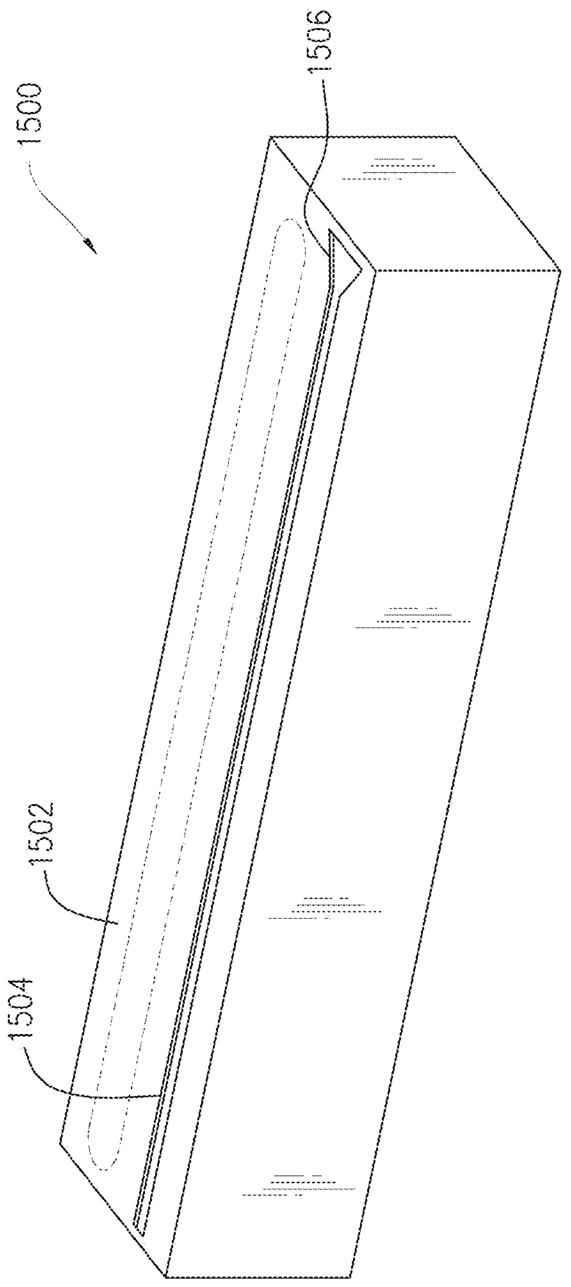
FIG. 27A is a perspective view of another roll-dispensed stock container according to the present disclosure including an elongated slot with an aperture sized to receive a cutter assembly.
Figure 27B:
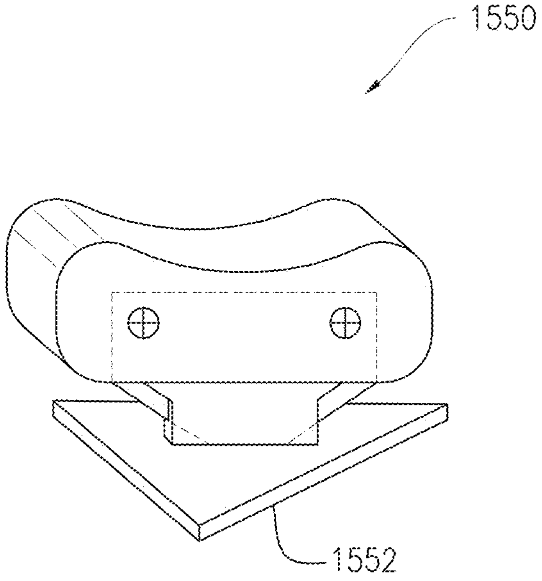
FIG. 27B is a perspective view of a another cutter assembly according to the present disclosure that is received by the aperture of the roll-dispensed stock container of FIG. 27A.

FIG. 26A is a perspective view of a roll-dispensed stock container 1400 according to the present disclosure including a top wall 1402 with an elongated slot 1404 having an aperture 1406 that is sized to receive a cutter assembly 1450, shown in FIG. 26B. The aperture 1406 can be sized to accommodate a base 1452 of the cutter assembly 1450, in an orientation other than the direction of travel during operation, to facilitate insertion of the cutter assembly into the elongated slot during assembly of the container. For example, the base 1452 cutter assembly 1450 can be inserted into the aperture 1406 and the cutter assembly 1450 can then be rotated to secure the cutter assembly 1450 within the elongated slot 1404. Aperture 1406 can have chamfered edges 1408 to facilitate the process of rotating the cutter assembly 940 from an insertion to a locked position. FIG. 27A is a perspective view of a roll-dispensed stock container 1500 including a top wall 1502, an elongated slot 1504, and an aperture 1506 that is sized to receive a triangular base 1552 of a cutter assembly 1550, aperture 1506 having a triangular configuration. It is contemplated by the present disclosure that the apertures described in connection with FIGS. 26A and 27A can be provided in any shape or configuration that allows a cutter assembly to be inserted into the aperture in a first orientation and then rotated to a second orientation, thereby securing the cutter assembly and facilitation operation.

Figure 28:
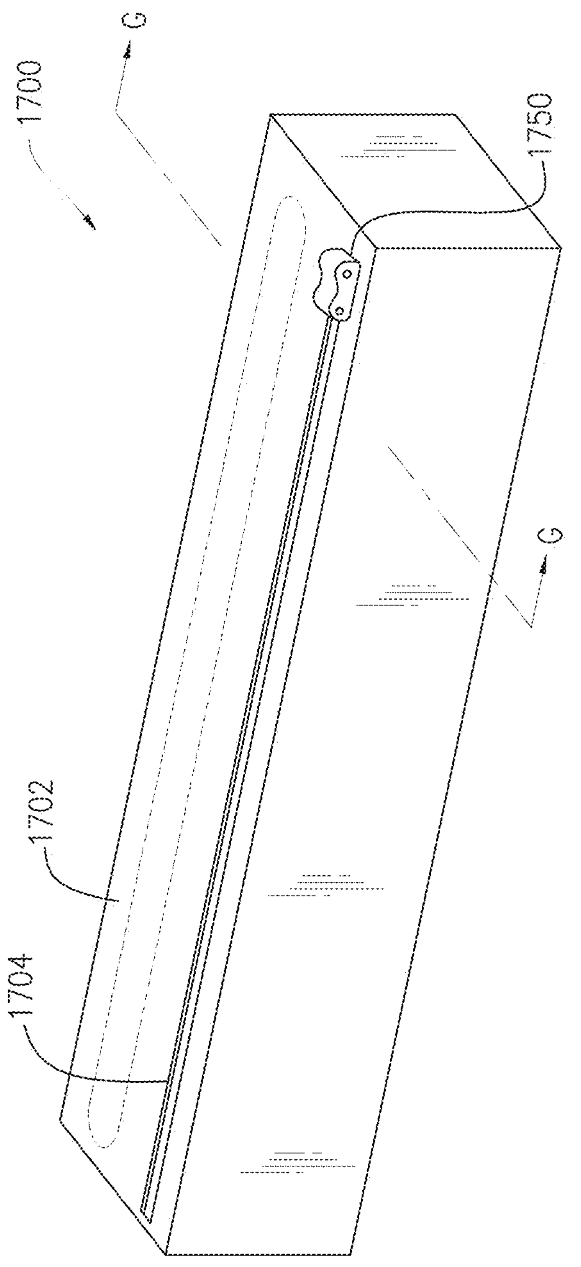
FIG. 28 is a perspective view of a roll-dispensed stock container according to the present disclosure including another slidable cutter assembly having a deformable retaining means.
Figure 29:
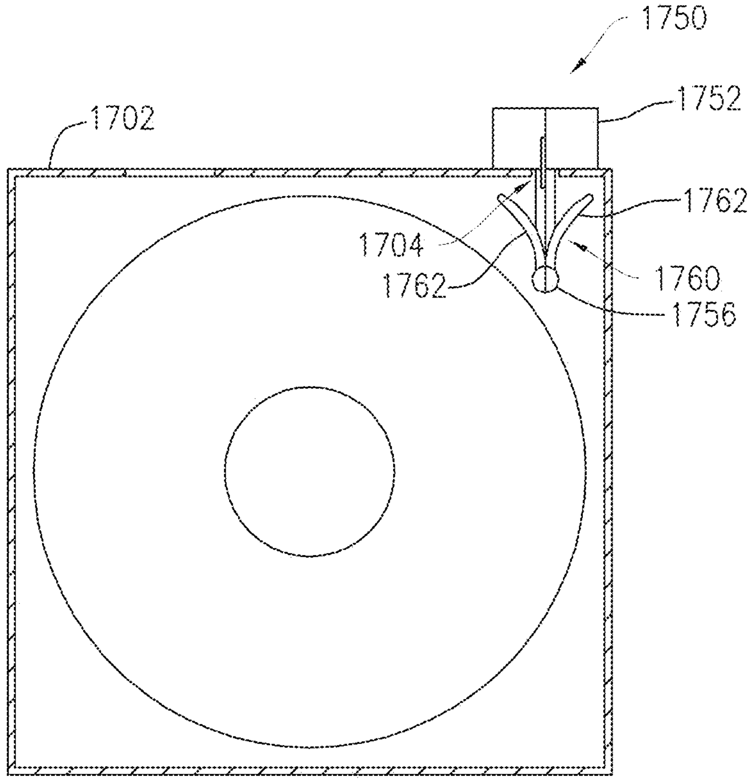
FIG. 29 is a cross-sectional view (taken along line G-G of FIG. 29) of the roll-dispensed stock container of FIG. 29.
Figure 30:
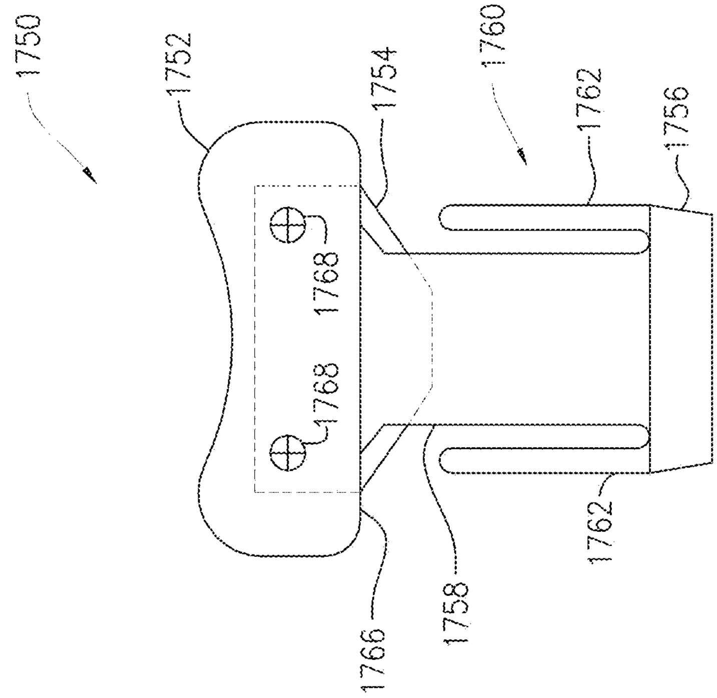
FIG. 30 is a side view of the slidable cutter assembly of FIG. 29.

FIG. 28 is a perspective view of another roll-dispensed stock container 1700 according to the present disclosure including a slidable cutter assembly 1750 having a deformable retaining means. FIG. 29 is a cross-sectional view (taken along line G-G of FIG. 29) of the roll-dispensed stock container 1700. FIG. 30 is a side view of the slidable cutter assembly 1700 and FIG. 31 is a front view of the slidable cutter assembly 1700.

As shown in FIGS. 28-31, the roll-dispensed stock container 1700 includes a top wall 1702 with an elongated slot 1704 that receives a cutter assembly 1750. The cutter assembly 1750 includes a blade housing 1752, a blade 1754, a base 1756, a stem 1758 connecting the blade housing 1752 to the base 1756, and retaining device 1760 for securing the cutter assembly 1750 within the elongated slot 1704 in the top wall 1702 of the container 1700.

Figure 31:
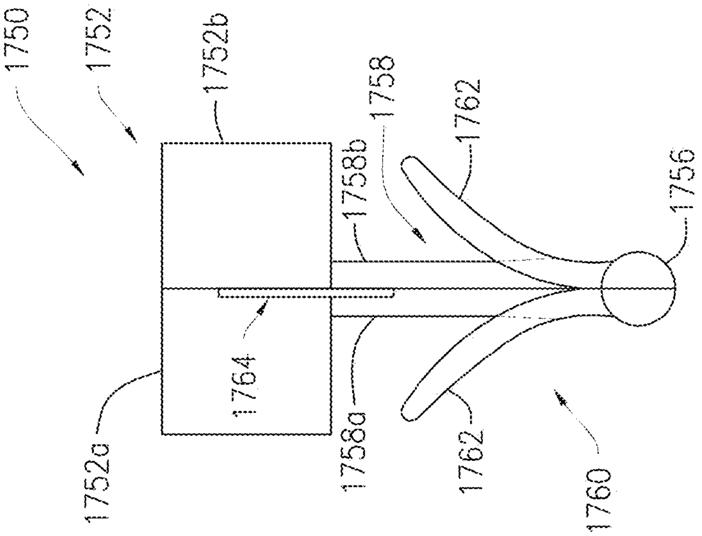
FIG. 31 is a front view of the slidable cutter assembly of FIG. 29.

As shown in FIGS. 30 and 31, the blade housing 1752 can comprise a first half **1752*a* and a second half 1752*b*, the stem 1758 can comprise first half 1758*a* and second half 1758*b*, and the blade 1754 can be disposed therebetween. According to some aspects of the present disclosure, at least one of the first half 1752*a* and the second half 1752*b* of the blade housing 1752 and the first half 1758*a* and the second half 1758*b* of the stem 1758 can include a recess 1764 sized to accept the blade 1754, as shown in FIG. 31. The blade 1754 can be sized such that a portion thereof extends below a lower face 1766 of the blade housing 1752, to cut a portion of roll-dispensed stock drawn over the elongated slot 1704 in the top wall 1702 of the container 1700**.

As shown in FIG. 30, lower face 1766 of the blade housing 1752 can include a rounded profile towards front and rear sides of the blade housing 1752, allowing for the roll dispensed stock to remain flat as the cutter assembly 1750 is moved along the elongated slot 1704 of the container 1700 during the cutting process. The first half 1752*a* and the second half 1752*b* of the blade housing 1752 can be joined together with screws 1768. Alternatively, the first half 1752*a* and the second half 1752*b* of the blade housing 1752 can be joined together with an adhesive, or any other suitable means for securing the components together, such as those described above in connection with first and second halves of spring button 946 and shown in FIG. 18. According to other aspects of the present disclosure, the blade housing can also be a unitary structure.

According to some aspects of the present disclosure, the retaining device 1760 can include a plurality of fingers 1762 that depend from the base 1756, each extending in an arcuate path towards the blade housing 1752 and away from the stem 1758, as shown in FIG. 31. The fingers 1762 can be configured such that they are normally positioned as shown in FIG. 31, but when compressed towards the stem 1758, provide a spring/biasing force in the opposite direction (e.g., towards their normal position shown in FIG. 31). The fingers 1762 can be formed from any material that is resiliently deformable (e.g., thermoplastic, metal, etc.), such that the fingers 1762 can be compressed towards the stem 1758 and return to their original position.

During assembly of container 1700, the cutter assembly 1750 is inserted into the elongated slot 1704, which has a width that is roughly equal to the width of base 1756 of the cutter assembly 1750, causing the fingers 1762 of the retaining device 1760 to inwardly deform, thus reducing their width, such that that can pass through the elongated slot 1704. Once the fingers 1762 have passed through the elongated slot 1704, they return to their normal position, as shown in FIG. 29, having a width larger than the width of the elongated slot 1704. Accordingly, the cutter assembly 1750 is retained in the slot 1704 by the lower face 1766 of the blade housing 1752 (also having a width greater than the slot 1704) bearing against a top surface of top wall 1702 of the container 1700 and by upper tips of the fingers 1762 bearing against a bottom surface of the top wall 1702 of the container 1700. The retaining device 1760 can be provided in various configurations. As such, the fingers 1762 can be provided with varying geometries, material thicknesses, dimensions, and the like, suitable for a particular application. For example, the flanges can be configured to be wide enough to prevent the sliding cutter assembly 1750 from turning in the slot 1704 to reduce binding and to cut in a straight line. According to other aspects of the present disclosure, the blade 1754 and stem 1758 can have a with great enough such that the cutter assembly 1750 is prevented from turning in the slot 1704 to reduce binding and to cut in a straight line.

Figure 32:
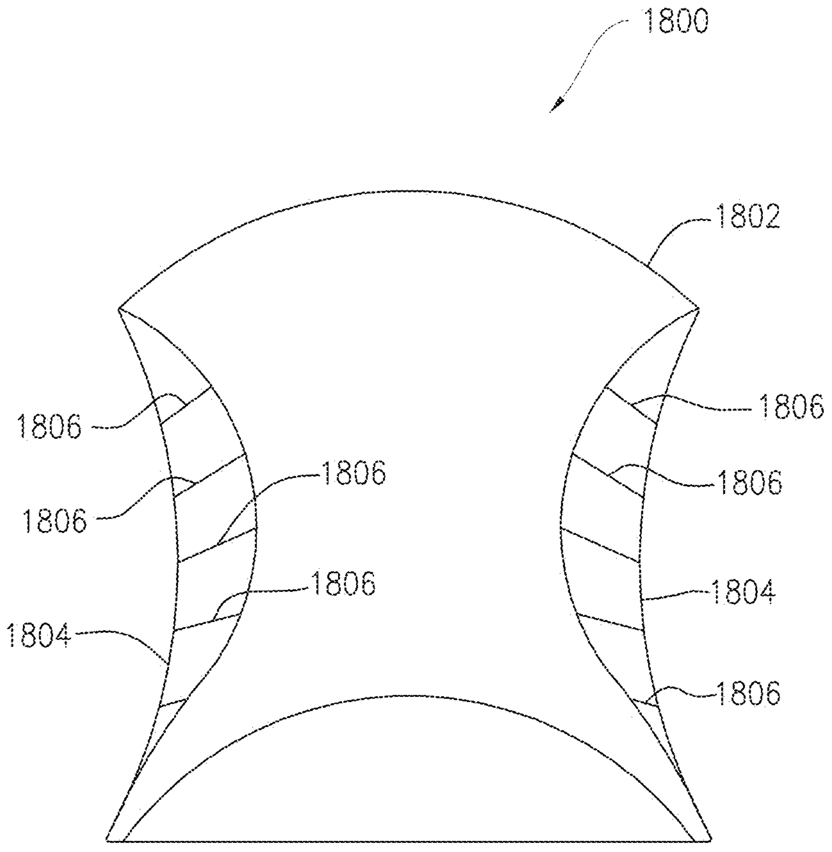
FIG. 32 is a perspective view of a cutter housing for use with a slidable cutter assembly according to the present disclosure.

FIG. 32 is a perspective view of a cutter housing, indicated generally at 1800, according to some aspects of the present disclosure. The cutter housing 1800 can be used with any sliding cutter assembly. For example, the blade housing 1752, described in connection with FIGS. 30-31, can be configured in accordance with cutter housing 1800. Of course, the geometries of cutter housing 1800 shown in FIG. 32 can be modified, without departing from the scope of the present disclosure.

As shown, the cutter housing 1800 can include a body 1802 having a semi-cylindrical shape with recessed, contoured surfaces 1804 along lateral sides thereof. The contoured surfaces 1804 can be ergonomically configured for a user's thumb and finger to grasp the cutter housing and for applying a lateral force to the cutter housing 1800, thereby moving a slidable cutter assembly along a slot in a container to cut roll-dispensed stock. The recessed, contoured surfaces 1804 can have a concave curvature to accept a user's fingers and can further include a plurality of grip-enhancing ridges 1806, allowing the user to easily apply lateral force and slide the cutter housing 1800 (and cutter assembly) along a container to separate a portion of roll-dispensed stock. In addition to providing enhanced ergonomics, the contoured surfaces 1804 also reduce manufacturing costs, by reducing the volume of the cutter housing 1800, and thus requiring less material for the cutter housing 1800.

Figure 33:
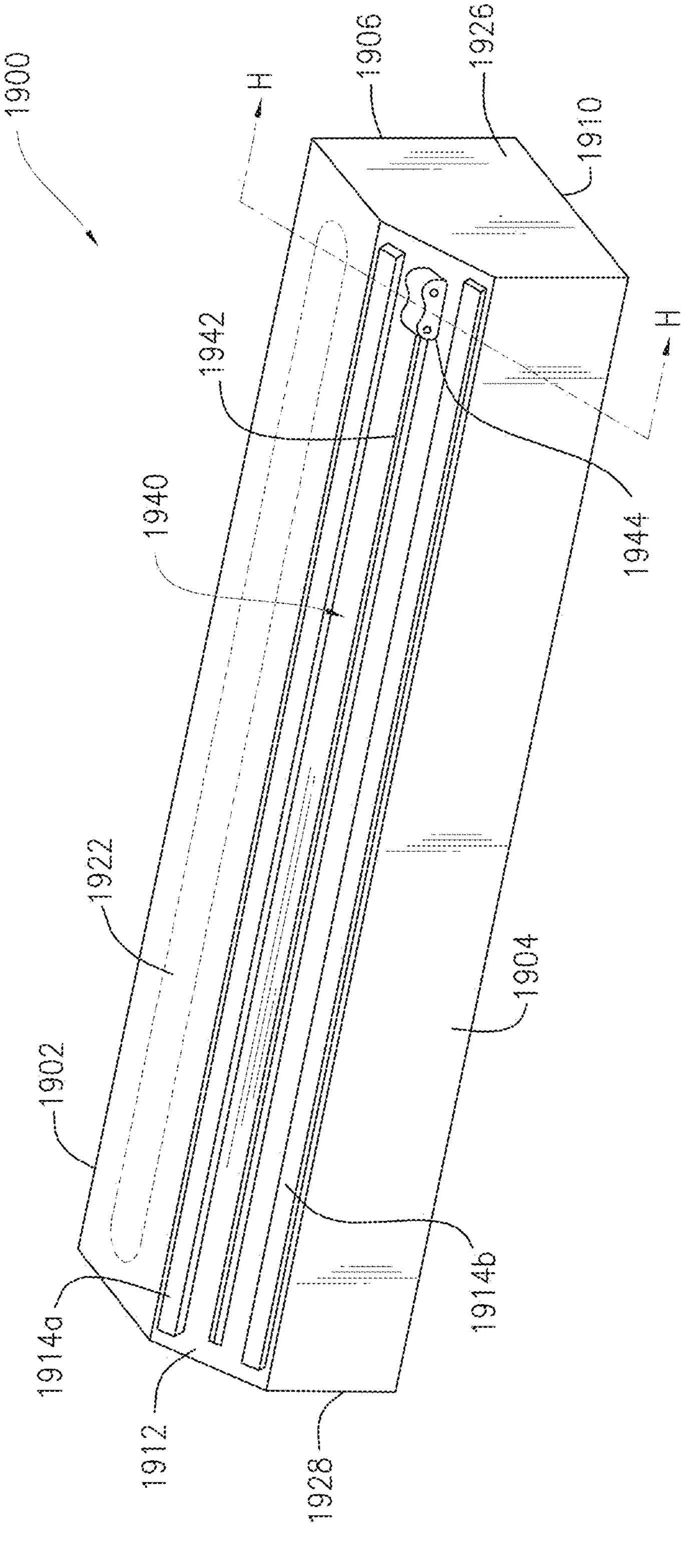
FIG. 33 is a perspective view of a roll-dispensed stock container according to the present disclosure including an elevated fixation strip on an angled support wall.
Figure 34:
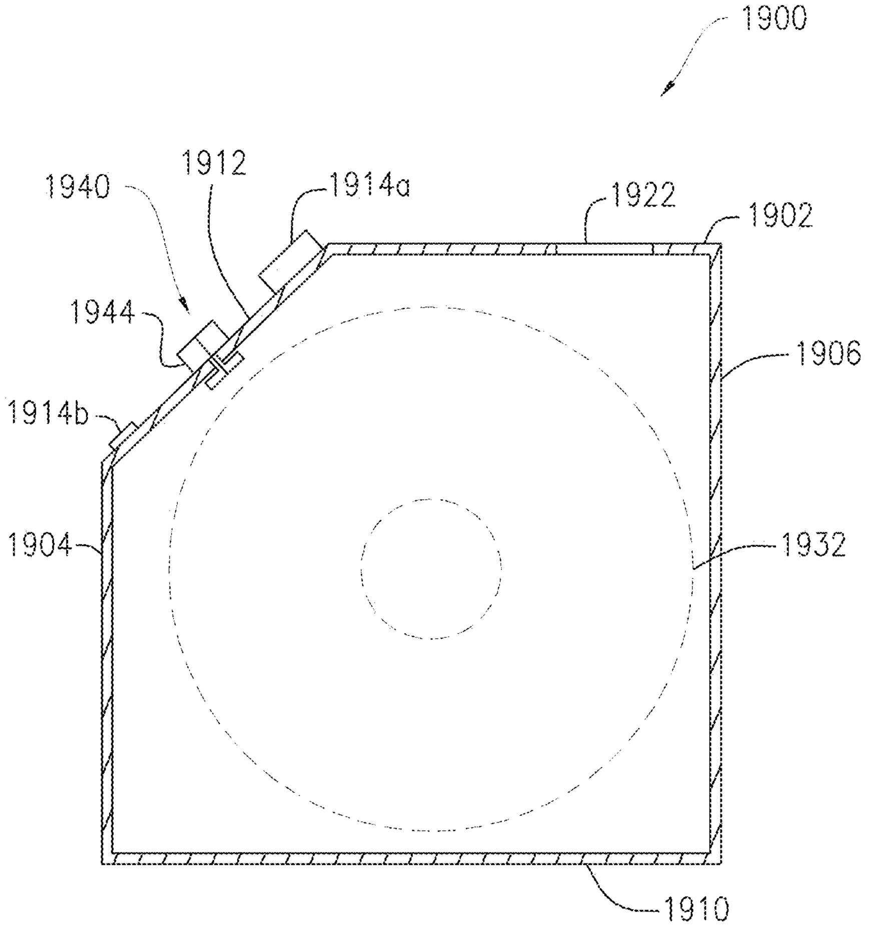
FIG. 34 is a cross-sectional view (taken along line H-H of FIG. 33) of the roll-dispensed stock container of FIG. 33.

FIG. 33 is a perspective view of a roll-dispensed stock container, indicated generally at 1900, according to the present disclosure and FIG. 34 is a cross-sectional view (taken along line H-H of FIG. 33) of the roll-dispensed stock container 1900 of FIG. 33. The container 1900 includes a top wall 1902, a front wall 1904, a rear wall 1906, a bottom wall 1910, side walls 1926 and 1928, and a support wall 1912. As shown, the height of the front wall 1904 can be less than the height of the rear wall 1906, such that the support wall 1912 is disposed at an angle relative to the top wall 1902 and the front wall 1904. The top wall 1902, front wall 1904, rear wall 1906, bottom wall 1910, support wall 1912, and side walls 1926 and 1928 form an enclosure dimensioned to receive a roll of roll-dispensed stock 1932. The container 1900 can include a perforated section 1922 in the top wall 1902, configured to be at least partially separated from the top wall 1902 to form an opening 1930 (see FIGS. 39-41) for accessing and dispensing roll-dispensed stock from the enclosure.

The container 1900 can include a cutter assembly, indicated generally at 1940. As shown in FIG. 33, the cutter assembly 1940 includes an elongated aperture 1942 disposed through the support wall 1912 and a slidable cutter 1944 with a blade or edge disposed therein. The slidable cutter 1944 travels along the aperture 1942 to cut the roll-dispensed stock 1932. The cutter assembly 140 can be provided in any desirable configuration, such as those disclosed herein, for example, cutter assembly 1750 described in connection with FIGS. 28-31. The cutter assembly 1940 can fit within a recess defined by the space under the right angle formed by the intersection of the planes extending from the top wall 1902 and the front wall 1904, and thus the cutter assembly 1940 does not extend beyond the bounds of the container 1900, so configured. The cutter assembly 1940 is thereby protected from damage during shipping or storage of the container 1900. Due to the recessed positioning of the cutter assembly 1940, multiple containers 1900 can be stacked relative to each other without imparting pressure or force on the cutter assembly 1940, thereby preventing potential damage to the cutter assembly 1940.

The support wall 1912 can be provided with fixation strips 1914*a* and 1914*b* along both sides of the aperture 1942, for maintaining the position of the roll-dispensed stock prior to cutting. As shown best in FIG. 34, fixation strip 1914*a* is located on the support wall 1912, near the top wall 1902 and has a thickness greater than fixation strip 1914*b*. Accordingly, the fixation strip 1914*a* extends a greater distance from the support wall 1912 than fixation strip 1914*b*. The fixation strips 1914*a* and 1914*b* can be made out of any material suitable for securely and removably holding the roll-dispensed stock while it is being cut. Those of ordinary skill in the art will appreciate that the material used for the fixation strips 1914*a* and 1914*b* is preferably selected based on the properties of the roll-dispensed stock material. In one example, if the roll-dispensed stock is plastic wrap, foil, wax paper, parchment paper, tape, duct tape, or wrapping paper, the fixation strips 1914*a* and 1914*b* can be made of a silicone material, flexible polymer, or another material that provides light tack or clings to the roll-dispensed stock. The fixation strips 1914*a* and 1914*b* can also be made of a low-tack adhesive (e.g., fugitive, "booger," or "credit card" glue), an ultraviolet (UV) light curing adhesive, a wax, a tacky material, or any other material suitable for securely and removably holding or gripping the roll-dispensed stock.

Figure 35:
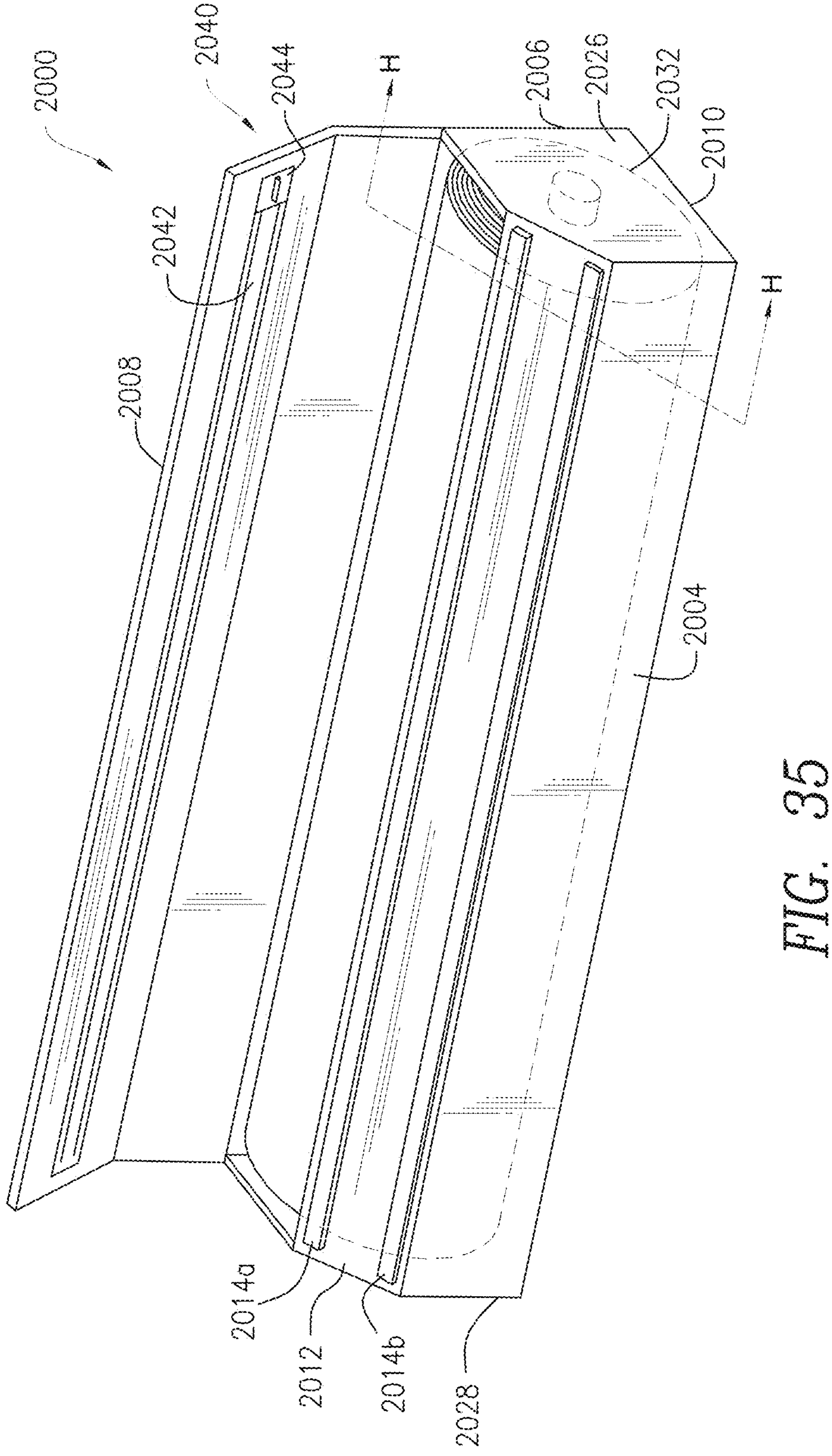
FIG. 35 is a perspective view of a roll-dispensed stock container according to the present disclosure including a lid and an elevated fixation strip on an angled support wall.
Figure 36:
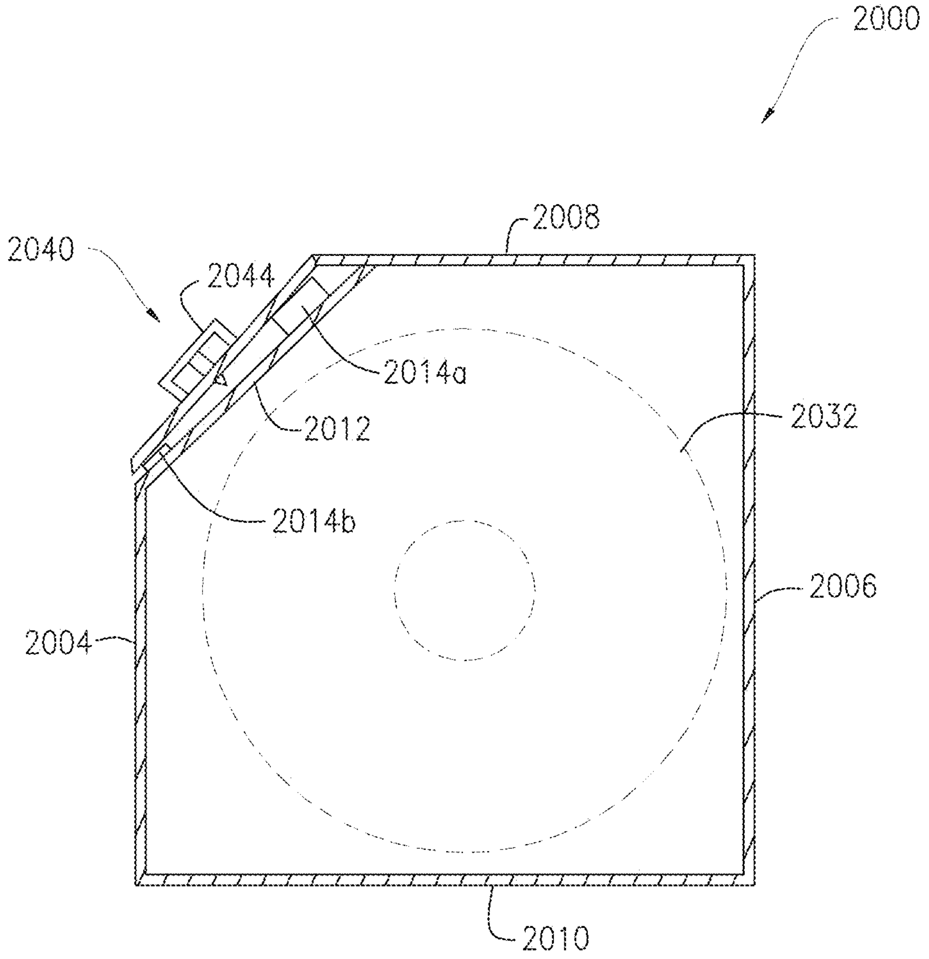
FIG. 36 is a cross-sectional view (taken along line I-I of FIG. 35) of the roll-dispensed stock container of FIG. 35.

FIG. 35 is a perspective view of another roll-dispensed stock container, indicated generally at 2000, and FIG. 36 is a cross-sectional view (taken along line H-H of FIG. 35) of the roll-dispensed stock container 2000 of FIG. 35 positioned in a closed configuration. As such, FIGS. 35 and 36 are referred to jointly herein. Container 2000 includes like structures, and is thus similar to container 100 discussed above in connection with FIGS. 1-6, except for the distinctions noted herein.

As shown, container 2000 includes a front wall 2004, a rear wall 2006, a bottom wall 2010, side walls 2026 and 2028, a support wall 2012, a lid 2008, a cutter assembly 2040 with a track 2042 and a slidable cutter 2044, and fixation strips 2014*a* and 2014*b* disposed on the support wall 2012, on both sides of the cutter assembly 2040, when the lid 2008 is in a closed configuration. Fixation strips 2014*a* and 2014*b* maintain the position of the roll-dispensed stock 2032 prior to cutting and can be made out of any material suitable for securely and removably holding the roll-dispensed stock 2032. Fixation strip 2014*a* is located near an opening 2030 for dispensing roll-dispensed stock from the container 2000 and, as shown best in FIG. 36, has a thickness greater than fixation strip 2014*b*, which is located near the intersection of the front wall 2004 and support wall 2012. Accordingly, the fixation strip 2014*a* extends a greater distance from the support wall 2012 than fixation strip 2014*b*.

Figure 37:
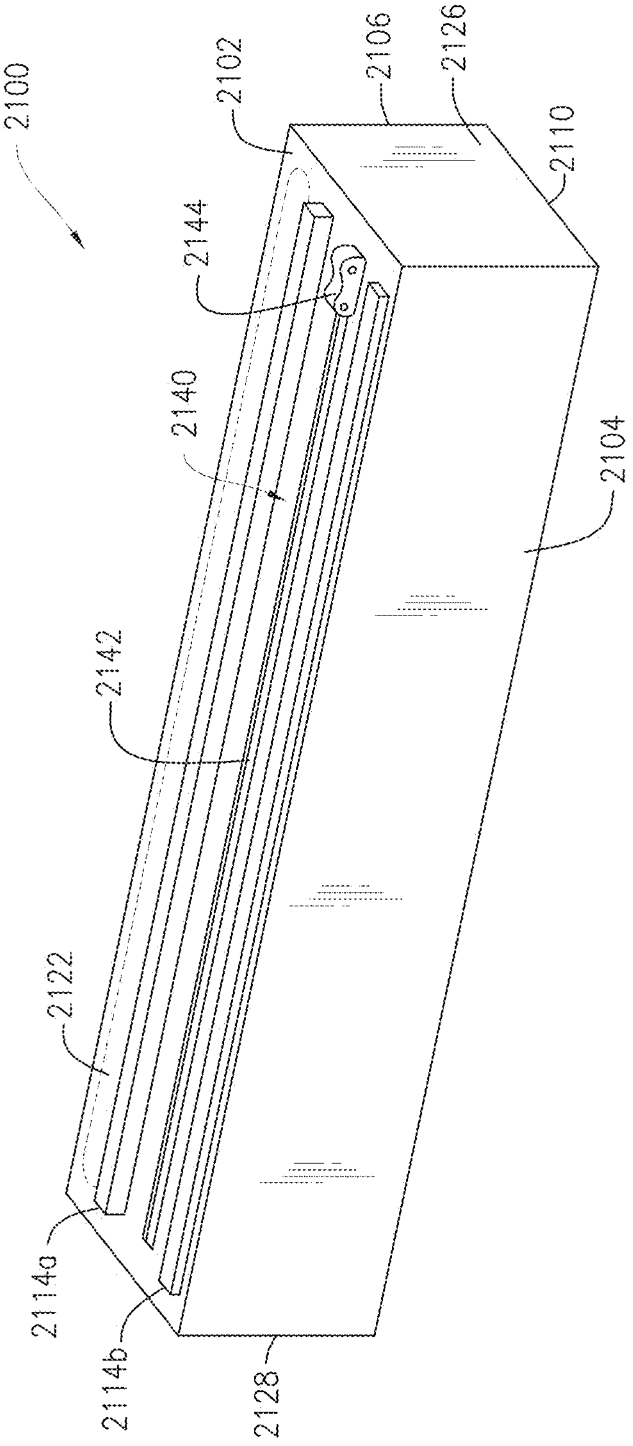
FIG. 37 is a perspective view of another roll-dispensed stock container according to the present disclosure including an elevated fixation strip.
Figure 38:
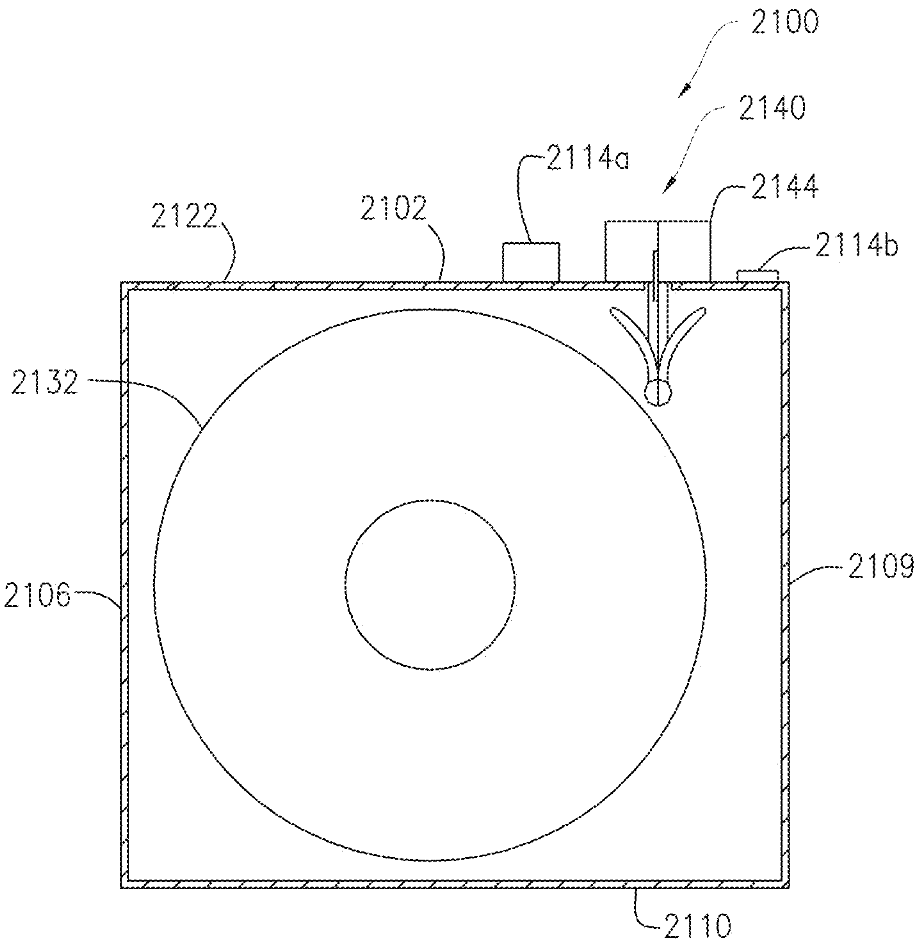
FIG. 38 is a cross-sectional view (taken along line H-H of FIG. 37) of the roll-dispensed stock container of FIG. 37.

FIG. 37 is a perspective view of another roll-dispensed stock container, indicated generally at 2100, and FIG. 38 is a cross-sectional view (taken along line J-J of FIG. 37) of the roll-dispensed stock container 2100 of FIG. 37. As such, FIGS. 37 and 38 are referred to jointly herein. The container 2100 includes a top wall 2102, a front wall 2104, a rear wall 2106, a bottom wall 2110, and side walls 2126 and 2128. The top wall 2102, front wall 2104, rear wall 2106, bottom wall 2110, and side walls 2126 and 2128 form an enclosure dimensioned to receive a roll of roll-dispensed stock 2132. The container 2100 can include a perforated section 2122 in the top wall 2102, configured to be at least partially separated from the top wall 2102 to form an opening (see, e.g., opening 1930 shown in FIGS. 39-41) for accessing and dispensing roll-dispensed stock from the enclosure.

The container 2100 can include a cutter assembly, indicated generally at 2140. As shown in FIG. 37, the cutter assembly 2140 includes an elongated aperture 2142 disposed through the top wall 2102 and a slidable cutter 2144 with a blade or serrated edge disposed therein. The slidable cutter 2144 travels along the aperture 2142 to cut the roll-dispensed stock 2132. The cutter assembly 2140 can be provided in any desirable configuration, such as those disclosed herein, for example, cutter assembly 1750 described in connection with FIGS. 28-31.

The top wall 2102 of container 2100 can be provided with fixation strips 2114*a* and 2114*b* along both sides of the aperture 2142, for maintaining the position of the roll-dispensed stock prior to cutting. As shown best in FIG. 38, fixation strip 2114*a* is located near the perforated section 2122 and has a thickness greater than fixation strip 2114*b*, which is located near the intersection of the top wall 2102 and front wall 2104. Accordingly, the fixation strip 2114*a* extends a greater distance from the top wall 2102 than fixation strip 2114*b*. The fixation strips 2114*a* and 2114*b* can be made out of any material suitable for securely and removably holding the roll-dispensed stock while it is being cut. Fixation strips 2114*a* and 2114*b* can also be applied to other containers having a generally rectangular cross-section, such as those described in U.S. patent application Ser. No. 15/399,863, the entire disclosure of which is hereby incorporated by reference. Fixation strips 2114*a* and 2114*b* are similar to fixation strips 1914*a* and 1914*b* (see FIGS. 33 and 34).

Figure 39:
FIG. 39 is a perspective view of the roll-dispensed stock container of FIG. 33 with stock extending from the roll in a first position.
Figure 40:
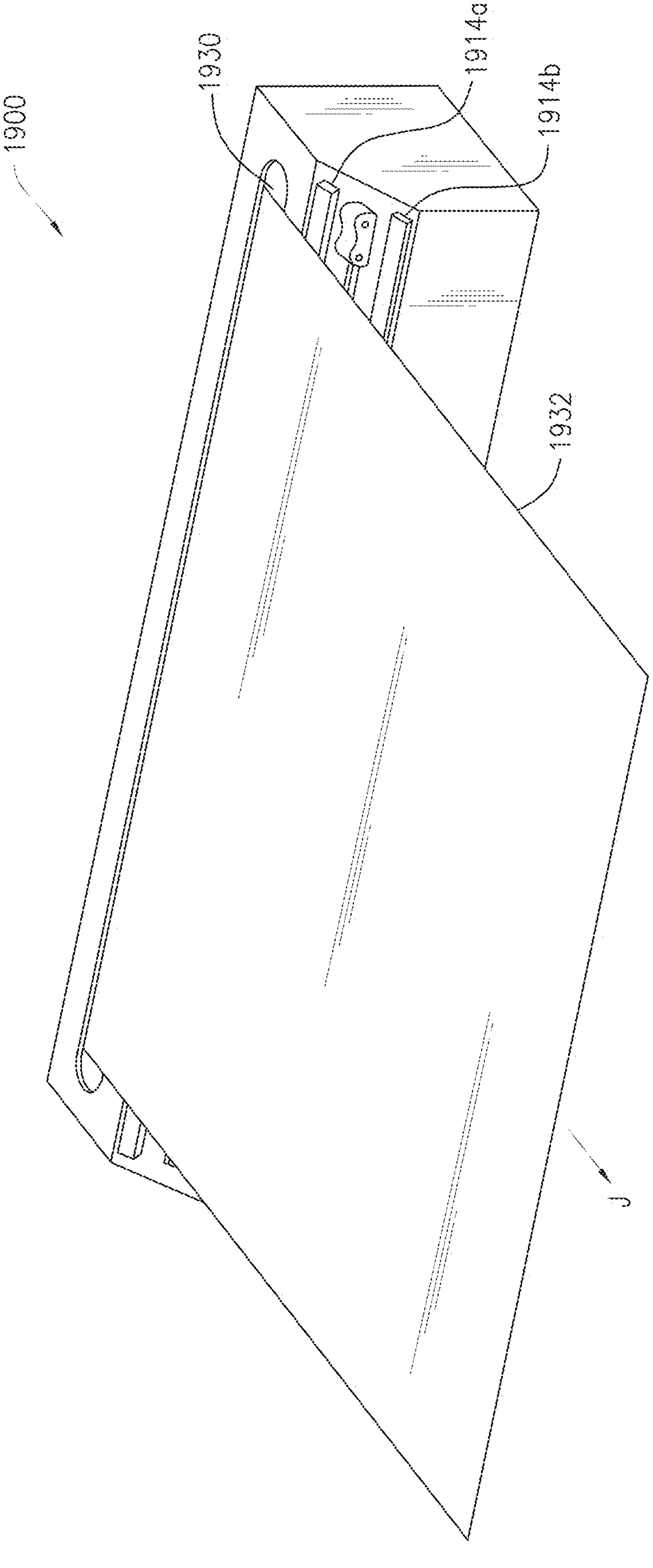
FIG. 40 is a perspective view of the roll-dispensed stock container of FIG. 33 with the stock in a second position.
Figure 41:
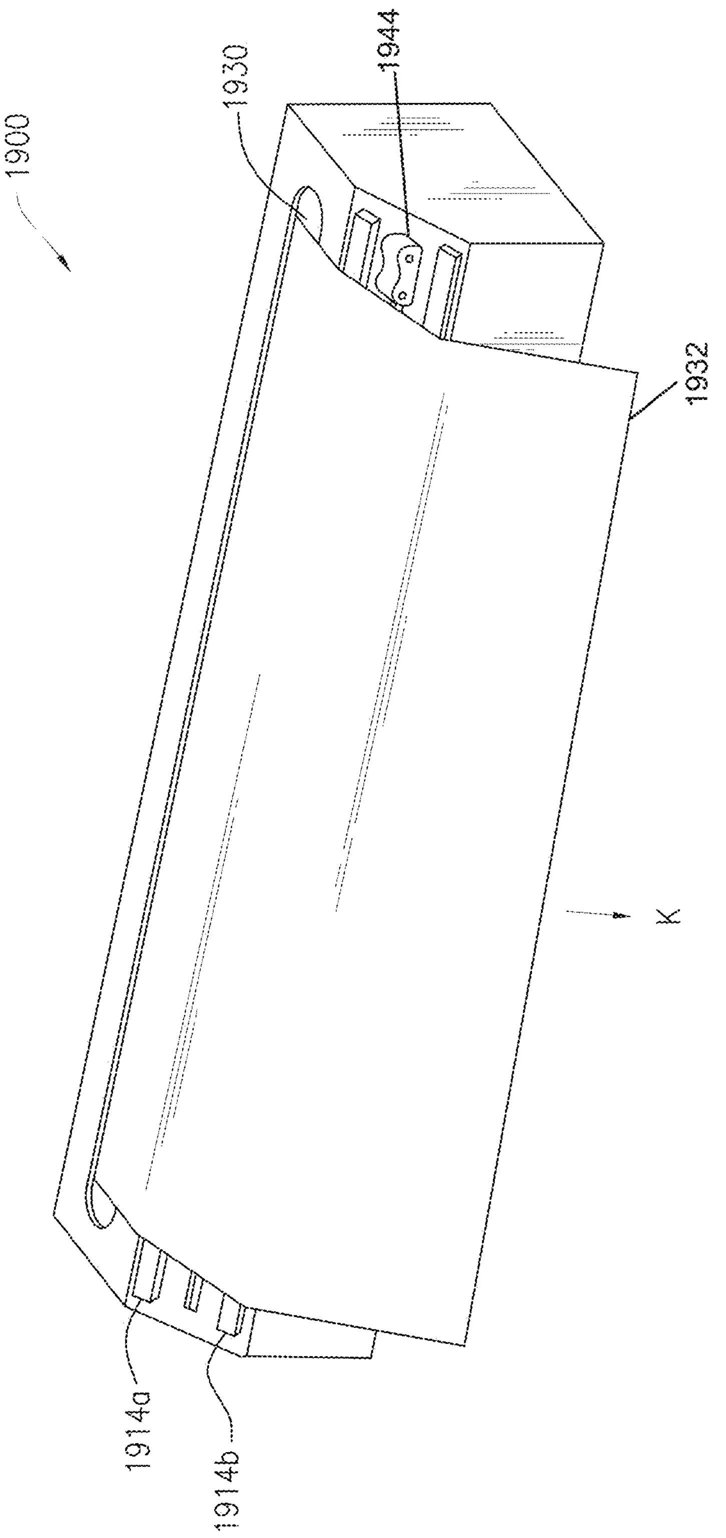
FIG. 41 is a perspective view of the roll-dispensed stock container of FIG. 33 with the stock in a third position.

FIGS. 39-41 illustrate operation of container 1900 as the roll-dispensed stock 1932 is drawn from container 1900 prior to cutting. Specifically, FIG. 39 is a perspective view of the roll-dispensed stock container 1900 with the stock 1932 extending from the container 1900 in a first position, FIG. 40 shows the stock 1932 extending from the container 1900 in a second position, and FIG. 41 shows the stock 1932 extending from the container in a third position, prior to cutting.

As shown in FIG. 39, perforated section 1922 is removed from the top wall 1902 of the container 1900, thereby forming opening 1930 and providing access to the roll-dispensed stock 1932. A portion of the roll-dispensed stock 1932 is drawn through the opening 1930, extending away from the top wall 1902 of the container 1900, in the direction of arrow I. After the portion of roll-dispensed stock 1932 is pulled from the container as show in FIG. 39, the roll-dispensed stock 1932 is pulled out as shown by arrow J in FIG. 40, and then down, such that the roll dispensed stock contacts fixation strip 1914*a*, and is then pulled down further in the direction of arrow K, as shown in FIG. 41, such that the roll dispensed stock contacts fixation strip 1914*b*. The roll-dispensed stock 1932 can then be cut by sliding the cutter 1944 along the length of the container 1900, such as, for example, as described in connection with FIGS. 4-6.

As discussed above, fixation strips 1914*a* and 1914*b* are formed from a material to which the roll-dispensed stock 1932 clings. Accordingly, when the roll dispensed stock 1932 contacts fixation strip 1914*a*, it clings thereto. Furthermore, when the roll dispensed stock 1932 is pulled in the direction of arrow J, tension is created on the roll-dispensed stock 1932, and when the roll-dispensed stock 1932 contacts fixation strip 1414*b* it clings thereto, thus maintaining the tension on the roll dispensed stock 1932 between fixation strips 1914*a* and 1914*b* prior to cutting.

Fixation strip 1914*a* is thicker and/or taller than fixation strip 1914*b*, which allows the roll-dispensed stock 1932 to contact fixation strip 1914*a*, and be put into tension, before contacting fixation strip 1914*b*, as shown in FIGS. 4 and 41. This configuration of fixation strips is also advantageous when applied to a container having a generally rectangular cross-section, such as container 2100, discussed in connection with FIGS. 37 and 38.

The present disclosure also contemplates a method for dispensing roll-dispensed stock and can include the steps of: removing a portion of roll-dispensed stock through an opening, drawing the portion of roll-dispensed stock over and contacting a first fixation strip, contacting the roll-dispensed stock with a second fixation strip thereby creating and maintaining tension on the roll-dispensed stock, and cutting the roll-dispensed stock by moving a slidable cutter along the length of the container. The foregoing steps can be applied to each of the roll-dispensed stock containers, discussed in connection with FIGS. 33-41.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

What is claimed is:

1. A roll-dispensed stock cutter and container, comprising:
- a container body having bottom, front and back, and side walls forming an enclosure for a roll of stock;
- a support wall attached to and extending rearwardly of the front wall;
- a lid attached to the container body, the lid having a first portion extending from the back wall, and a second portion extending over the support wall; and
- a cutter, comprising:
  - a base having a receptacle with a bottom surface below the lid and channels configured to slidably engage a slot in the second portion of the lid of the roll-dispensed stock container;
  - a spring button having a first half and a second half joined together, each of the first and second halves being identically formed and each having a leaf spring, the spring button positioned in the receptacle of the base, and the leaf springs biasing the spring button away from the base; and
  - a blade fixed between recesses in the first and second halves of the spring button, the recesses sized and shaped to receive the blade and to restrain movement of the blade relative to the spring button;
  - the spring button having a first position with the blade retracted within the base;
  - the spring button having a second position with the blade extended through a blade aperture in the base when the spring button is depressed by vertical pressure applied by a user; and
- the base, the spring button, the blade, and the slot axially aligned for application of a normal force to the spring button to move the blade to the second position and normal to the support wall to cut stock from the roll of stock as the cutter moves along the slot.

2. The cutter and container of claim 1, wherein the leaf springs are integrally formed with each of the first and second button halves.

3. The cutter and container of claim 1, wherein the first and second button halves are attached together by one or more posts and one or more receptacles and each of the first and second button halves include one or more posts and one or more receptacles, the receptacles of the first button half sized to receive the posts of the second button half, and the receptacles of the second button half sized to receive the posts of the first button half.

4. The cutter and container of claim 3, wherein an aperture is disposed through the blade and a post is positioned through the aperture, the aperture and the post cooperating to restrain movement of the blade relative to the spring button.

5. The cutter and container of claim 1, wherein the spring button includes one or more outwardly extending tabs, and the base includes one or more vertical apertures sized to receive the tabs, the tabs and vertical apertures cooperating to retain the spring button within the base and to limit vertical movement of the spring button with respect to the base.

6. The cutter and container of claim 1, wherein the spring button includes one or more outwardly extending flanges, and the base includes one or more corresponding channels in the receptacle sized to receive the flanges.

7. A roll-dispensed stock cutter and container, comprising:
- a container body having bottom, front and back, and side walls forming an enclosure for a roll of stock;
- a support wall attached to and extending rearwardly of the front wall;
- a lid attached to the container body, the lid having a first portion extending from the back wall, and a second portion extending over the support wall; and
- a cutter, comprising:
  - a base having channels with walls, the channel walls contacting and slidably engaging edges of a slot in the second portion of the lid of the roll-dispensed stock container, the base having a lower end positioned under the lid;
  - a button positioned within the base;
  - a means for biasing the button away from the base;
  - a blade fixed to the button;
  - the button having a first position where the blade is retracted within the base;
  - the button having a second position where the blade is extended through the base;
  - the button movable by normal pressure applied by a user from the first position to the second position when the button is depressed;
  - the button automatically returning to the first position when the button is released; and
- the base, the button, the blade, and the slot axially aligned for application of a normal force to the button to move the blade to the second position to press the stock and tension the stock to cut stock from the roll of stock as the cutter moves along the slot.

8. The cutter and container of claim 7, wherein the button includes first and second button halves and the blade is positioned therebetween and wherein the first and second button halves are attached together by one or more posts and one or more receptacles and each of the first and second button halves include one or more posts and one or more receptacles, the receptacles of the first button half sized to receive the posts of the second button half, and the receptacles of the second button half sized to receive the posts of the first button half.

9. The cutter and container of claim 7, wherein the button includes one or more outwardly extending tabs, and the base includes one or more vertical apertures sized to receive the tabs, the tabs and vertical apertures cooperating to retain the button within the base and to limit vertical movement of the button with respect to the base.

10. The cutter and container of claim 7, wherein the bias is provided by one or more leaf springs integrally formed with the button.

11. The cutter and container of claim 10, wherein the leaf springs are u-shaped.

12. A roll-dispensed stock cutter and container, comprising:
- a container body having bottom, front and back, and side walls forming an enclosure for a roll of stock;

a support wall attached to and extending rearwardly of the front wall;

a lid attached to the container body, the lid having a first portion extending from the back wall, and a second portion extending over the support wall; and a cutter, comprising:

a base having walls that contact and slidably engage edges of a slot in the second portion of the lid of the roll-dispensed stock container, the base having a bottom surface positioned below the lid;

a button interconnected with the base and with a blade;

the button having a first position where the blade is retracted within the base;

the button having a second position where the blade is extended through the base;

the button movable by normal pressure applied by a user from the first position to the second position when the button is depressed;

the base, the button, the blade, and the slot axially aligned for application of a normal force to the button to move the blade perpendicular to the base to the second position and cut stock from the roll of stock as the cutter moves along the slot; and the button automatically returning to the first position, and retracting the blade within the base, when the button is released.

13. The cutter and container of claim 12, wherein the application of a normal force to the button to extend the blade urges the lid against the support wall to tension stock for cutting.

14. A roll-dispensed stock cutter and container, comprising:

a container body having bottom, front and back, and side walls forming an enclosure for a roll of stock;

a support wall attached to and extending rearwardly of the front wall;

a lid attached to the container body, the lid having a first portion extending from the back wall, and a second portion extending over the support wall; and a cutter, comprising:

a base having channels with walls, the channel walls contacting and slidably engaging edges of a slot in the second portion of the lid of the roll dispensed stock container;

a button positioned within the base;

a means for biasing the button away from the base;

a blade fixed to the button;

the button having a first position where the blade is retracted within the base;

the button having a second position where the blade is extended through the base;

the button movable by normal pressure applied by a user from the first position to the second position when the button is depressed;

the button automatically returning to the first position when the button is released; and the base, the button, the blade, and the slot axially aligned for application of a normal force to the button to move the blade to the second position to press the stock and tension the stock to cut stock from the roll of stock as the cutter moves along the slot.

* * * * *